(12) United States Patent
Bastian, II

(10) Patent No.: US 11,235,930 B2
(45) Date of Patent: Feb. 1, 2022

(54) ROBOTIC SHUTTLE SYSTEM

(71) Applicant: Bastian Solutions, LLC, Indianapolis, IN (US)

(72) Inventor: William A. Bastian, II, Carmel, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 34 days.

(21) Appl. No.: 16/359,641

(22) Filed: Mar. 20, 2019

(65) Prior Publication Data

US 2019/0291955 A1    Sep. 26, 2019

Related U.S. Application Data

(60) Provisional application No. 62/645,459, filed on Mar. 20, 2018.

(51) Int. Cl.
*B65G 1/137* (2006.01)
*B65G 1/04* (2006.01)
(Continued)

(52) U.S. Cl.
CPC ............ *B65G 1/1375* (2013.01); *B25J 5/007* (2013.01); *B25J 5/02* (2013.01); *B25J 9/162* (2013.01); *B25J 15/0019* (2013.01); *B25J 15/0057* (2013.01); *B25J 15/0616* (2013.01); *B65G 1/0428* (2013.01); *B65G 1/1373* (2013.01);
(Continued)

(58) Field of Classification Search
CPC ............................ B65G 1/0492; B65G 1/1375
See application file for complete search history.

(56) References Cited

U.S. PATENT DOCUMENTS

| 5,484,091 A | 1/1996 | Malinowski et al. |
| 6,652,213 B1 | 11/2003 | Mitchell et al. |

(Continued)

FOREIGN PATENT DOCUMENTS

| CN | 104444007 A | 3/2015 |
| JP | H08-323676 A | 12/1996 |

(Continued)

OTHER PUBLICATIONS

International Patent Application PCT/US2019/023210 Search Report dated Jul. 19, 2019. 4 pages.

(Continued)

*Primary Examiner* — Thomas Randazzo
(74) *Attorney, Agent, or Firm* — Woodard, Emhardt, Henry, Reeves & Wagner, LLP

(57) ABSTRACT

A robotic shuttle system includes a rack system and one or more shuttles. The rack system includes a rack and a shuttle frame. The rack has storage locations for containers containing items. The shuttle frame has rails disposed along the rack. The shuttle includes a powertrain, container transfer mechanism, and a robot arm. The power train is configured to move the shuttle along the rails of the rack and on a surface outside of the rack system. The container transfer mechanism is configured to transfer the containers between the rack and the shuttle. The robot arm extends from the shuttle to transfer the items between one of the containers on the shuttle and a container in a container holder of the shuttle.

43 Claims, 29 Drawing Sheets

(51) Int. Cl.
*B25J 5/00* (2006.01)
*B25J 15/00* (2006.01)
*B25J 15/06* (2006.01)
*B25J 9/16* (2006.01)
*B25J 5/02* (2006.01)
*B66F 7/06* (2006.01)
*B66F 9/12* (2006.01)

(52) U.S. Cl.
CPC ............ *B66F 7/065* (2013.01); *B66F 7/0625* (2013.01); *B66F 9/12* (2013.01)

(56) References Cited

U.S. PATENT DOCUMENTS

| | | | | |
|---|---|---|---|---|
| 7,128,521 | B2* | 10/2006 | Hansl | B65G 1/0435 |
| | | | | 414/807 |
| 7,686,560 | B2* | 3/2010 | Laurin | B65G 1/0407 |
| | | | | 414/278 |
| 8,403,614 | B2 | 3/2013 | Bastian, II et al. | |
| 8,790,061 | B2 | 7/2014 | Yamashita | |
| 9,120,622 | B1* | 9/2015 | Elazary | B25J 15/0608 |
| 9,122,566 | B2 | 9/2015 | Bastian, II et al. | |
| 9,327,397 | B1* | 5/2016 | Williams | B25J 3/04 |
| 9,452,537 | B2 | 9/2016 | Nammoto et al. | |
| 9,550,624 | B2 | 1/2017 | Khodl et al. | |
| 10,766,699 | B2* | 9/2020 | Warhurst | B65G 1/065 |
| 2006/0072988 | A1 | 4/2006 | Hariki et al. | |
| 2011/0290796 | A1 | 12/2011 | Burgess | |
| 2012/0068664 | A1* | 3/2012 | Franzen | B60L 15/38 |
| | | | | 320/109 |
| 2012/0185080 | A1* | 7/2012 | Cyrulik | B65G 1/1373 |
| | | | | 700/214 |
| 2014/0031972 | A1* | 1/2014 | DeWitt | B65G 1/137 |
| | | | | 700/214 |
| 2014/0103676 | A1* | 4/2014 | Nammoto | B25J 15/0009 |
| | | | | 294/213 |
| 2014/0197652 | A1 | 7/2014 | Wang et al. | |
| 2014/0257555 | A1* | 9/2014 | Bastian, II | G06F 17/00 |
| | | | | 700/230 |
| 2014/0301811 | A1* | 10/2014 | Langhoff | B65G 1/0478 |
| | | | | 414/277 |
| 2015/0032252 | A1 | 1/2015 | Galluzzo et al. | |
| 2015/0098775 | A1 | 4/2015 | Razumov | |
| 2016/0016731 | A1 | 1/2016 | Razumov | |
| 2016/0089793 | A1 | 3/2016 | Truebenbach | |
| 2016/0114482 | A1 | 4/2016 | Lessing et al. | |
| 2016/0176638 | A1 | 6/2016 | Toebes | |
| 2016/0214808 | A1 | 7/2016 | Cyrulik et al. | |
| 2016/0257240 | A1 | 9/2016 | High et al. | |
| 2016/0346922 | A1 | 12/2016 | Shelton et al. | |
| 2016/0355337 | A1* | 12/2016 | Lert | B65G 1/0492 |
| 2017/0043953 | A1* | 2/2017 | Battles | G06Q 10/087 |
| 2017/0066592 | A1 | 3/2017 | Bastian, II et al. | |
| 2017/0158430 | A1 | 6/2017 | Raizer | |
| 2017/0197316 | A1 | 7/2017 | Wagner et al. | |
| 2017/0203443 | A1 | 7/2017 | Lessing et al. | |
| 2017/0267452 | A1* | 9/2017 | Goren | B65G 1/137 |
| 2018/0037410 | A1* | 2/2018 | DeWitt | B65G 1/0485 |
| 2018/0057263 | A1* | 3/2018 | Beer | B65G 1/137 |
| 2018/0290830 | A1* | 10/2018 | Valinsky | B65G 1/0435 |
| 2018/0305122 | A1 | 10/2018 | Moulin et al. | |
| 2019/0092570 | A1* | 3/2019 | MacDonald | B65G 1/1373 |
| 2019/0239640 | A1* | 8/2019 | Lert, Jr. | B65G 1/0492 |
| 2019/0245366 | A1* | 8/2019 | Coady | B65G 1/1373 |
| 2020/0180863 | A1* | 6/2020 | Moulin | B65G 1/06 |
| 2020/0391986 | A1* | 12/2020 | Picha | B66F 7/025 |

FOREIGN PATENT DOCUMENTS

| | | |
|---|---|---|
| JP | 2014-151371 | 8/2014 |
| KR | 10-2016-0133585 A | 11/2016 |
| KR | 10-2017-0037221 A | 4/2017 |
| WO | 2017064401 A1 | 4/2017 |

OTHER PUBLICATIONS

International Patent Application PCT/US2019/023210 Written Opinion dated Jul. 19, 2019. 10 pages.
Exotec Solutions "Skypod system, developed by Exotec Solutions." Published Dec. 7, 2017. [retrieved Dec. 18, 2017]. pages. Retrieved from the Internet: <URL: http:// https://www.youtube.com/watch?v=uclGrc_Y-f4&sns=em>.
Bastian Solutions "Season's Greetings" Published Dec. 14, 2017. [retrieved Dec. 19, 2017]. pages. Retrieved from the Internet: <URL: https://www.youtube.com/watch?v=aVUmlled9fg.
U.S. Appl. No. 16/205,367, filed Nov. 30, 2018, entitled "End Effector".
International Patent Application PCT/US2018/031378 Search Report dated Oct. 31, 2018. 4 pages.
International Patent Application PCT/US2018/031378 Written Opinion dated Oct. 31, 2018. 5 pages.
Crooks, W. et al., Fin Ray® Effect Inspired Soft Robotic Gripper: From the RoboSoft Grand Challenge toward Optimization. [retrieved Nov. 20, 2018]. 9 pages. Retrieved from the Internet: <URL: https://www.frontiersin.org/articles/10.3389/frobt.2016.00070>.
BionicTripod with FinGripper. [retrieved Nov. 30, 2018]. 2 pages. Retrieved from the Internet: <URL: https://www.festo.com/cms/en_corp/9779.htm>.
Fish Fins Inspire Robotic Gripper Design. [retrieved Nov. 30, 2018]. 2 pages. Retrieved from the Internet: <URL: https://www.packagingdigest.com/automation/fish-fins-inspire-robotic-gripper-design>.

* cited by examiner

ROBOTIC SHUTTLE SYSTEM

CROSS REFERENCE TO RELATED APPLICATIONS

This application claims the benefit of U.S. Provisional Patent Application No. 62/645,459, filed on Mar. 20, 2018, which is hereby incorporated by reference.

BACKGROUND

With recent developments in electronic commerce, both in consumer and commercial sectors, there has been a substantial increase in demand for "Mixed Stock Keeping Unit (SKU) Pallets" or mixed SKU orders in which a single pallet or order requires multiple different kinds of SKUs. For example, grocery stores, convenience stores, and/or liquor stores may not require an entire pallet of a particular brand of soft drink but instead may require a mixed pallet containing different soft drink brands or other items. Consumers rarely order items in bulk such that their order typically contains a mix of SKUs. Processing mixed pallets or orders typically slows order fulfillment cycle times for shipping. These slow cycle times for both warehousing and shipping impact customer service levels as well as manufacturing efficiencies. The quicker that goods can be processed and loaded onto trucks, trains, ships, airplanes, drones, or other vehicles, the larger geographical area a distribution center, manufacturing plant, or warehouse can service. For example, the quicker a truck can be loaded and unloaded, the more time is available for transporting items. A distribution center is then able to service a larger area because the truck can cover a greater distance in the same amount of time. Thus, there is a need for improvement in this field.

Thus, there is a need for improvement in this field.

SUMMARY

A shuttle system includes one or more racks upon which SKUs are stored, a shuttle frame positioned proximal to the rack, and one or more shuttles that are configured to service the racks by travelling along the shuttle frame. This shuttle system creates a robots-to-goods environment in which the robotic shuttles automatically pick, place, and/or otherwise handle the goods. This robots-to-goods environment created by the shuttle system is a significant improvement over the traditional goods-to-person environment in which humans handle the goods which can be labor intensive and quite expensive. In this shuttle system, multiple shuttles form a swarm with each one operating in parallel with one another. Some or all of the shuttles in one variation have independent missions, and in other variations, some or all of the shuttles can coordinate their activities so as to cooperate goods handling missions. Various combinations of these approaches can be used.

In one example, each shuttle includes at least one robotic arm that is able to pick or place SKUs into totes that are carried on the shuttle. In one particular form, the robotic arm is a six-axis robotic arm, but other types of robotic arms can be used in other examples. In one version, the shuttle carries a tote in which SKUs are picked or placed. The shuttle further includes one or more extendable belt conveyors that are able to extend into the racks to remove or load trays (or totes) stored in the rack. Once the tray is loaded onto the shuttle, the robotic arm is able to remove SKUs from the tray and place them into the tote on the shuttle (and vice-versa). The shuttle has the ability to guide itself so as to move independently of the rack system as well as drive itself to the rack system so that it is able to service areas in the warehouse outside of the rack. This is especially useful for micro-fulfillment situations such as for local pharmacies. The wheels on the shuttles include independent electric motors that are able to rotate at least ninety degrees (90°) relative to the shuttle so as to steer the shuttle wheels when riding on the shuttle frame as well as outside of the racks.

The robotic arm includes a unique End of Arm Tool (EoAT) for manipulating SKUs. The EoAT includes a combination of a shark fin gripper with strategically placed vacuum cups. In particular, the EoAT includes three shark fin gripping members, an extendable palm vacuum cup, fingertip vacuum cups placed at the ends of the shark fin gripping members, and inside finger digit vacuum cups. This unique combination allows the EoAT to pick a wide variety of items both large and small as well as those that are difficult to handle. In particular, the system allows individual products to be picked up via the shark fin gripping members, a vacuum pickup followed by using the gripping members, a single gripping option where the finger tips on the ends of the shark fins are used alone, a multi-tip configuration in which the vacuum cups at the end of the tips are brought closer together and all of them are used to pick up the individual products, and a single finger adjacent picking up using the inside. Of course, there other ways in which the EoAT can pick or manipulate items. While the illustrated example includes three shark fin gripping members, other examples can include more or less of them.

The trays and/or totes incorporate a unique separator structure for internally organizing SKUs. In one example, the separator structure includes one or more monolayer webs that stretch at the opening and/or inside the trays and/or totes. In one form, the monolayer web includes a grid of elastic bands that form SKU openings where SKUs are stored. With the separator structure, a shuttle robot arm is able to perform blind picks or puts without the need of a vision system. In one variation, the web includes an X-Y array of rubber or elastic bands that help separate the SKUs. The web also allows multiple different SKUs to be stored within the same tray and/or tote which in turn maximizes tote/tray utilization. With this configuration, the tote and/or tray can always be topped off to maximize packing density of stored SKUs. In other variations, the web allows a single type of SKU to be stored in a uniform array so as to provide high packing density. The uniform packing array facilitates blind picking/putting which is typically faster than picking/putting with a vision system, but in other examples, vision systems can be used. With the flexibility of the web, SKUs (either the same or different) can be packed in a random storage pattern within the tray and/or tote. For instance, the flexibility of the web allows different sized and/or shaped SKUs to be packed within the same tote and/or tray. In some case, when packed in a random pattern, the robotic arm uses a vision system to pick or place SKUs.

Aspect 1 generally concerns a system that includes a shuttle with a robot arm that picks or places items in racks.

Aspect 2 generally concerns the system of aspect 1 in which the rack system includes a shuttle frame where the shuttle travels along the racks.

Aspect 3 generally concerns the system of aspect 2 in which the shuttle is configured to move independently outside of the rack system.

Aspect 4 generally concerns the system of aspect 3 in which the shuttle includes one or more steerable wheels that are powered by the shuttle.

Aspect 5 generally concerns the system of aspect 4 in which the wheels each include a pinion and a drive wheel.

Aspect 6 generally concerns the system of aspect 5 in which the shuttle frame includes a vertical elevator rail with teeth configured to engage the pinion.

Aspect 7 generally concerns the system of aspect 6 in which the shuttle switch is configured to change movement of the shuttle between vertical and horizontal movement.

Aspect 8 generally concerns the system of aspect 7 in which the shuttle switch includes a turntable with a straight track located between opposing curved tracks.

Aspect 9 generally concerns the system of aspect 5 in which the shuttle frame includes an intersection where the shuttle turns horizontally with the wheels.

Aspect 10 generally concerns the system of aspect 9 in which the intersection includes one or more rail channels with turn shoulders in which the drive wheel is received.

Aspect 11 generally concerns the system of aspect 4 in which the shuttle includes an Energy Storage System (ESS).

Aspect 12 generally concerns the system of aspect 11 in which the wheels are configured to form an electrical circuit with rails to charge the ESS.

Aspect 13 generally concerns the system of aspect 1 in which the shuttle has a container holder and a rack container platform.

Aspect 14 generally concerns the system of aspect 13 in which the rack container platform has a lift mechanism configured to move the rack container platform vertically.

Aspect 15 generally concerns the system of aspect 14 in which the rack container platform has an extendable conveyor configured to extend to an extended position in the racks.

Aspect 16 generally concerns the system of aspect 1 in which the shuttle includes an extendable belt conveyor configured to extend to an extended position.

Aspect 17 generally concerns the system of aspect 1 in which the shuttle includes a lift mechanism configured to vertically move a rack container platform.

Aspect 18 generally concerns the system of aspect 17 in which the lift mechanism is configured to raise the rack container platform above the shuttle.

Aspect 19 generally concerns the system of aspect 17 in which the lift mechanism is configured to lower the rack container platform below the shuttle.

Aspect 20 generally concerns the system of aspect 17 in which the lift mechanism is configured to move the rack container platform above and below the shuttle.

Aspect 21 generally concerns the system of aspect 1 in which the robot arm includes an End of Arm Tool (EoAT) with a shark fin finger to grip the items.

Aspect 22 generally concerns the system of aspect 21 in which the shark fin finger includes a tip vacuum cup.

Aspect 23 generally concerns the system of aspect 21 in which the shark fin finger includes a grip pad with one or more vacuum ports.

Aspect 24 generally concerns the system of aspect 21 in which the EoAT includes an extendable palm vacuum cup that is configured to extend from the EoAT.

Aspect 25 generally concerns the system of aspect 1 in which the tote with an internal separator is supported on the shuttle.

Aspect 26 generally concerns the system of aspect 25 in which the internal separator includes a monolayer web configured to separate the items.

Aspect 27 generally concerns the system of aspect 26 in which the monolayer web includes a grid of elastic bands.

Aspect 28 generally concerns the system of aspect 27 in which the grid has a perpendicular array of the elastic bands to separate the items.

Aspect 29 generally concerns the system of aspect 25 in which the shuttle is configured to map the position of the items in the tote for blind picking.

Aspect 30 generally concerns the system of aspect 25 in which the tote is configured to store multiple different kinds of Stock Keeping Units (SKUs).

Aspect 31 generally concerns the system of aspect 25 in which the internal separator is configured to hold a uniform array of the items with the same Stock Keeping Unit (SKU).

Aspect 32 generally concerns the system of aspect 25 in which the shuttle includes a vision system for picking dense random storage of the items in the tote.

Aspect 33 generally concerns the system of aspect 1 in which the rack system includes an elevator with an elevator platform configured to vertically move the shuttle.

Aspect 34 generally concerns the system of aspect 33 in which the elevator platform includes one or more rails that support the shuttle.

Aspect 35 generally concerns the system of aspect 34 in which the rails have a ramped section that is tapered for loading the shuttle onto the elevator platform.

Aspect 36 generally concerns the system of aspect 33 in which the elevator platform includes one or more retention brackets configured to retain the shuttle during movement.

Aspect 37 generally concerns the system of aspect 33 in which the elevator includes a mezzanine entrance to transfer the shuttle to a mezzanine.

Aspect 38 generally concerns the system of any previous aspect in which the rack system includes a shuttle frame where the shuttle travels along the racks.

Aspect 39 generally concerns the system of any previous aspect in which the shuttle is configured to move independently outside of the rack system.

Aspect 40 generally concerns the system of any previous aspect in which the shuttle includes one or more steerable wheels that are powered by the shuttle.

Aspect 41 generally concerns the system of any previous aspect in which the wheels each include a pinion and a drive wheel.

Aspect 42 generally concerns the system of any previous aspect in which the shuttle frame includes a vertical elevator rail with teeth configured to engage the pinion.

Aspect 43 generally concerns the system of any previous aspect in which the shuttle switch configured to change movement of the shuttle between vertical and horizontal movement.

Aspect 44 generally concerns the system of any previous aspect in which the shuttle switch includes a turntable with a straight track located between opposing curved tracks.

Aspect 45 generally concerns the system of any previous aspect in which the shuttle frame includes an intersection where the shuttle turns horizontally with the wheels.

Aspect 46 generally concerns the system of any previous aspect in which the intersection includes one or more rail channels with turn shoulders in which the drive wheel is received.

Aspect 47 generally concerns the system of any previous aspect in which the shuttle includes an Energy Storage System (ESS).

Aspect 48 generally concerns the system of any previous aspect in which the wheels are configured to form an electrical circuit with rails to charge the ESS.

Aspect 49 generally concerns the system of any previous aspect in which the shuttle has a container holder and a rack container platform.

Aspect 50 generally concerns the system of any previous aspect in which the rack container platform has a lift mechanism configured to move the rack container platform vertically.

Aspect 51 generally concerns the system of any previous aspect in which the rack container platform has an extendable conveyor configured to extend to an extended position in the racks.

Aspect 52 generally concerns the system of any previous aspect in which the shuttle includes an extendable belt conveyor configured to extend to an extended position.

Aspect 53 generally concerns the system of any previous aspect in which the shuttle includes a lift mechanism configured to vertically move a rack container platform.

Aspect 54 generally concerns the system of any previous aspect in which the lift mechanism is configured to raise the rack container platform above the shuttle.

Aspect 55 generally concerns the system of any previous aspect in which the lift mechanism is configured to lower the rack container platform below the shuttle.

Aspect 56 generally concerns the system of any previous aspect in which the lift mechanism is configured to move the rack container platform above and below the shuttle.

Aspect 57 generally concerns the system of any previous aspect in which the robot arm includes an End of Arm Tool (EoAT) with a shark fin finger to grip the items.

Aspect 58 generally concerns the system of any previous aspect in which the shark fin finger includes a tip vacuum cup.

Aspect 59 generally concerns the system of any previous aspect in which the shark fin finger includes a grip pad with one or more vacuum ports.

Aspect 60 generally concerns the system of any previous aspect in which the EoAT includes an extendable palm vacuum cup that is configured to extend from the EoAT.

Aspect 61 generally concerns the system of any previous aspect in which the tote with an internal separator supported on the shuttle.

Aspect 62 generally concerns the system of any previous aspect in which the internal separator includes a monolayer web configured to separate the items.

Aspect 63 generally concerns the system of any previous aspect in which the monolayer web includes a grid of elastic bands.

Aspect 64 generally concerns the system of any previous aspect in which the grid has a perpendicular array of the elastic bands to separate the items.

Aspect 65 generally concerns the system of any previous aspect in which the shuttle is configured to map position of the items in the tote for blind picking.

Aspect 66 generally concerns the system of any previous aspect in which the tote is configured to store multiple different kinds of Stock Keeping Units (SKUs).

Aspect 67 generally concerns the system of any previous aspect in which the internal separator is configured to hold a uniform array of the items with the same Stock Keeping Unit (SKU).

Aspect 68 generally concerns the system of any previous aspect in which the shuttle includes a vision system for picking dense random storage of the items in the tote.

Aspect 69 generally concerns the system of any previous aspect in which the rack system includes an elevator with an elevator platform configured to vertically move the shuttle.

Aspect 70 generally concerns the system of any previous aspect in which the elevator platform includes one or more rails that support the shuttle.

Aspect 71 generally concerns the system of any previous aspect in which the rails have a ramped section that is tapered for loading the shuttle onto the elevator platform.

Aspect 72 generally concerns the system of any previous aspect in which the elevator platform includes one or more retention brackets configured to retain the shuttle during movement.

Aspect 73 generally concerns the system of any previous aspect in which the elevator includes a mezzanine entrance to transfer the shuttle to a mezzanine Aspect 74 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
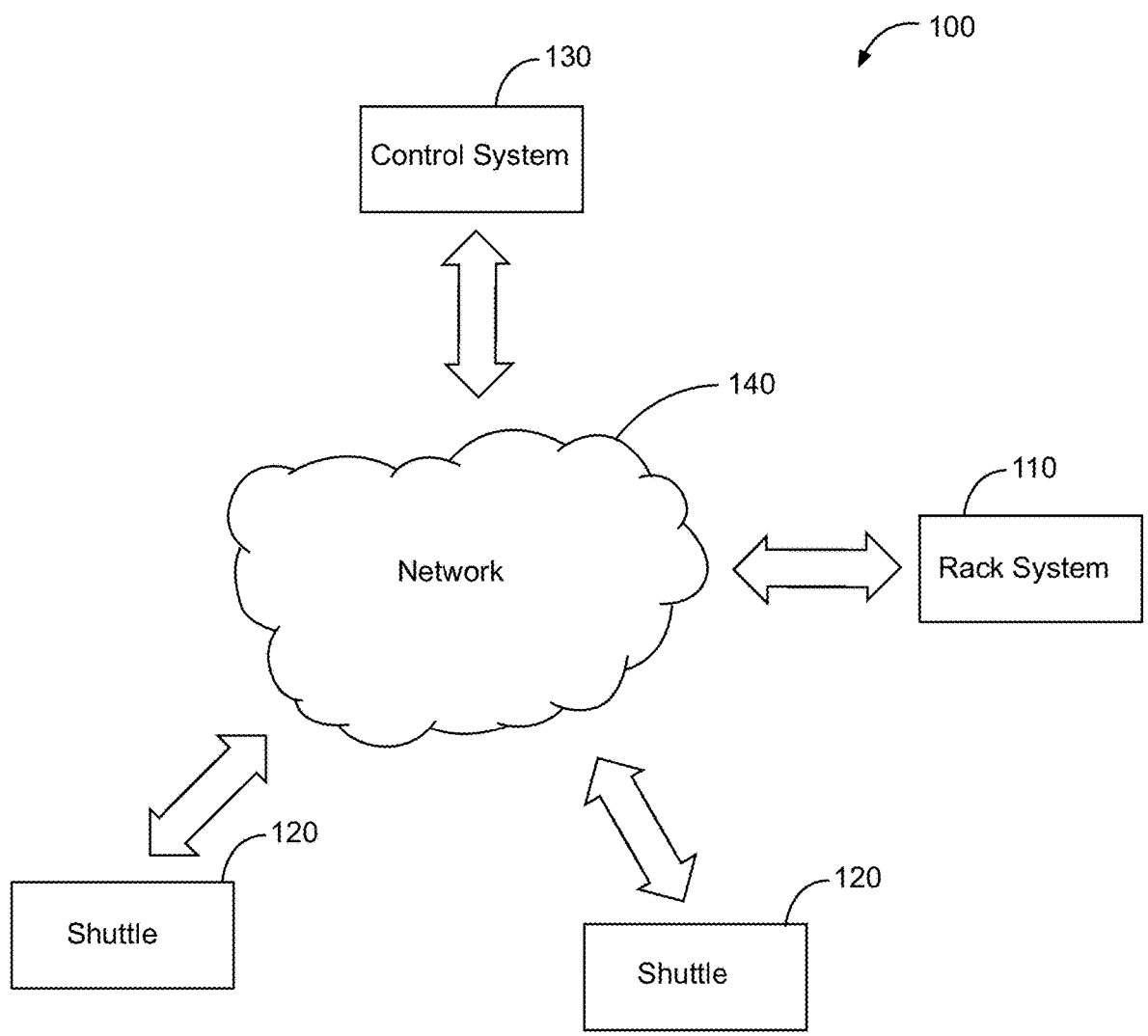
FIG. 1 is a diagrammatic view of a robotic shuttle system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A robotic shuttle system 100 will now be described with reference to FIG. 1. As shown, the robotic shuttle system 100 includes a rack system 110, one or more shuttles 120, and a control system 130 that are operatively connected to one another through a network 140. The control system 130 assists in controlling the operation of the rack system 110 and the shuttles 120. In addition, the control system 130 collects data provided by the shuttles 120 and the rack system 110. The shuttles 120 are configured to operate autonomously and/or semi-autonomously relative to one another so as to store and retrieve items stored in the rack system 110.

Figure 2:
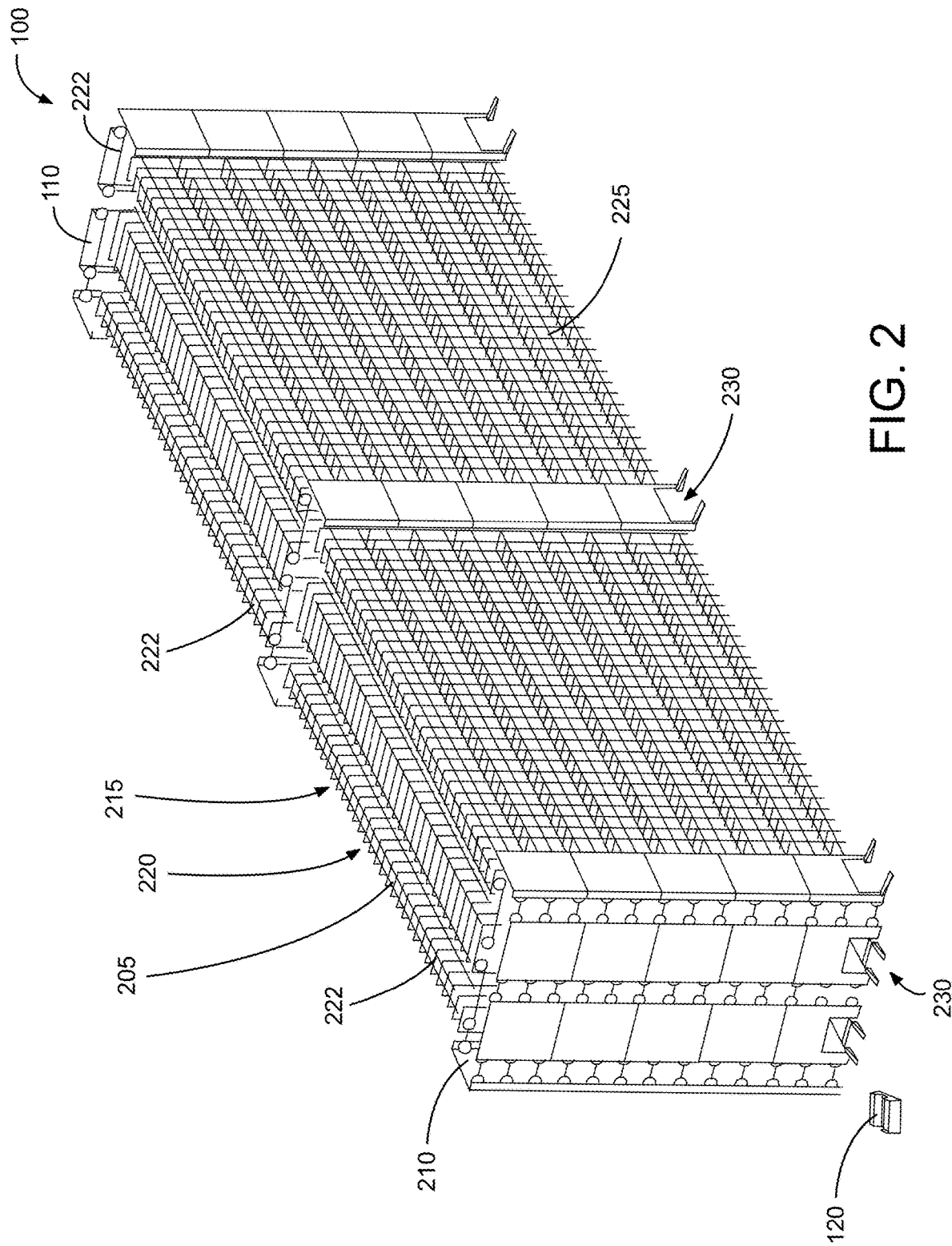
FIG. 2 is a perspective view of the FIG. 1 robotic shuttle system.

Turning to FIG. 2, the rack system 110 includes one or more racks 205 on which items are stored, and a shuttle frame 210 on which the shuttles 120 are able to travel along the racks 205. As shown, the racks 205 include a series of storage rows 215 in which items are stored. The storage rows 215 of the rack 205 extend horizontally to form a series of rack columns 220 with rack ends 222. In the illustrated example, the racks 205 extend vertically to form one or more rack levels 225. In other examples, the racks 205 can be configured differently such as having fewer or more rows 215, columns 220, and/or rack levels 225.

The shuttle frame 210 allows the shuttles 120 to travel along the rack 205 and service the various storage rows 215, rack columns 220, and rack levels 225. The shuttle frame 210 includes one or more rack access passages 230 through which the shuttles 120 are able to enter or exit the rack system 110. The shuttles 120 are able to independently move along the floor outside of the rack system 110 so as to transfer items between various external service locations and the rack system 110.

Figure 3:
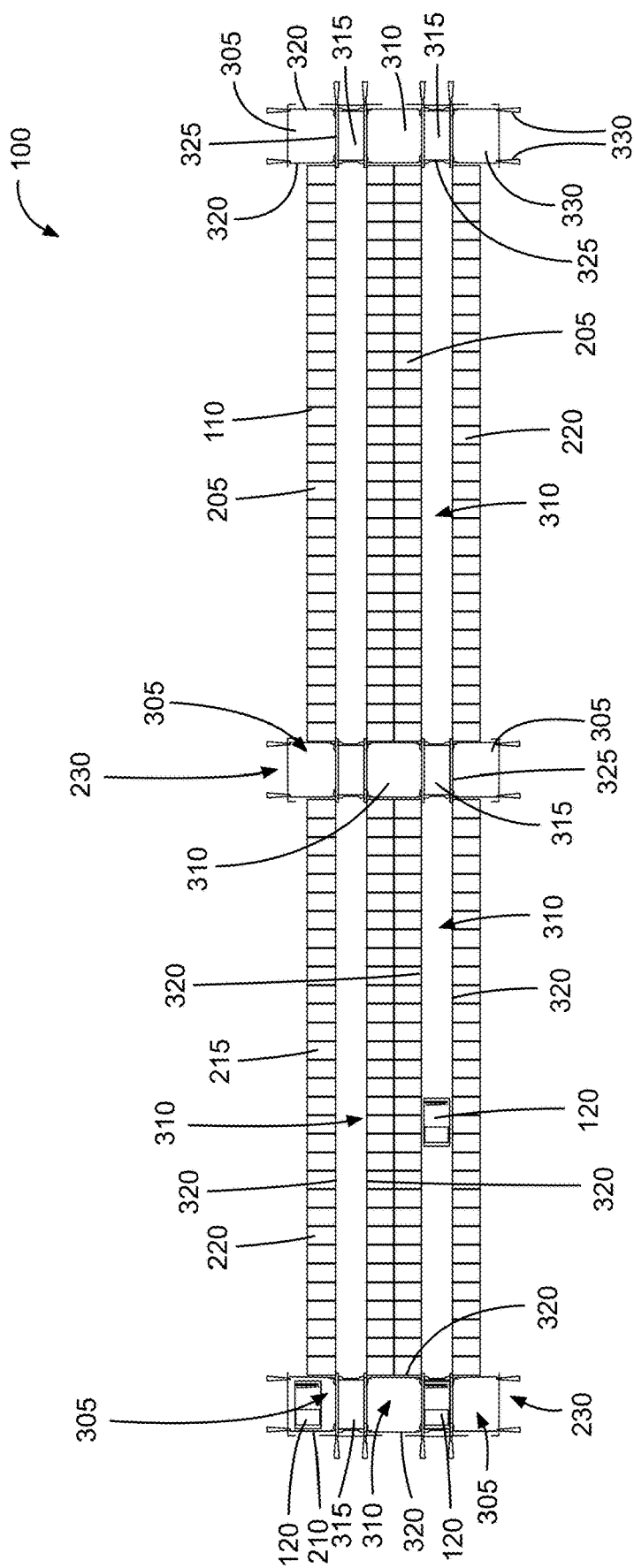
FIG. 3 is a top perspective view of the FIG. 1 robotic shuttle system.
Figure 4:
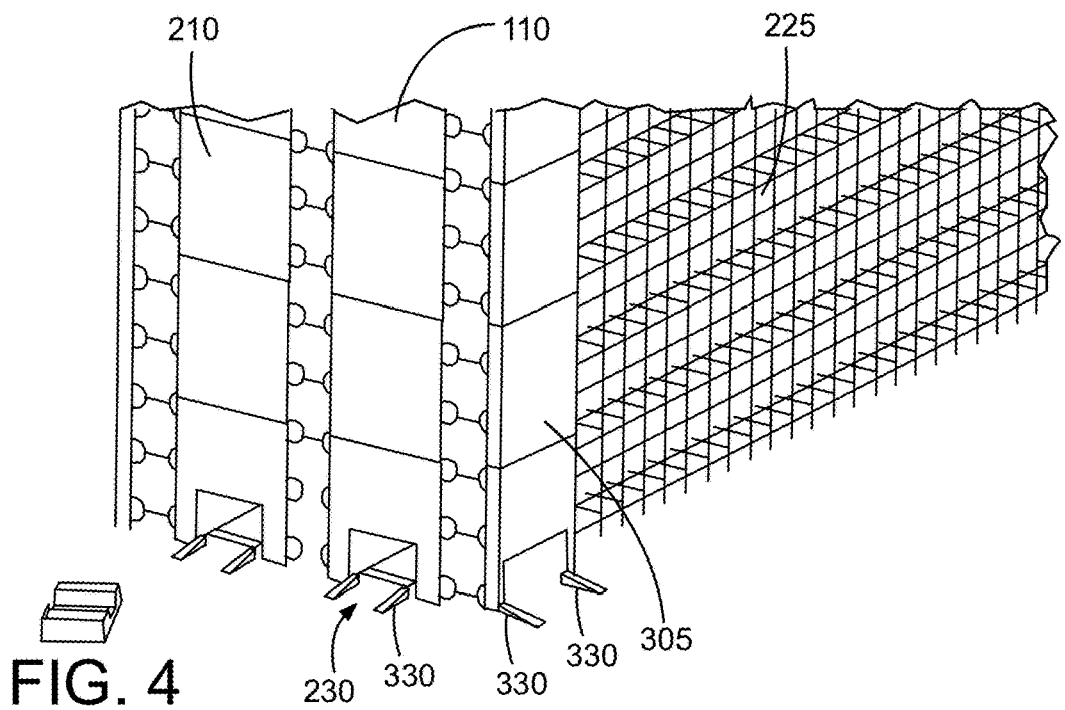
FIG. 4 is an enlarged perspective view of the FIG. 1 robotic shuttle system.

Looking at FIGS. 3 and 4, the shuttle frame 210 includes a one or more elevator sections 305 that allow the shuttle 120 to move vertically so as to access the various rack levels 225 in the rack system 110. As shown, the shuttle frame 210 further includes one or more travel lanes 310 that allow the shuttle 120 to travel along the rack columns 220 and around the ends of the racks 205 so that the shuttle 120 is able to access the various storage rows 215 along the racks 205 at particular rack levels 225. Where the elevator sections 305 and/or travel lanes 310 meet one another, the shuttle frame 210 has intersections 315 that are designed to allow the shuttles 120 to change their direction, horizontally and/or vertically. In the illustrated example, the shuttle frame 210 has travel lanes 310 sandwiched between rack columns 220. The travel lanes 310 also extend across the ends of the racks 205 to allow the shuttles 120 to access other travel lanes 310 that are located between other rack columns 220. In other examples, the travel lanes 310 can be located elsewhere such as long the outside or periphery of the racks 205 such that the travel lane 310 is not located between rack columns 220. Along the travel lanes 310, the shuttle frame 210 has rack rails 320 located on opposite sides of the shuttle 120. In some examples which will be described below, the rack rails 320 have teeth that engage with the pinion gear or pinion wheel on the shuttle 120 so as to enhance traction. In other examples, the rails 320 are smooth and lack teeth. At the intersection 315, the shuttle frame 210 has turn rails 325 that are configured to allow the shuttle 120 to change its horizontal travel direction. As will be explained below, the turn rails 325 are configured to engage the outer, larger wheel section of the shuttle 120 that is able to ride on the ground. The turn rails 325 are arranged in a straight, rectangular fashion and include turning shoulders that facilitate or allow rotation of the wheels of the shuttle 120. In other examples, the turn rails 325 can be oriented and/or shaped differently than is illustrated. For instance, the turn rails 325 in other variations can have curved shapes. The shuttle frame 210 at the rack access passages 230 has access rails 330 that are angled so as to allow the shuttles 120 to ride up into the shuttle frame 210 or down out of the shuttle frame 210. In the illustrated examples, each rack access passage 230 has two opposing access rails 330 that are engaged by wheels on opposing sides of the shuttle 120.

Figure 5:
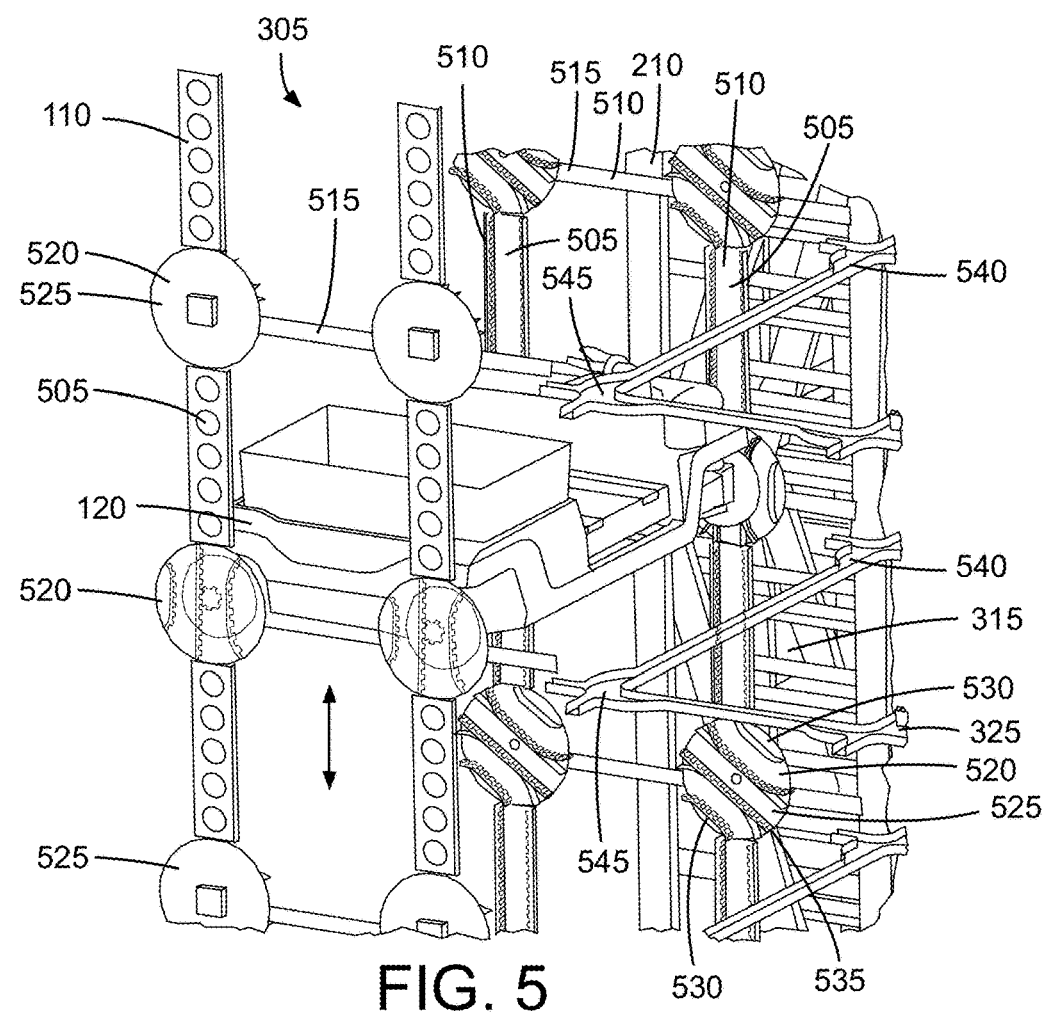
FIG. 5 is an enlarged perspective view of a rack and shuttle in the FIG. 1 robotic shuttle system.

Upon entering the rack access passage 230, the shuttle 120 is able to travel vertically (i.e., up or down) via the elevator sections 305 of the shuttle frame 210. The shuttles 120 are then able to transition from the elevator sections 305 onto one of the intersections 315. From the intersection 315, the shuttle 120 is able to turn via the turn rails 325 down a particular travel lane 310 located between rack columns 220, or the shuttle 120 can travel along one of the travel lanes 310 located at the end of the racks 205 so as to access a different travel lane 310 that travels along the rack columns 220. FIG. 5 shows of an enlarged view of one example of the shuttle 120 traveling vertically along the elevator section 305 of the shuttle frame 210. As illustrated, the elevator section 305 includes elevator rails 505 that extend vertically to facilitate travel of the shuttle 120 in vertical directions. The elevator rails 505 include rack sections 510 having teeth that are configured to engage the pinion wheels of the shuttle 120 so as to facilitate vertical movement. The shuttle frame 210 in the elevator section 305 can have transition rails 515 with rack sections 510 configured to engage the pinion wheels of the shuttle. As shown, the transition rails 515 extend transverse to the elevator rails 505 such that the transition rails 515 extend in a general horizontal direction. Between the elevator rails 505 and the transition rails 515, the elevator section 305 has one or more shuttle switches 520 that are able to change the movement of the shuttle 120 between a vertical direction and a horizontal direction. The shuttle switch 520 is designed to facilitate not only vertical and horizontal movement of the shuttle 120, but the switch shuttle switch 520 also allows the shuttle 120 to transition from a vertical trajectory to a horizontal directory and vice versa. In one example, the switch 520 is actuated by the control system 130. In another example, the individual shuttles 120 are able to actuate the switch 520.

As shown, the shuttle switch 520 includes a turntable 525 with one or more curved track sections 530. In the illustrated example, the curved track sections 530 are curved in an opposing manner. That is, one of the curved track sections is concavely curved while the other is convexly curved. As shown, each curved track section 530 includes a side with teeth and an opposing side without teeth. Between the curved track sections 530, the turntable 525 of the shuttle switch 520 has a straight track section 535. Like the curved track sections 530, the straight track section 535 has one side with teeth and an opposing side without teeth that form a channel in which the wheels of the shuttle 120 are guided. The teeth in the track sections 530, 535 allow the wheels of the shuttle to engage and move vertically and/or horizontally depending on the specific requirements.

To allow vertical movement along the elevator rails 505, the shuttle switch 520 is rotated to align the straight track section 535 with the elevator rails 505. Once the shuttle 120 clears the shuttle switch 520, the shuttle switch 520 can be rotated so as to facilitate transitioning of the shuttle 120 from the elevator rails 505 to the transition rails 515 so as to facilitate horizontal movement of the shuttle 120. The curved track sections 530 are aligned with the transition rails 515 to form a pathway between the elevator rails 505 and the transition rails 515. The shuttle 120 then able to move from the elevator rails 505 to the transition rails 515 so as to facilitate horizontal movement. In a somewhat similar fashion, the shuttle switch 520 can be oriented so as to facilitate transitioning of the shuttle 120 from horizontal movement to a vertical movement along the elevator sections 305. The shuttle switch 520 is rotated such that the curved track section 530 is aligned with both the transition rails 515 as well as the elevator rails 505. A travel pathway then is formed between the transition rails 515 and the elevator rails of 505 on which the shuttle 120 is able to move from a horizontal direction to a vertical direction. In one example, the elevator sections 305 and/or travel lanes 310 are designated for travel in a single direction. For instance, one or more of the elevator sections 305 are designated to only allow travel in a single direction (e.g., up) and another set of elevator sections 305 can be designated for travel in the opposite direction (e.g., down). In another variation, some or all of the elevator sections 305 and/or travel lanes 310 allow travel in both directions. It should be recognized that in further variations the combination of these approaches can be used in which some only allow travel in a single direction while others allow travel in two or more directions.

As noted before, the intersections 315 have turn rails 325 that allow the shuttles 120 to change their horizontal travel direction. The turn rails 325 have rail channels 540 designed to receive the wheels of the shuttle 120. The rail channels 540 prevent the wheels from slipping off of the turn rails 325 and provide guidance. At the corners of the turn rails 325, the turn rails 325 have turn shoulders 545 that provide space for allowing turning of the wheels of the shuttle 120. In the illustrated example, the turn shoulders 545 have an arc shape that extends outwardly from the turn rails 325 such that when in the turn shoulders 545, the wheels of the shuttle 120 are able to turn.

Figure 6:
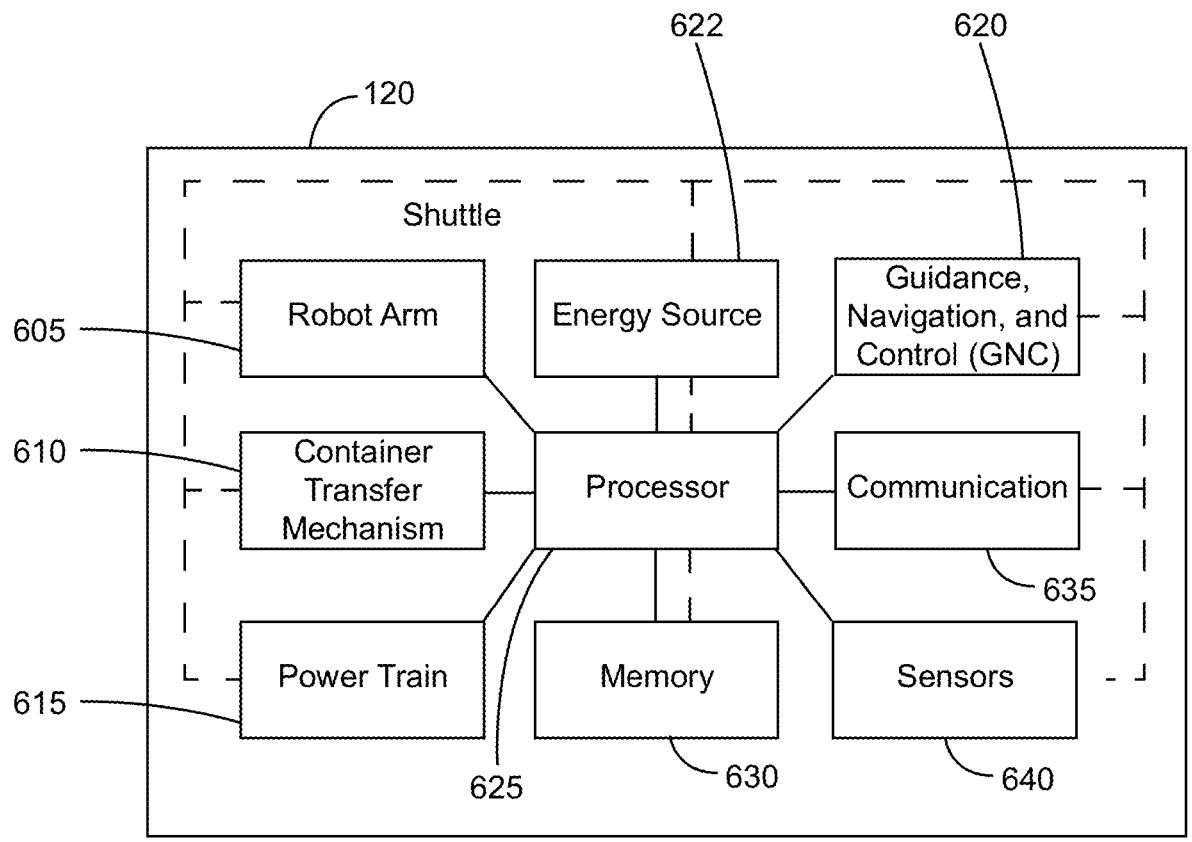
FIG. 6 is a diagrammatic view of a shuttle used in the FIG. 1 robotic shuttle system.

FIG. 6 shows a diagrammatic view of the shuttle 120. While FIG. 6 illustrates the components as being distinct from one another, it should be recognized that one or more of these components can be combined together to form an integral unit and/or selected components may be further subdivided and their function spread across multiple devices. As shown, the shuttle includes a robotic arm 605, a container transfer mechanism 610, a powertrain 615, a guidance system 620, and an energy source 622. The robot arm 605 is configured to pick or place items from various containers such as trays or totes located on the shuttle 120. The container transfer mechanism 610 is configured to load and unload containers, such as trays, from the racks 205 and onto the shuttle 120. The powertrain 615 is configured to move the shuttle 120 inside and outside of the rack system 110. A guidance, navigation, and control (GNC) system 620 controls the movement and directs the travel path of the shuttle 120. The energy source 622, such as a battery or super capacitor, provides energy to the various components of the shuttle 120, as is indicated by the dashed line in FIG. 6. The shuttle 120 further includes a processor 625, memory 630, a communication system 635, and one or more sensors 640. As shown, the processor 625 communicates with and controls the various components of the shuttle 120, and the memory 630 is used to store information from the processor 625 that concerns the shuttle 120, rack system 110, and/or other information. The communication system 635 is configured to communicate with the control system 130 and/or other shuttles 120 through the network 140. The communication system 635 in one example includes a radio transceiver, but in other variations, the communication system 635 can communicate in other ways. The sensors 640 are configured to sense the environment surrounding the shuttle as well as internal functions or parameters within the shuttle 120. For example, the sensors 640 can include vision systems, light curtains, proximity sensors, thermocouples, and/or other types of sensors. In the illustrated example, the robot arm 605, the container transfer mechanism 610, the powertrain 615, the GNC system 620, the energy source 622, memory 630, the communication system 635, and sensors 640 are operatively connected to the processor 625. It should be recognized that these components of the shuttle 120 can be connected in other manners. For instance certain components can be alternatively or additionally operatively connected to one another such that the components can directly communicate with one another without the processor 625. Moreover, the various components of the shuttle 120 can be powered in other manners than is it is illustrated.

Figure 7:
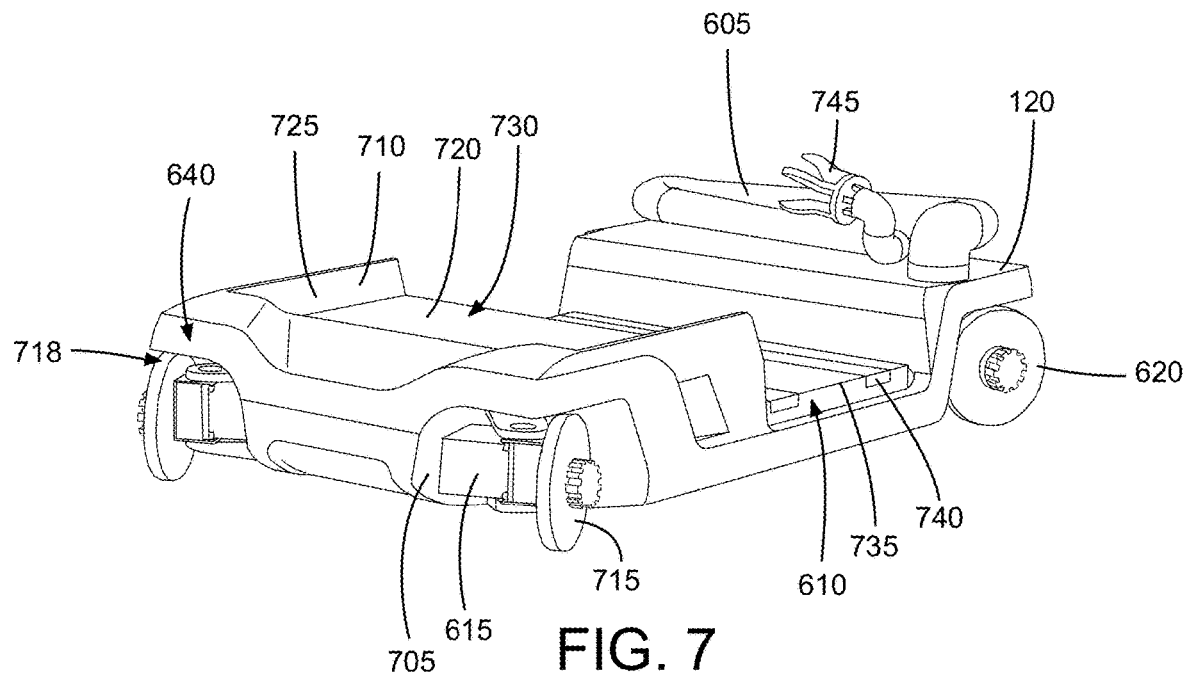
FIG. 7 is a front perspective view of a shuttle used in the FIG. 1 robotic shuttle system.
Figure 8:
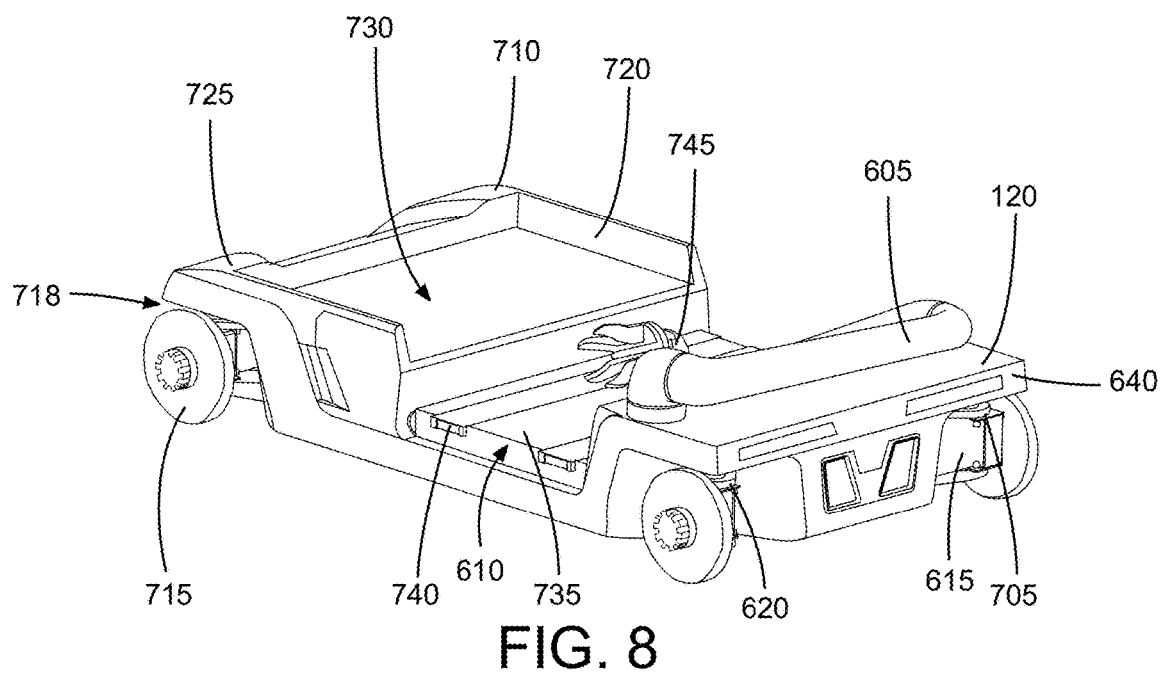
FIG. 8 is a rear perspective view of the FIG. 7 shuttle.

FIGS. 7 and 8 respectively show front and rear perspective views of one example of the shuttle 120. As can be seen, in addition to the robot arm 605, the container transfer mechanism 610, the powertrain 615, the GNC system 620, and the sensors 640, the shuttle 120 includes the other components depicted in FIG. 6. The shuttle 120 includes a chassis 705, and a body 710 mounted to the chassis 705. Portions of the powertrain 615 and/or the GNC system 620 are incorporated into one or more wheel assemblies 715. The wheel assemblies 715 are turnably mounted to the chassis 705 such that the wheel assemblies 715 are able to move and steer the shuttle 120. The wheel assemblies 715 in the shuttle 120 are designed to turn independently of one another when required to allow the shuttle 120 to turn or change the horizontal direction of the shuttle 120 when in the shuttle frame 210. Since the space is typically tight within the rack system 110, the shuttle 120 is unable to usually make wide turns. To facilitate a zero turning radius turn within the shuttle frame 210, the wheel assemblies 715 on opposing sides are able to turn in opposite directions at least ninety degrees (90°) relative to the body 710 of the shuttle 120. The body 710 of the shuttle 120 has wheel wells 718 that form notches the corners of the shuttle 120 to allow this turning and allow the wheel assemblies 715 to move the shuttle 120 in a horizontal direction that is transverse or perpendicular to the original travel direction. When outside (or even inside) the rack system 110, the wheel assemblies 715 can turn in unison to steer the shuttle 120 when travelling on the floor or ground, for example. The robot arm 605 and the container transfer mechanism 610 are likewise mounted to the chassis 705 along with the other internal components of the shuttle 120.

As can be seen, the body 710 includes a container holder 720 on which one or more containers can be supported. The container holder 720 has one or more holder walls 725 that forms a container cavity 730 in which the container is received. The holder walls 725 of the container holder 720 reduce the risk of a container sliding off the shuttle 120 during movement as well help to fix the location of the container during robotic picking and/or placing items into the container. The container transfer mechanism 610 is located between the robot arm 605 and the container holder 720. The container transfer mechanism 610 has a rack container platform 735 on which trays, totes and/or other containers or objects are loaded from the racks 205. The container transfer mechanism 610 further includes one or more extendable conveyors 740 that are able to extend laterally from the shuttle 120 at a position underneath the target tray from the storage row 215 in the rack 205. In one example, the container transfer mechanism 610 includes a pair of extendable conveyors 740, each of which being extendable belt conveyors. In another example, the extendable conveyor can include other types of conveyors or simply be forks for drawing the tray onto the shuttle 120. The extendable conveyor 740 is able to extend from both sides of the shuttle 120 so as to service racks 205 located on opposite sides of the shuttle 120. As will be explained below, the container transfer mechanism 610 is able to extend vertically, both above and below the shuttle 120 such that the shuttle 120 is able to service rack levels 225 that are above or below the rack level 225 where the shuttle 120 is located. The robot arm 605 includes an End of Arm Tool (EoAT) 745 that is able to grab or otherwise manipulate objects such as items. In one example, the robot arm 605 includes a six-axis robot arm, but other types of robot arms can be used in other examples. The robot arm 605 along with the EoAT 745 transfer items between the containers on the rack container platform 735 and the container holder 720.

Figure 9:
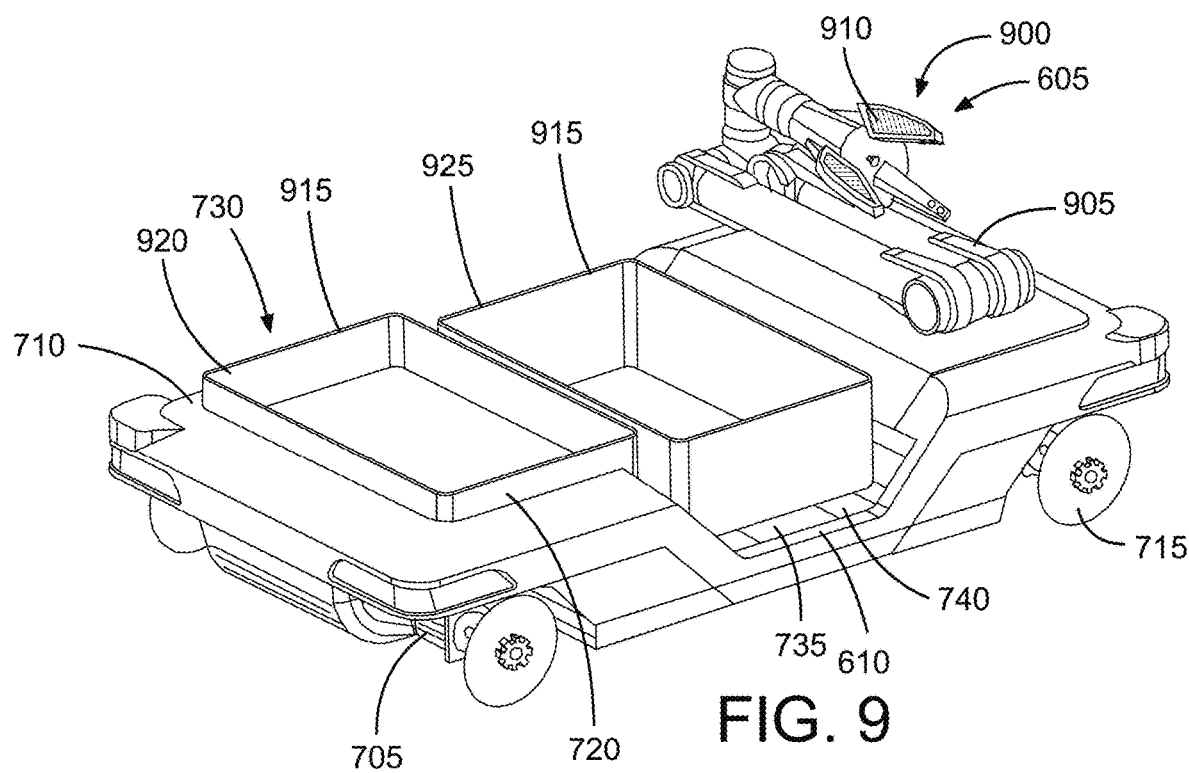
FIG. 9 is a front perspective view of a shuttle used in the FIG. 1 robotic shuttle system.

FIG. 9 illustrates another example of a shuttle 900 that operates in the rack system 110 of the robotic shuttle system 100. The shuttle 900 contains the same components as discussed before with respect to FIGS. 6, 7, and 8, and only the differences between the two will be described below. For example, the shuttle 900 includes the chassis 705, body 710, wheel assembly 715, container holder 720, container cavity 730, rack container platform 735, and extendable conveyor 740 as described above with respect to the shuttle 120 depicted in FIGS. 7 and 8. Likewise, the shuttle 900 includes the components and subcomponents of the shuttle 120 depicted in FIG. 6. As can be seen, the shuttle 900 includes a robot arm 905 with a unique EoAT 910. As shown in FIG. 9, the shuttle 900 has one or more containers 915 loaded on the container holder 720 and the rack container platform 735. It should be recognized that the containers 915 can be the same in terms of size, shape, configuration, etc., or different. In the illustrated example, the container 915 that is residing on the shuttle 900 (or 120) in the container holder 720 is a tray 920, and the container 915 on the rack container platform is a tote 925. The location of the trays 920 and totes 925 on the shuttle 900 (or 120) can be reversed. For example, the trays 920 can be stored on the racks 205 and totes 925 can be positioned in the container holder 720. Moreover, other types of containers 915 besides those illustrated in the drawings can be used in the robotic shuttle system 100. It should be also recognized that the same type of containers 915 can be used at both locations on the shuttle 900.

Figure 10:
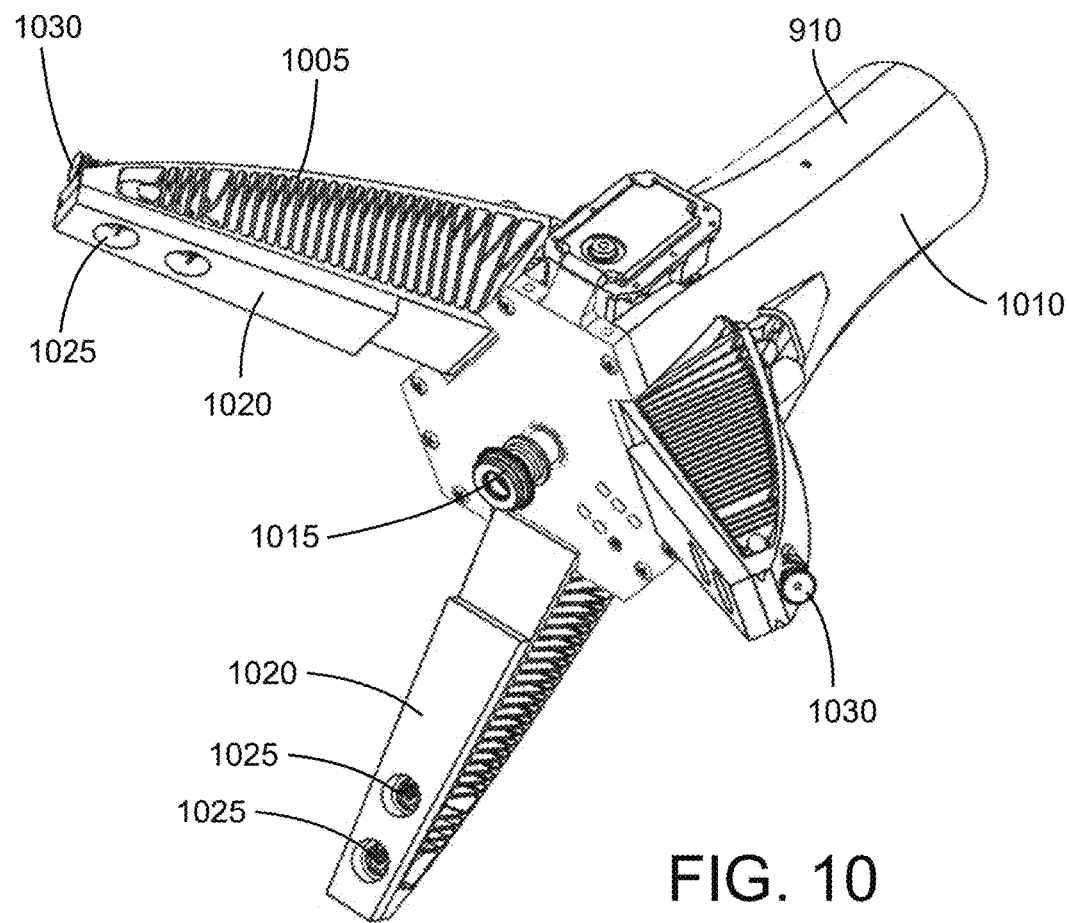
FIG. 10 is a perspective view of an End of Arm Tool (EoAT) of the FIG. 9 shuttle.

FIG. 10 shows a perspective view of the EoAT 910 shown in FIG. 9 in an open position. This unique EoAT 910 is further described in U.S. Provisional Patent Application No. 62/593,779, filed Dec. 1, 2017, entitled "End Effector" which is hereby incorporated by reference in its entirety. The EoAT 910 is designed for manipulating items and includes a unique combination of shark fin grippers with strategically placed vacuum cups. As particularly shown, the EoAT 910 includes one or more shark fin fingers or gripping members 1005 that are pivotally connected to a hub 1010. In the illustrated in example, the EoAT 910 includes three shark fin fingers 1005, but other examples can include more or less shark fin fingers than is shown. The EoAT 910 further includes an extendable palm vacuum cup 1015 that is able to extend in a telescoping manner from the hub 1010 to pick up relatively small or fragile items not suitable for picking by the shark fin fingers 1005. The shark fin fingers 1005 are generally flexible in nature and include grip pads 1020 that are made of an elastomeric material. The grip pads 1020 define one or more vacuum ports 1025 that are able to create a vacuum (i.e., an area of low pressure) to grip items. At the tip, each shark finger 1005 has a tip vacuum cup 1030 that is designed to pick up relatively small items with vacuum or suction. This unique combination allows the EoAT 910 to pick a wide variety of items both large and small as well as those that are difficult to handle. For example, the EoAT 910 allows individual products to be picked up via the shark fin fingers 1005 that close together to grip the item. In another example, a vacuum pickup can occur via the extendable palm vacuum cups 1015 and or the vacuum ports 1025 which is then followed by using the shark fingers 1005 gripping together to further secure the item. A single gripping option can be used where the tip vacuum cups 1030 are used alone, and in another variation, a multi-tipped configuration can be used in which the tip vacuum cups 1030 are brought closer together and all of the tip vacuum cups 1030 are used to pick up the individual items. A single tip vacuum cup 1030 can be used to pick up individual items as well. Of course, there other ways in which the EoAT 910 can pick and/or manipulate items.

Figure 11:
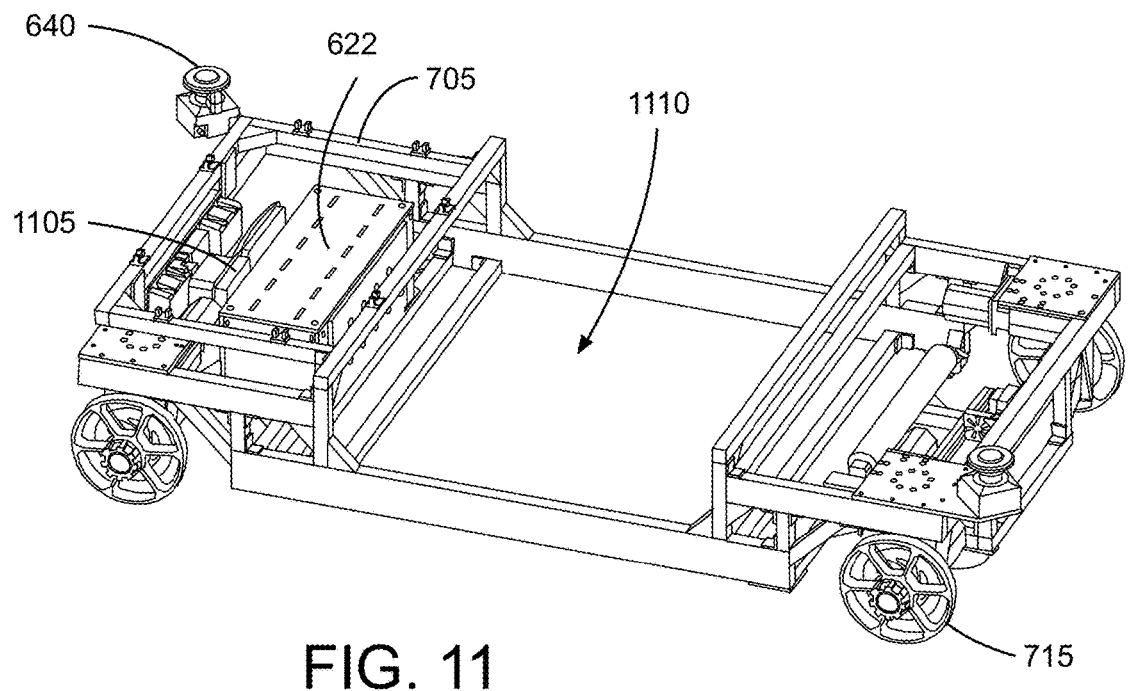
FIG. 11 is a top perspective view of a shuttle chassis.
Figure 12:
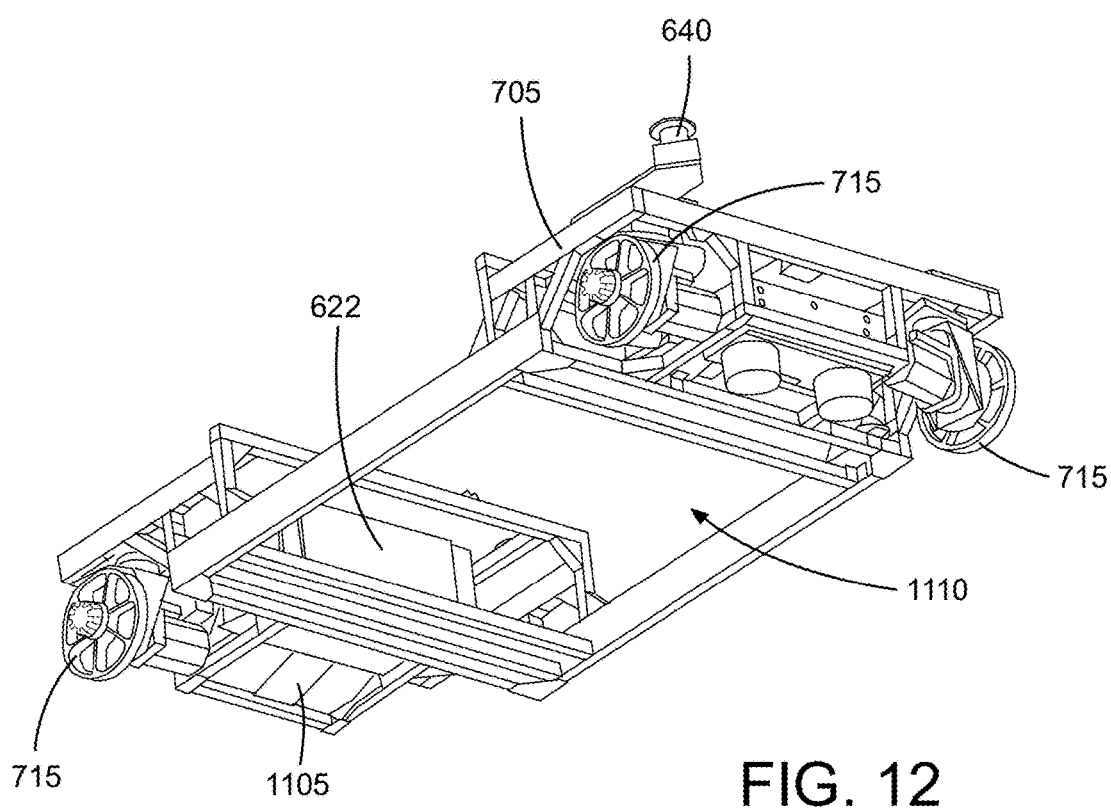
FIG. 12 is a bottom perspective view of the FIG. 11 shuttle chassis.

For the purpose of explanation, the components, both internal and external to both shuttles 120 and 900, will be described together in the following drawings with respect to the shuttle 120 shown in FIGS. 7 and 8, for the sake of clarity. Both shuttles 120, 900 as noted before share common components and function generally in the same manner within the robotic shuttle system 100. The discussion below of the various subcomponents and operational methods with reference to the FIG. 7 shuttle 120 equally applies to the FIG. 9 shuttle 900. FIGS. 11 and 12 respectively show top perspective and bottom perspective views of the shuttle 120 (900) with the body 710 and other selected components removed from the shuttle 120. As depicted, the power source 622, sensors 640, and wheel assembly 715 are mounted to the chassis 705. A shuttle controller 1105 in the form of a computer that includes the processor 625 and memory 630 is also mounted to the chassis 705. The controller 1105 controls the operation of the components of the shuttle 120. The chassis 705 defines a lift cavity 1110 in which a lift mechanism of the container transfer mechanism 610 is received.

Figure 13:
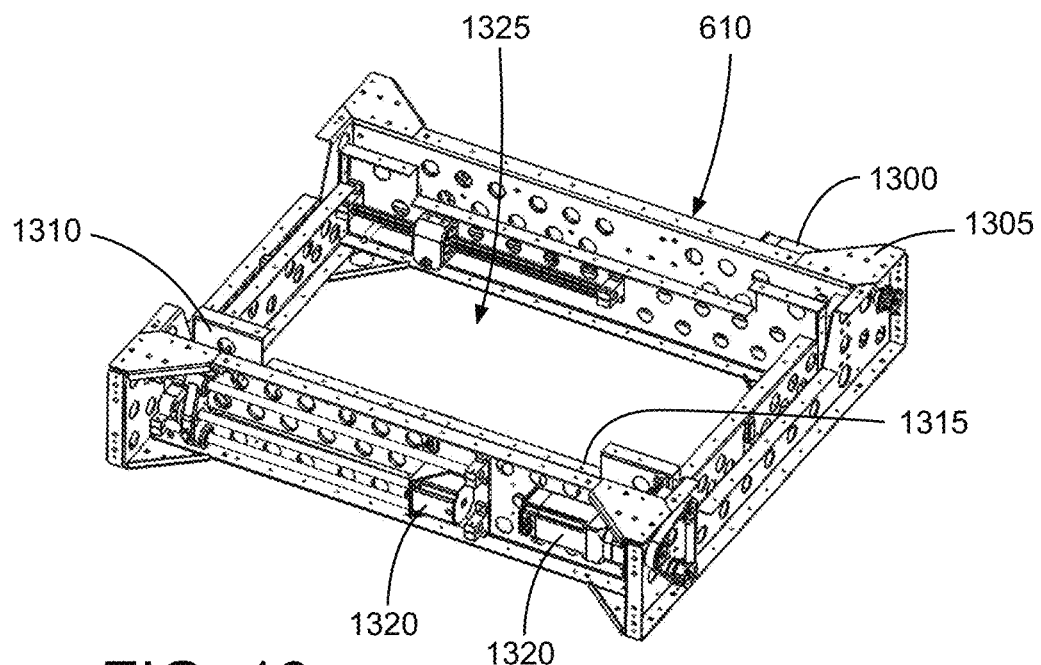
FIG. 13 is a top perspective view of a lift mechanism for a shuttle.
Figure 14:
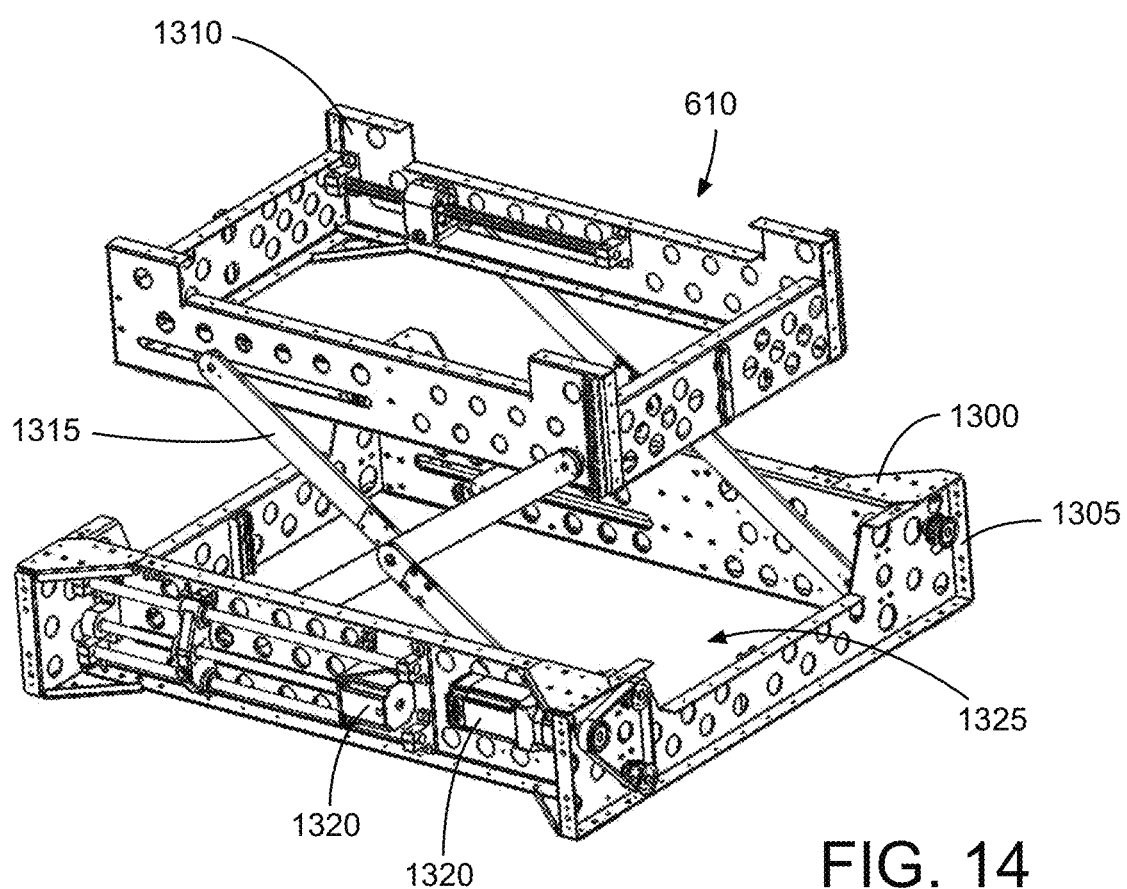
FIG. 14 is a top perspective view of the FIG. 13 lift mechanism in a raised position.
Figure 15:
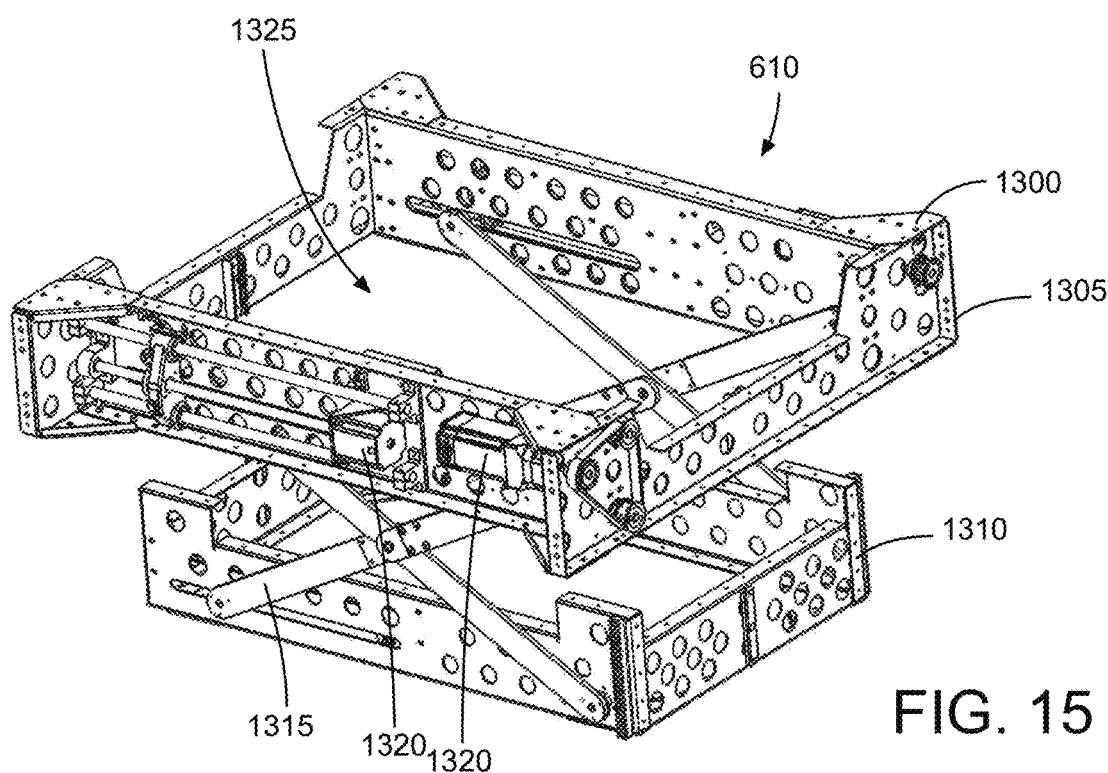
FIG. 15 is a top perspective view of the FIG. 13 lift mechanism in a lowered position.

A lift mechanism 1300 for the container transfer mechanism 610 that is secured inside the lift cavity 1110 of the chassis 705 will now be described with reference to FIGS. 13, 14, and 15. The unique design of the illustrated lift mechanism 1300 allows the rack container platform 735 to extend above and below the shuttle 120. The unique design of the lift mechanism 1300 is further described in US Provisional Patent Application No. 62/593,800, filed Dec. 1, 2017, entitled "Scissor Lift" which is hereby incorporated by reference in its entirety. As shown, the lift mechanism 1300 includes a base 1305, a platform support frame 1310, and a scissor linkage assembly 1315 operatively connecting the base 1305 to the platform support frame 1310. The lift mechanism 1300 further includes one or more actuator motors 1320 that are configured to articulate the scissor linkage assembly 1315 so as to raise or lower the platform support frame 1310 relative to the base 1305. The base 1305 is connected or secured to the chassis 705 at the lift cavity 1110. The base 1305 defines a platform cavity 1325 in which the platform support frame 1310 is received when the lift mechanism 1300 is in a neutral configuration, such as is shown in FIG. 13. Turning to FIG. 14, the actuator motors 1320 can be used to move or actuate the scissor linkage assembly 1315 so as to raise the platform support frame 1310 relative to the base 1305. The shuttle controller 1105 can lower the rack container platform 735 by actuating the actuator motors 1320 so as to cause the scissor linkage assembly 1315 to lower the platform support frame 1310 below the base 1305, as is depicted in FIG. 15. In other examples, other types of actuators and linkage assemblies can be used to raise and lower the rack container platform 735.

Figure 16:
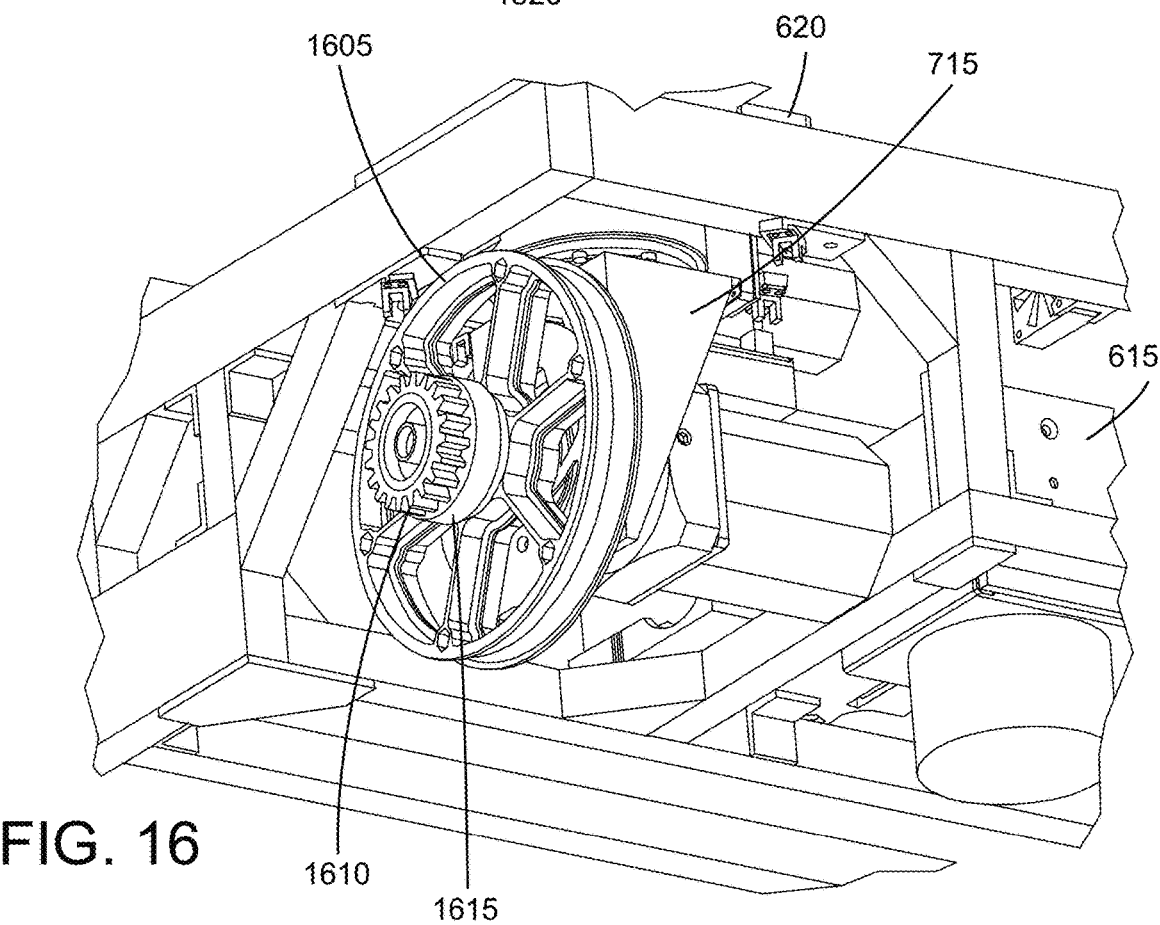
FIG. 16 is an enlarged perspective view of a drive assembly attached to the FIG. 11 shuttle chassis.

As noted before, the wheel assembly 715 incorporates portions of the powertrain 615 and GNC system 620. Portions of the powertrain 615 and GNC system 620 are incorporated into other components of the shuttle 120 such as in the shuttle controller 1105 and sensors 640. As shown in FIG. 16, the wheel assembly 715 includes a drive wheel 1605 that is configured to ride on the floor, ground, turn rails, and or other objects that that allow the shuttle 120 to be self-supported. The drive wheels 1605 can be a solid component, include spokes, and/or incorporate other components such as tires. Facing exterior to the drive wheels 1605, the wheel assembly 715 has one or more pinions 1610. The pinions 1610 are designed to engage the teeth sections of the track sections 530, 535 of the elevator section 305, rack rails 320, transition rails 515, shuttle switches 520, and/or other structure having teeth. The pinions 1610 have pinion teeth 1615 that engage the rack sections so as to provide traction as well as accurately control the position of the shuttle 120 when in the rack system 110. In one example, the drive wheel 1605 and pinion 1610 are able to be moved or rotated independently relative to one another. In another example, the drive wheel 1605 and pinion 1610 rotate in unison.

Figure 17:
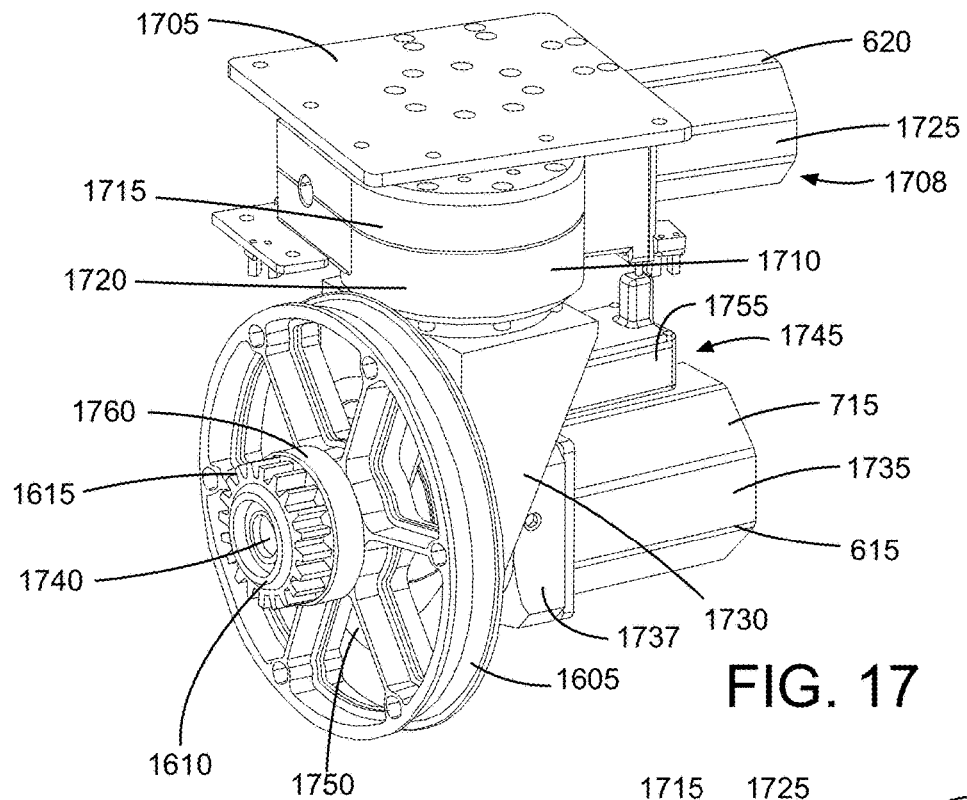
FIG. 17 is an enlarged perspective view of the FIG. 16 drive assembly.
Figure 18:
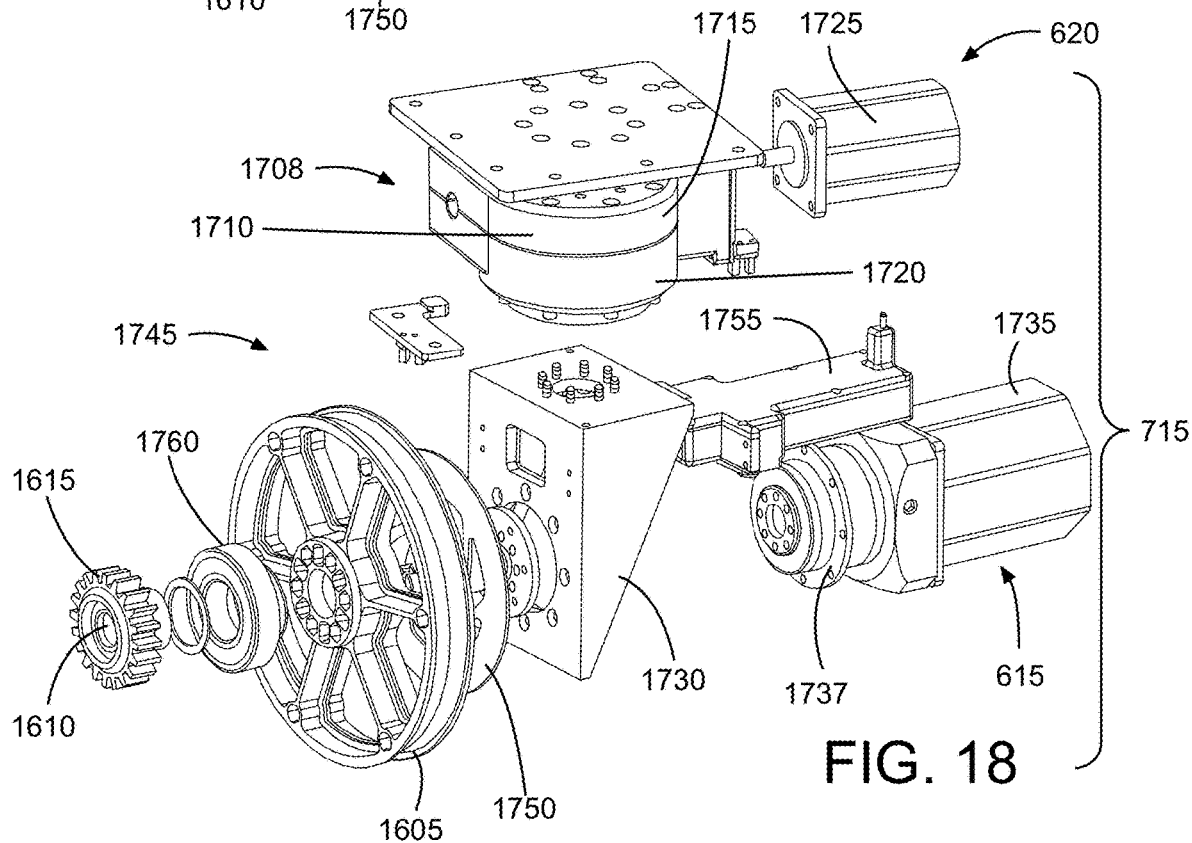
FIG. 18 is an exploded view of the FIG. 16 drive assembly.

Looking at FIGS. 17 and 18, the wheel assembly 715 has a mounting bracket 1705 where the wheel assembly 715 is attached to the chassis 705. The wheel assembly 715 includes a steering system 1708 that is used to steer the drive wheel 1605 and pinion 1610. In the illustrated example, the steering system 1708 includes a steering collar 1710 with a fixed section 1715 secured to the mounting bracket 1705 and a rotating section 1720 that is able to rotate relative to the fixed section 1715. The steering system 1708 further includes a steering motor 1725 that is configured to rotate the rotating section 1720 relative to the fixed section 1715. In one form, bearings and lubricant are positioned between the sections 1715, 1720 so as to reduce friction, but in other systems other mechanisms can be used to reduce friction. The steering motor 1725 in one variation is configured to rotate the rotating section 1720 of the steering collar 1710 through a rack and pinion type connection, but other types of connections can be used such as through a helical screw type thread type engagement between the steering motor 1725 and the rotating section 1720 of the steering collar 1710. The GNC system 620 of the shuttle controller 1105 controls the travel direction or steering of the shuttle 120 through the steering motor 1725. In one example, the steering motor 1725 includes a reversible electric motor, but other types of motors can be used in other examples. A wheel bracket 1730 is secured to the rotating section 1720 via fasteners. A drive motor 1735 with a gearbox 1737 which together forms part of the powertrain 615 is secured to the wheel bracket 1730. A drive shaft 1740 connects the drive wheel 1605 and pinion 1610 to the drive motor 1735. In one form, the drive motor 1735 includes a reversible electric motor so as to be able to rotate the drive wheel 1605 and pinion 1610 in opposite or different directions so as to change the velocity and/or direction of the shuttle 120. To control, slow down, and/or stop the shuttle 120, the wheel assembly 715 further includes a brake system 1745. As depicted, the brake system 1745 includes a brake disc 1750 that is engageable by a brake caliper system 1755. The brake system 1745 is able to hold the shuttle 120 at a fixed or steady location, such as when servicing one of the racks 205. Moreover, the brake system 1745 is able to quickly stop the shuttle 120 if needed. The illustrated example shows a disc brake type system, but in other variations, the shuttle 120 can include other types of brake systems 1745, such as drum type brakes or electromagnetic braking systems. As noted before, the wheel assembly 715 in one form is configured to allow the pinion 1610 to be rotated independently of the drive wheel 1605. In the illustrated example, the wheel assembly 715 includes a pinion bearing 1760 to facilitate this relative movement. In another variation, the drive wheel 1605 and pinion 1610 rotate in unison. In other approaches one or more of the drive wheels 1605 and/or pinions 1610 on the shuttle are unpowered and rotate freely. Of course, a combination of approaches can be used in further examples.

Figure 19:
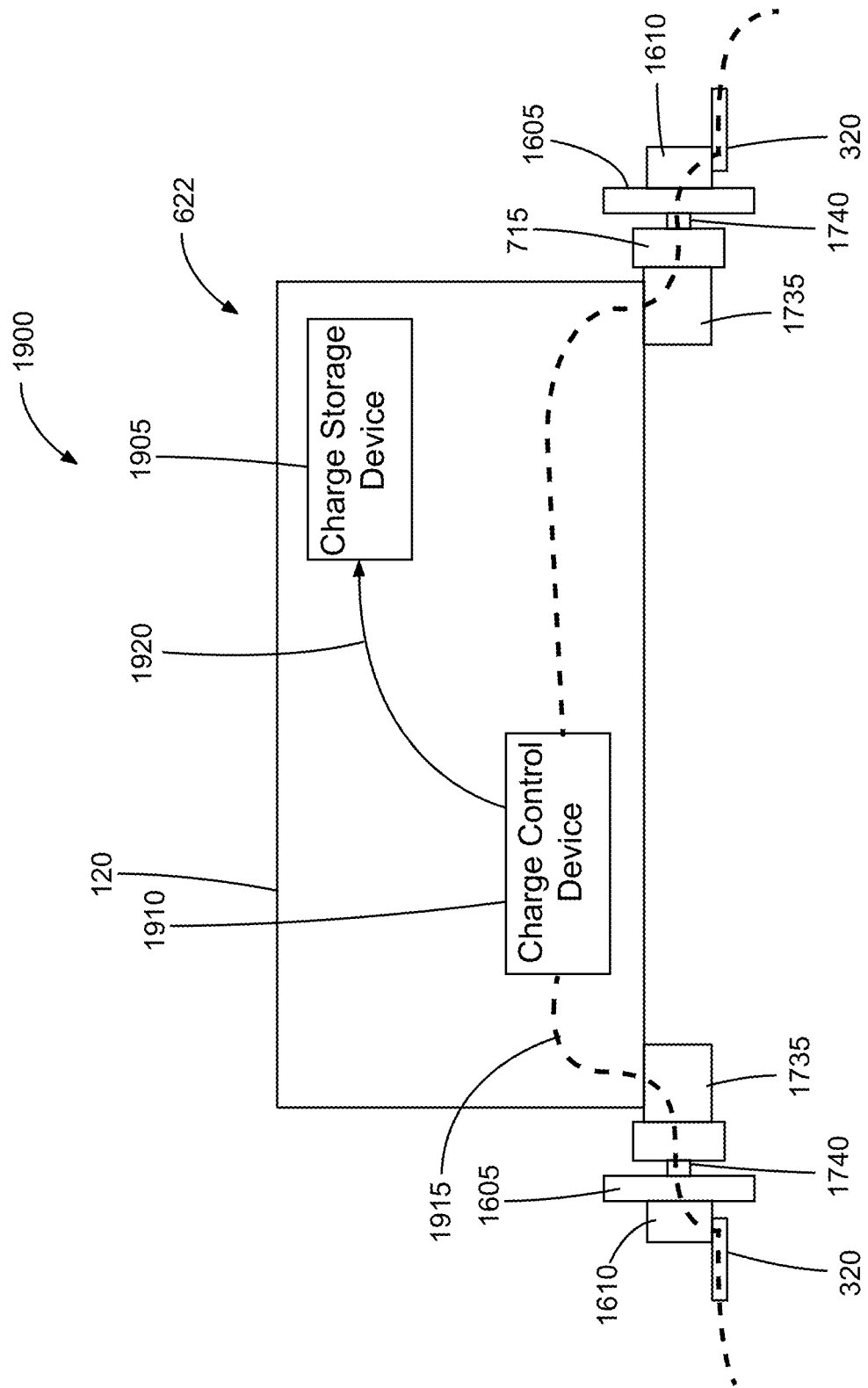
FIG. 19 is a diagrammatic view of a shuttle charging system.

A charging system 1900 for charging the energy source 622, such as a battery and/or capacitor, will now be described with reference to FIG. 19. The charging system 1900 corresponds to the charging systems described in US Provisional Patent Application No. 62/503,211, filed May 8, 2017, entitled "Charging System for Autonomous Mobile Unit" which is hereby incorporated by reference in its entirety. As shown, the charge in system 1900 includes a charge storage device 1905, such as a battery, and a charge control device 1910 that controls the amount of electrical power supplied to the charge storage device 1905 for recharging purposes. In the illustrated example, the rack rails 320 are electrically powered to form a circuit in order to charge the charge storage device 1905. In one form, direct current (DC) is applied between the rack rails 320, and in another example, alternating current (AC) is provided between the rack rails 320. An electrical flow path is indicated by dashed line 1915 in FIG. 19. In the illustrated example, the flow path 1915 travels from the rack rail 320 into the pinion 1610, through the drive wheel 1605 through the drive shaft 1740 and drive motor 1735. The electrical flow path 1915 flows through the charge control device and continues to flow in the opposite manner through the opposing drive motor 1735, drive shaft 1740, drive wheel 1605, pinion 1610 and to the opposing rack rail 320. The charge control device 1910 is electrically connected to the charge storage device 1905 through an electrical connection 1920. The electrical power provided by the flow path 1915 is converted by the charge control device 1910 and supplied via the electrical connection 1920 to the charge storage device 1905. It should be recognized that the flow path 1915 can float through different components in other examples.

Figure 20:
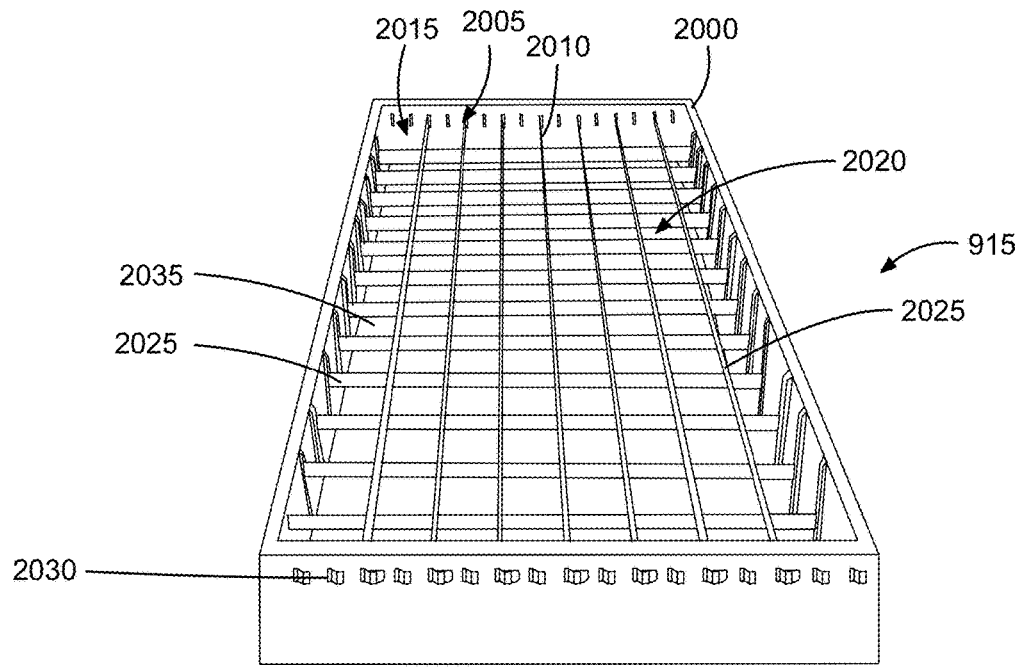
FIG. 20 is a top perspective view of a tote with a web management system.
Figure 21:
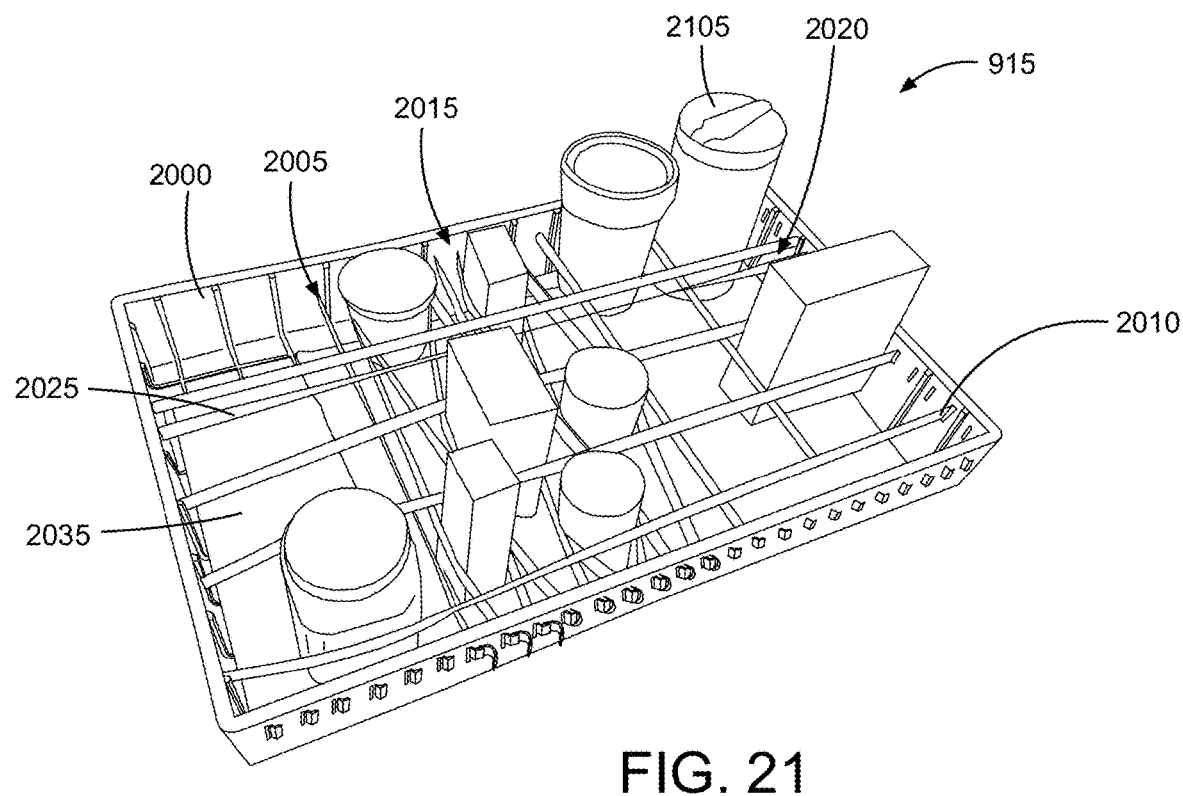
FIG. 21 is a top perspective view of the FIG. 20 tote with items held by the web management system.

Since the shuttle 120, 900 moves, items within the container 915 can shift, move, tip over, and/or fall out of the container 915. Items can also shift when the trays 920 are removed from the racks 205 or during reshelving. This shifting of items in the container 915 can make it difficult for the robot arm 605 from picking or putting items into the container 915. Moreover, the robot arm 605 further requires a vision system or other item location sensors in order to make adjustments so as to locate and manipulate the items within the container 915. Vision systems can be quite expensive and difficult to maintain. Turning to FIGS. 20 and 21 a container 2000 with a separator system 2005 for internally organizing items within the container 2000 has been developed. As shown, the separator system 2005 includes a separator web 2010 that stretches across an opening 2015 of the container 2000. The separator system 2005 defines web openings 2020 for receiving items. The separator web 2010 is formed by a network of elastic bands or cords 2025 that are interwoven or interlaced with one another. The elastic bands 2025 are made of an elastic material that allows the elastic bands 2025 to stretch and accommodate items of varying sizes as well as retain the items within the container 2000. The ends of the elastic bands 2025 are secured to the container 2000 by being secured to one or more web slots 2030 defined in the container 2000. In the illustrated example, the elastic bands 2025 are arranged or woven together in a generally uniform pattern in FIG. 20. The separator web 2010 is in the form of a monolayer within the container 2000 so as to form a single layer. It should be recognized that the container 2000 can include multiple layers of separator webs 2010 in other examples. The container 2000 further includes a skid pad 2035 at the bottom of the container 2000 to minimize slippage of items within the container 2000. The elastic bands 2025 can be rearranged depending on the requirements of a particular situation. For example, as is shown in FIG. 21, the elastic bands 2025 can be arranged in an irregular pattern so as to accommodate items 2105 of varying sizes and/or shapes. While the illustrated examples show the elastic bands 2025 arranged in a grid pattern, the elastic bands 2025 in other examples can be arranged in other patterns, such as pinwheel or spider web patterns. Once more, the separator web 2010 helps to minimize movement of the items 2105 within the container 2000 during movement. By having the items 2105 in a stabilized position, the robot arm 605 is able to perform blind picking in which a vision system is not necessary to locate the items 2105 during picking or placing, but a vision system can be used if so desired.

Figure 22:
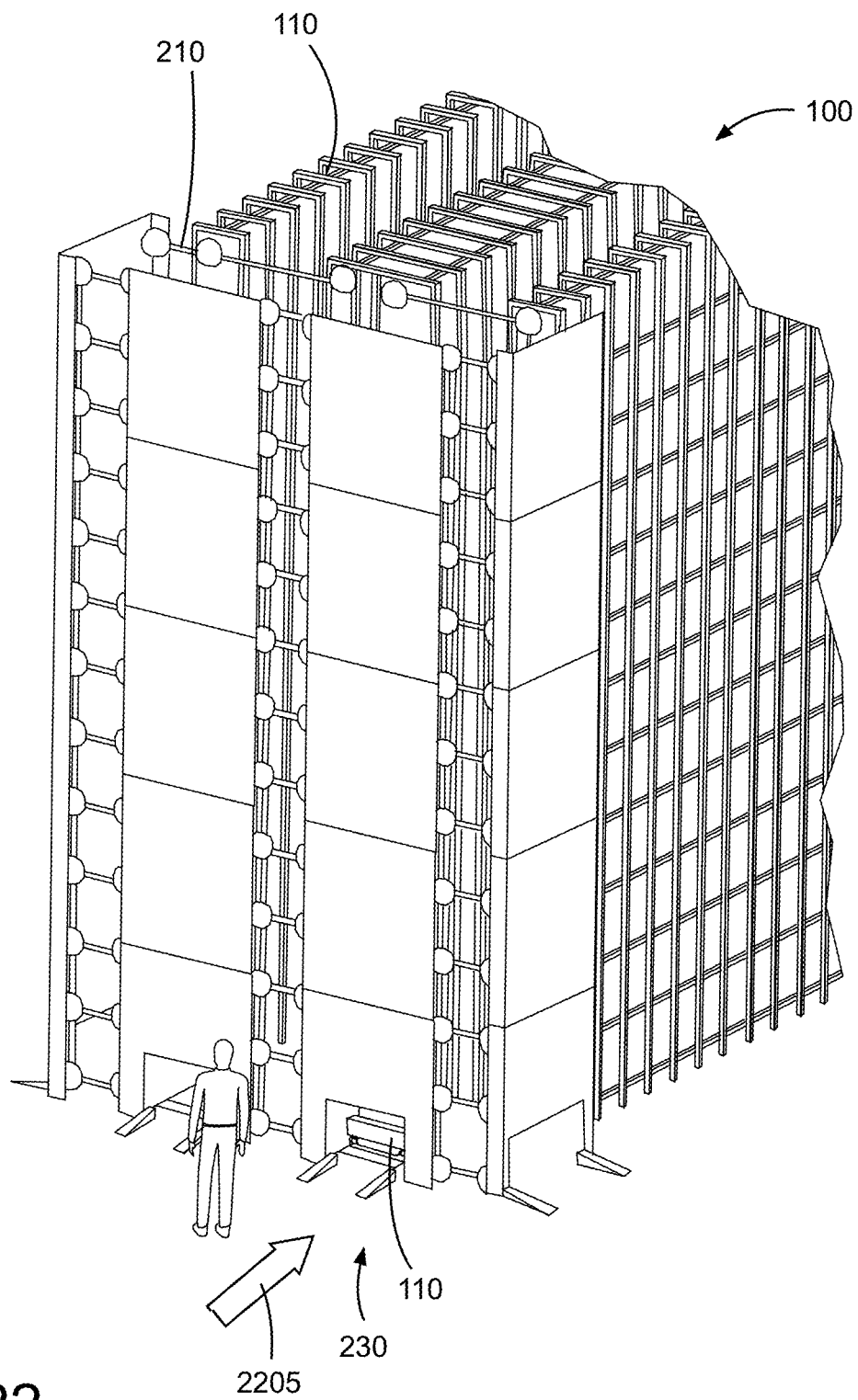
FIG. 22 is an enlarged perspective view of the rack in the FIG. 1 system.

A technique for operating the robotic shuttle system 100 will now be described with reference to FIGS. 22-35. The shuttle 120 (or 900) is able to autonomously operate outside of the rack system 110. The shuttle 120 enters the shuttle frame 210 of the rack system 110 through one of the rack access passages 230 as indicated by arrow 2205 in FIG. 22.

Figure 23:
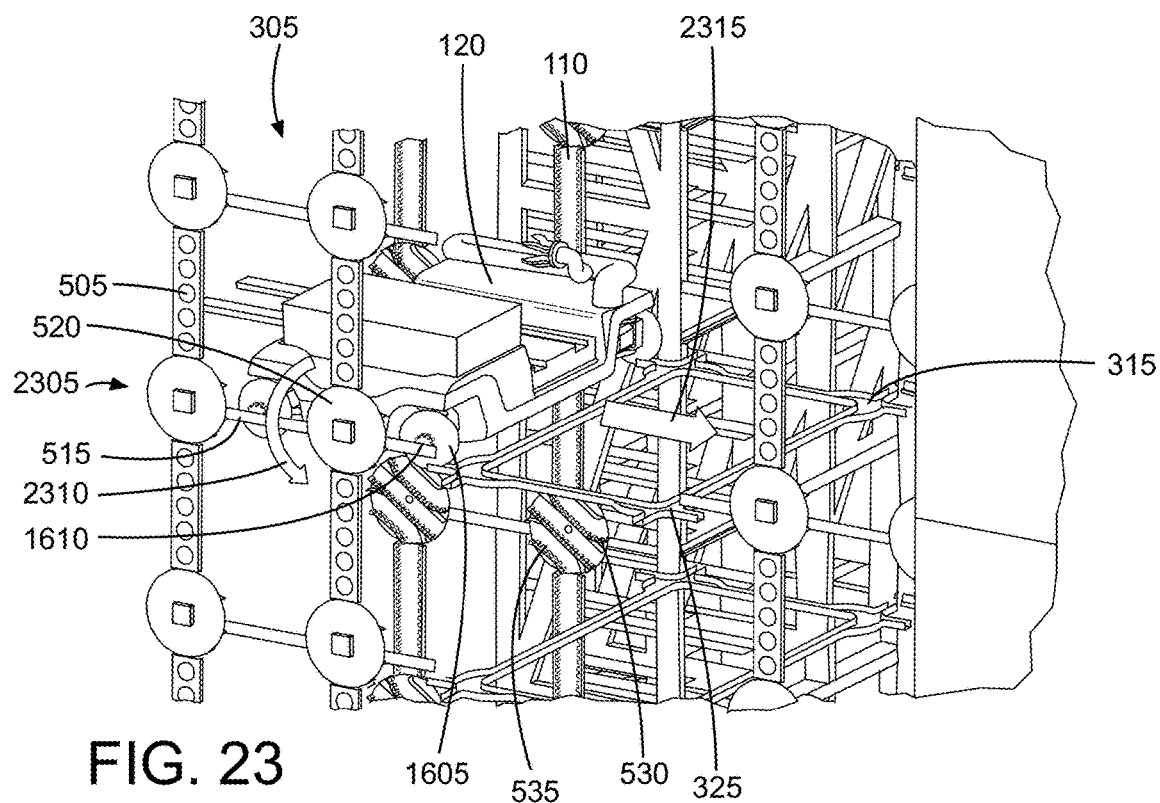
FIG. 23 is an enlarged perspective view of a shuttle entering a rack level.
Figure 24:
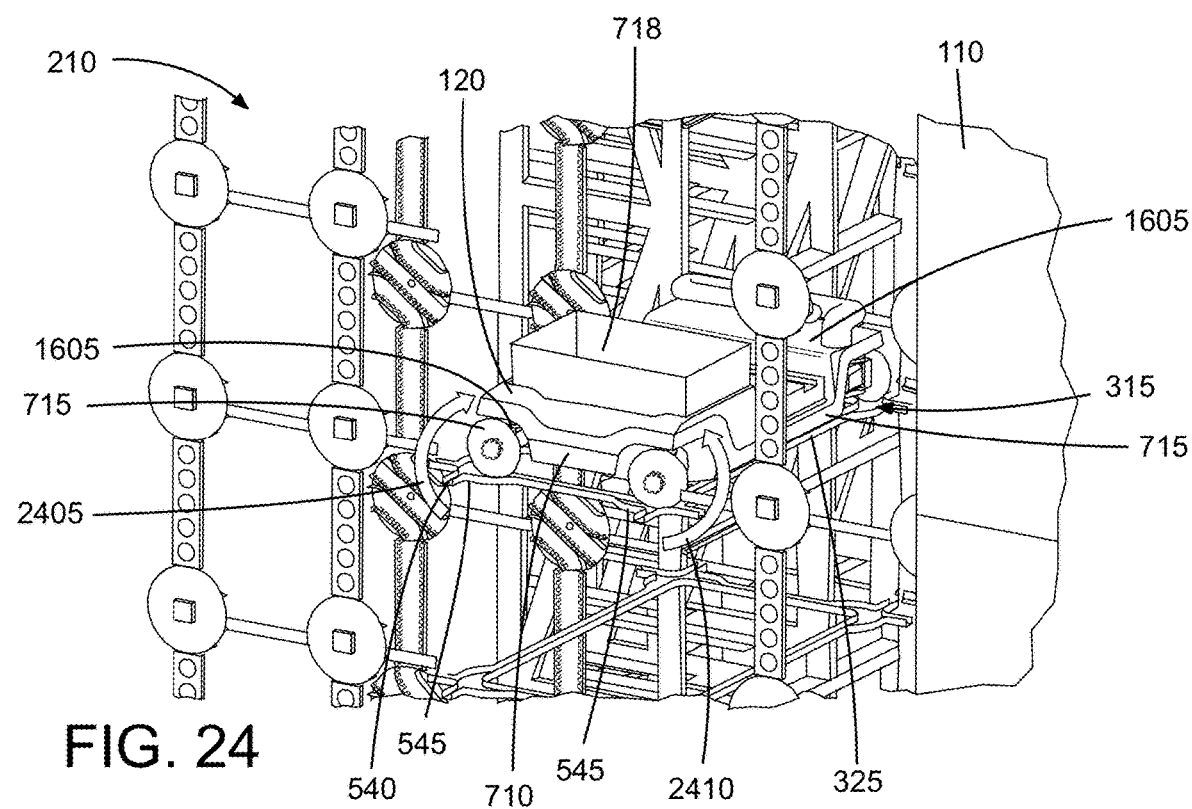
FIG. 24 is an enlarged perspective view of the shuttle entering a rack row.
Figure 25:
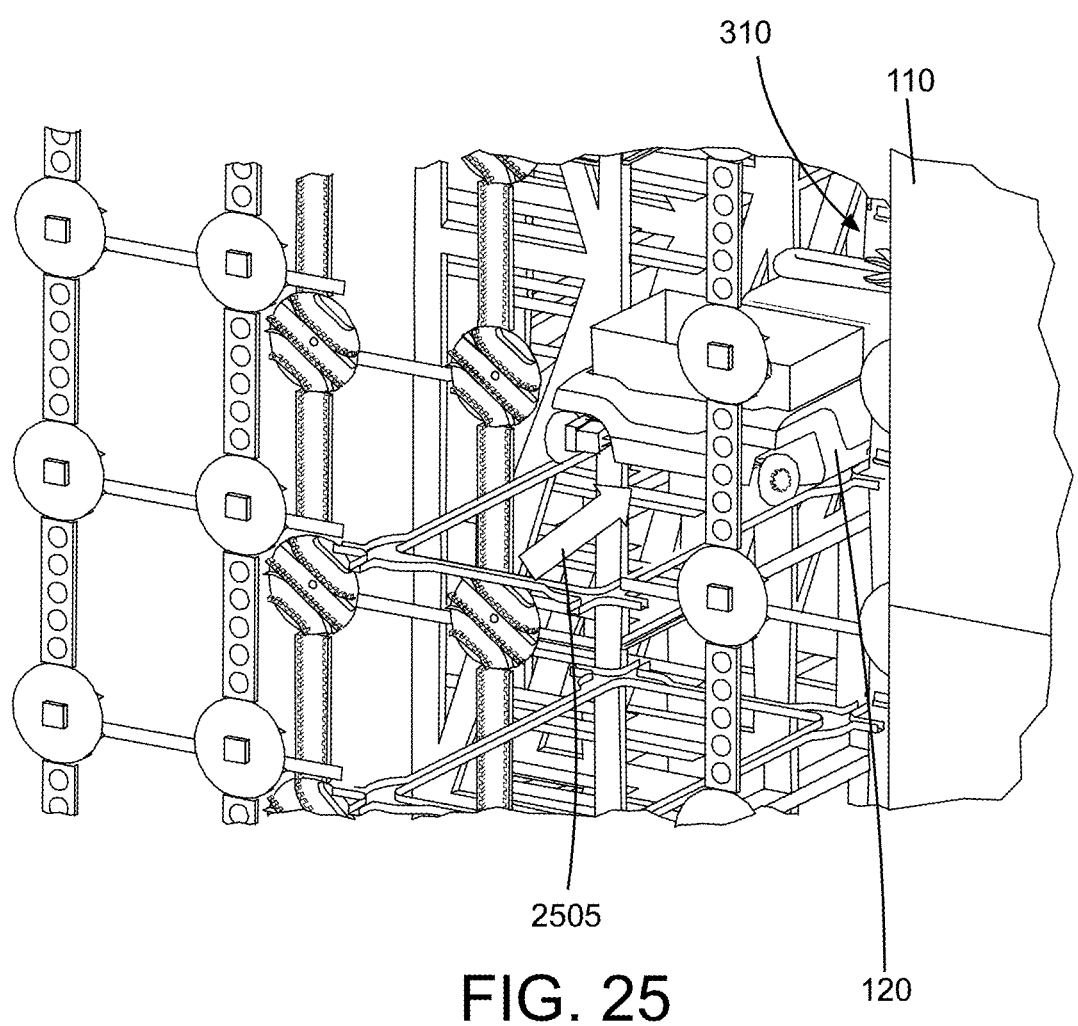
FIG. 25 is an enlarged perspective view of the shuttle moving along the rack row.

Referring to FIGS. 5 and 23, the shuttle 120 uses the pinion 1610 to travel vertically up the elevator section 305 via the elevator rails 505. The pinions 1610 have the pinion teeth 1615 engaged to corresponding teeth on the elevator rails 505. Once the shuttle 120 reaches a target shuttle frame level 2305, the shuttle switches 520 are rotated as indicated by arrow 2310 in FIG. 23 such that the curved track section 530 of each shuttle switch 520 aligns with the elevator rails 505 and the transition rails 515 at the shuttle frame level 2305. The pinions 1610 of the shuttle 120 then travel from the elevator rails 505, along the curved track sections 530 of the shuttle switches 520, and onto the transition rails 515. As indicated by arrow 2315 in FIG. 23, the pinions 1610 of the shuttle 120 then travel along the transition rails 515 towards the intersection 315. As the shuttle 120 continues to travel in direction 2315, the shuttle switches 520 are again rotated as indicated by arrow 2310 such that the straight track sections 535 of the shuttle switches 520 are aligned with the transition rails 515 so that the shuttle 120 is able to transfer from the transition rails 515 onto the turn rails 325. The transition rails 515 are spaced above the turn rails 325 generally based on the radial difference between the pinion 1610 and a drive wheel 1605. When transitioning onto the turn rails 325, the drive wheels 1605 engage and ride along the turn rails 325 and the pinions 1610 disengage or ride off the transition rails 515.

At the intersection 315, the shuttle 120 is able to travel along the ends of the racks 205. Once the shuttle 120 is fully loaded on the turn rails 325 at a particular intersection 315, the shuttle 120 is then able (if needed) to turn so as to travel down the appropriate travel lane 310 towards the target storage row 215 in the rack 205. Once more, the turn rails 325 have rail channels 540 that inhibit the drive wheels 1605 of the shuttle 120 from falling off the shuttle frame 210. As shown by arrows 2405, 2410 the drive wheels 1605 of the wheel assembly 715 of the shuttle 120 are able to rotate in opposing directions at ninety degrees (90°) relative to the shuttle 120. As noted before, the corners of the turn rails 325 at the intersection 315 have turned shoulders 545 that allow the drive wheels 1605 to turn ninety degrees (90°) relative to the rest of the shuttle 120. The steering system 1708 is designed to allow the wheel assembly 715 to turn independently with one another when required, such as turning in the depicted fashion, as well as steer in unison such as when the shuttle 120 operates outside of the rack system 110. To facilitate high packing densities within the rack system 110, the amount of free space within the rack system 110 is rather small. The ability of the shuttle 120 to make sharp turns with a zero turning radius within the shuttle frame 210 allows for higher packing densities. This zero turning radius ability allows the shuttle 120 to turn in a transverse direction relative to the original travel direction and is facilitated by the wheel assembly 715 being able to turn in an opposing manner at least ninety degrees (90°) relative to the rest of the shuttle 120. As noted before, the body 710 has wheel wells 718 that form notches at the corners of the shuttle 120 to allow this zero turning radius turn. Once the shuttle 120 is turned, the shuttle 120 is able to travel down the appropriate travel lane 310 as is indicated by arrow 2505 in FIG. 25.

Figure 26:
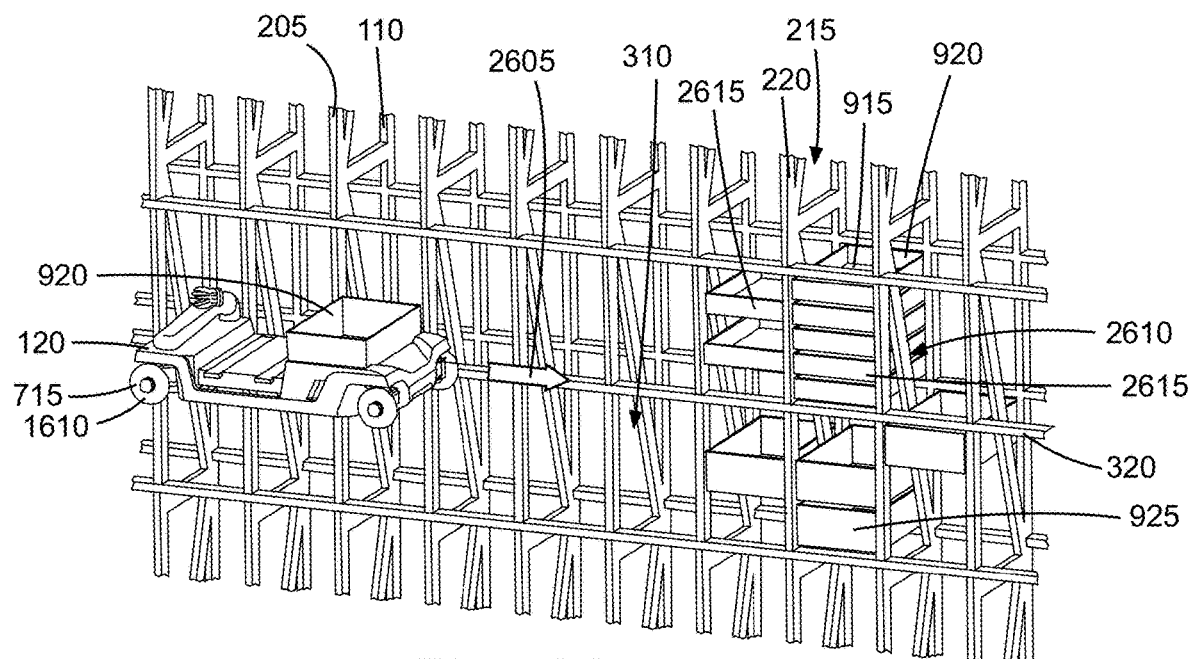
FIG. 26 is an enlarged perspective view of the shuttle travelling towards a service location.

In the subsequent drawings, portions of the rack system 110 have been removed to enhance visibility. For example, one of the rack columns 220 along with the corresponding rack rail 320 have not been shown in FIG. 26 and the subsequent drawings so that the shuttle 120 is visible as the shuttle 120 travels down a travel lane 310. Turning to FIG. 26, the shuttle 120 when traveling down a travel lane 310 has the pinions 1610 engaged with and riding on the rack rails 320. The intermeshing of the pinions 1610 with the teeth of the rack rails 320 facilitates accurate location determination of the shuttle 120, either by dead-reckoning alone or in combination with other location determination techniques. Once more, the rack rails 320 have teeth that engage the pinion teeth 1615 on the pinions 1610 of the wheel assembly 715. Again, the shuttle 120 is supported on both sides by the rack rails 320. As indicated by arrow 2605, the shuttle 120 travels along the travel lane 310 until the shuttle 120 reaches a target storage row 2610 containing one or more containers 915 to be serviced by the shuttle 120. As mentioned before, the rack system 110 can store a variety of containers 915. In the illustrated example, the racks 205 store both trays 920 and totes 925. The racks 205 at the storage rows 215 have opposing L-brackets 2615 that support the corners or sides of the containers 915. The L-brackets 2615 form a gap that allows the extendable conveyor 740 of the shuttle to engage the bottom of the containers 915.

Figure 27:
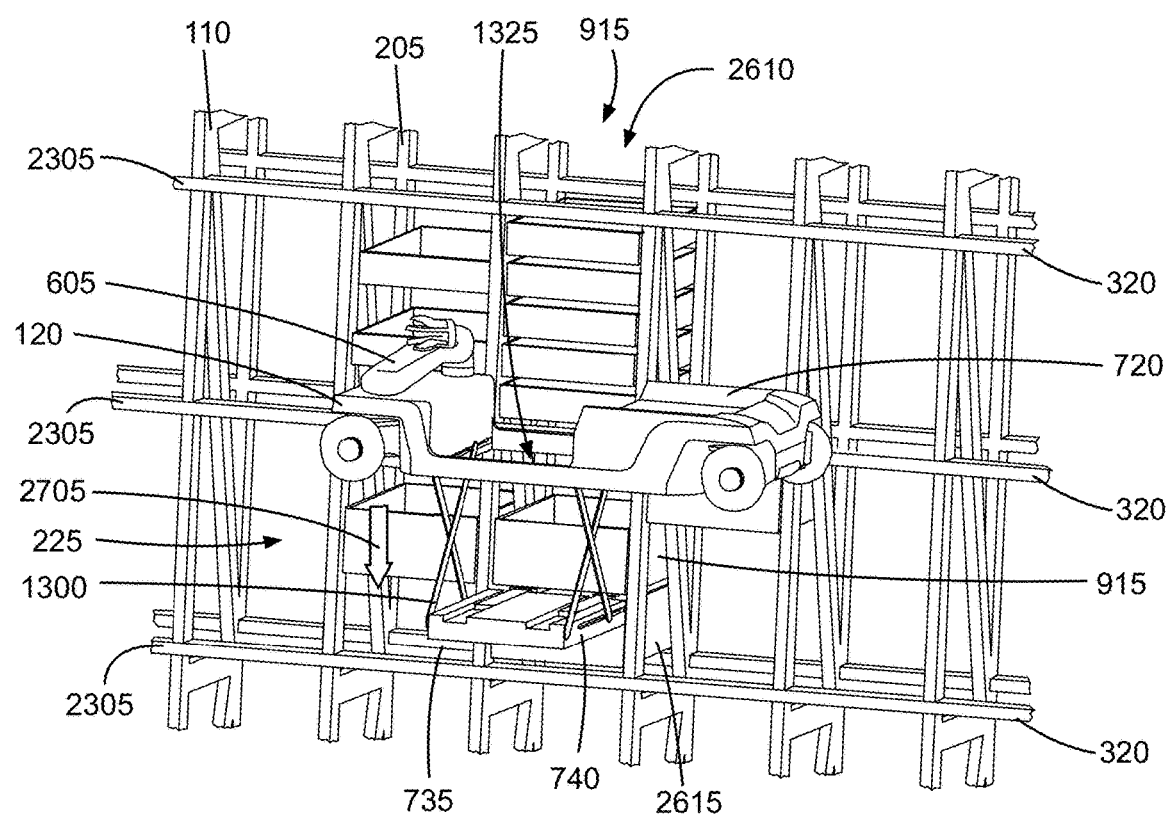
FIG. 27 is an enlarged perspective view of the shuttle with the lift mechanism in the lowered position.
Figure 28:
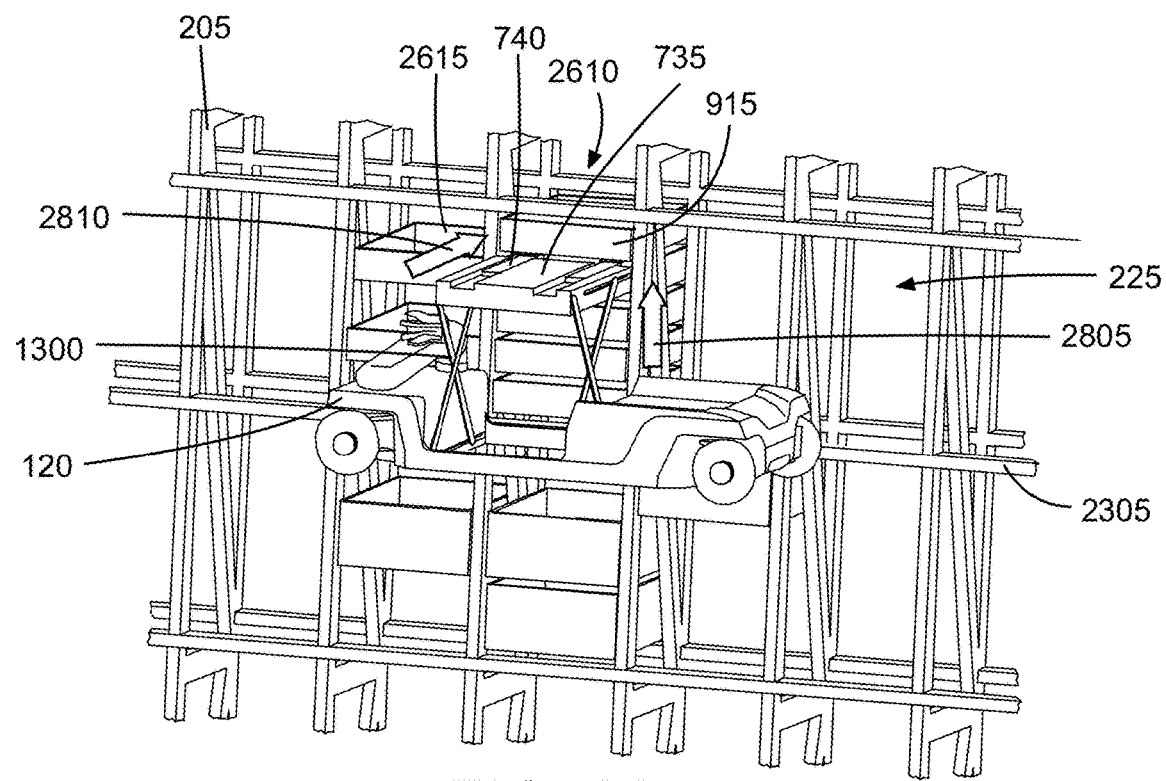
FIG. 28 is an enlarged perspective view of the shuttle with the lift mechanism in the raised position.

Upon reaching a target storage row 2610, the lift mechanism 1300 of the shuttle 120 can be raised or lowered so that the shuttle 120 is able to retrieve containers on rack levels 225 that are above or below the current shuttle frame level 2305, as is shown in FIGS. 27 and 28.

Looking at FIG. 27, the lift mechanism 1300 lowers the rack container platform 735 to the rack level 225 containing the target container 915 as is indicated by arrow 2705. The extendable conveyor 740 is extended underneath the container 915, and the lift mechanism 1300 slightly raises the rack container platform 735 so that the extendable conveyors 740 are able to support the bottom of the container 915 on the rack 205. In one variation, belts on the extendable conveyor 740 are powered to draw the container 915 onto the rack container platform 735. In another variation, the extendable conveyors 740 are in the form of forks that lift and draw in the container 915 onto the rack container platform 735. Once the container 915 is fully loaded onto the rack container platform 735, the lift mechanism 1300 raises the container 915 to a neutral position where the rack container platform 735 is generally level with the rest of the shuttle 120. As noted before, the lift mechanism 1300 along with the shuttle 120 defines a platform cavity that allows the container 915 on the rack container platform 735 to rise up and through the bed of the shuttle 120. The platform cavity 1325 is sized to be larger than the containers 915 that are being serviced so that the containers 915 are able to fit through the platform cavity 1325. In other variations, the containers 915 that are larger than the platform cavity 1325 are always placed at a position that is above the shuttle 120 and/or the shuttle is on a shuttle frame level 2305 that is below the large containers 915. In further forms, the lifting mechanism 1300 may have the rack container platform 735 positioned slightly below or above the shuttle during servicing (i.e., not at the neutral position) so that the robot arm 605 can more easily and/or efficiently move items between the containers 915 on the rack container platform 735 and the container holder 720.

Figure 29:
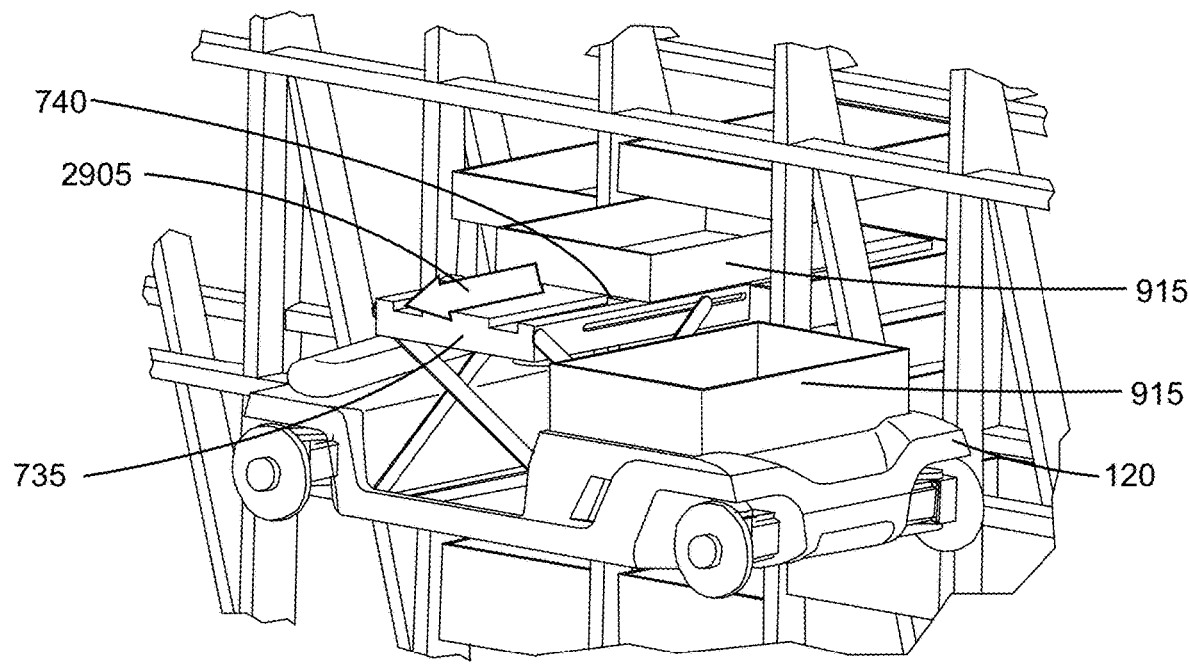
FIG. 29 is an enlarged perspective view of the shuttle removing a tote from the rack.
Figure 30:
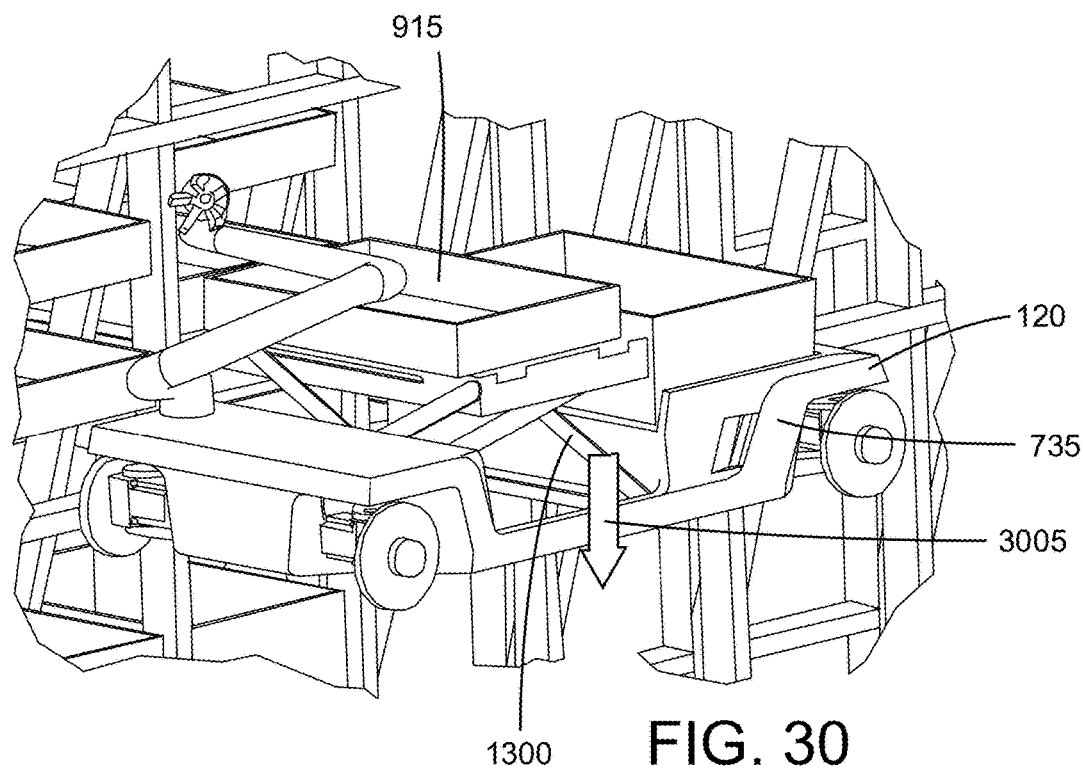
FIG. 30 is an enlarged perspective view of the shuttle lowering the tote.

FIGS. 28, 29, and 30 illustrate a sequence of actions performed by the shuttle 120 when loading a container 915 that is located above the shuttle 120 at the shuttle frame level 2305. As illustrated in FIG. 28, the lifting mechanism 1300 raises the rack container platform 735 in an upward direction 2805. Once at the appropriate level, the extendable conveyors 740 are extended in a (horizontal) extension direction 2810 so as to be positioned underneath the container 915 on the rack 205. FIG. 29 shows the container 915 being drawn onto the rack container platform 735 by retracting the extendable conveyors 740 in a (horizontal) retraction direction 2905. Once the container 915 is fully loaded onto the rack container platform 735, the lift mechanism 1300 lowers the rack container platform 735 in a downwards direction 3005 towards the shuttle 120, as is depicted in FIG. 30.

Figure 31:
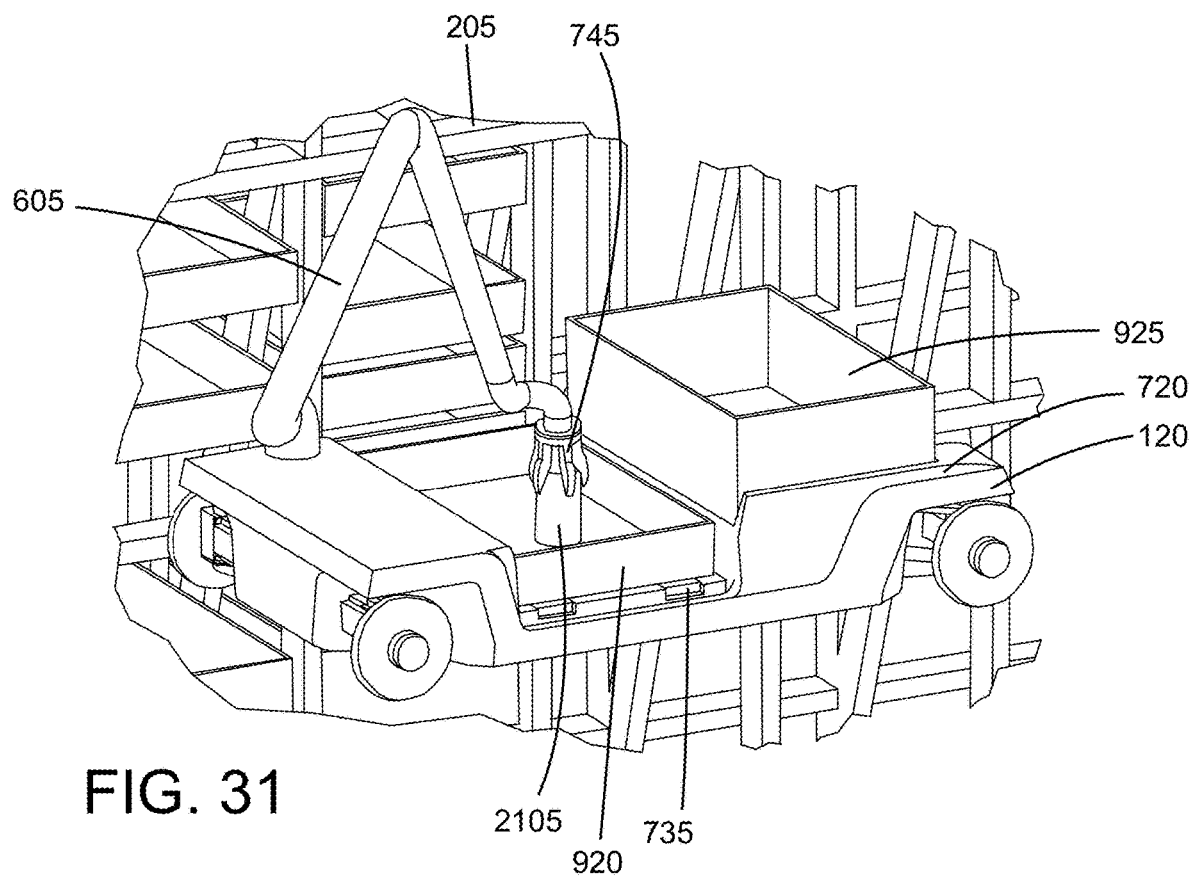
FIG. 31 is an enlarged perspective view of a robotic arm of the shuttle removing an item from the tote.
Figure 32:
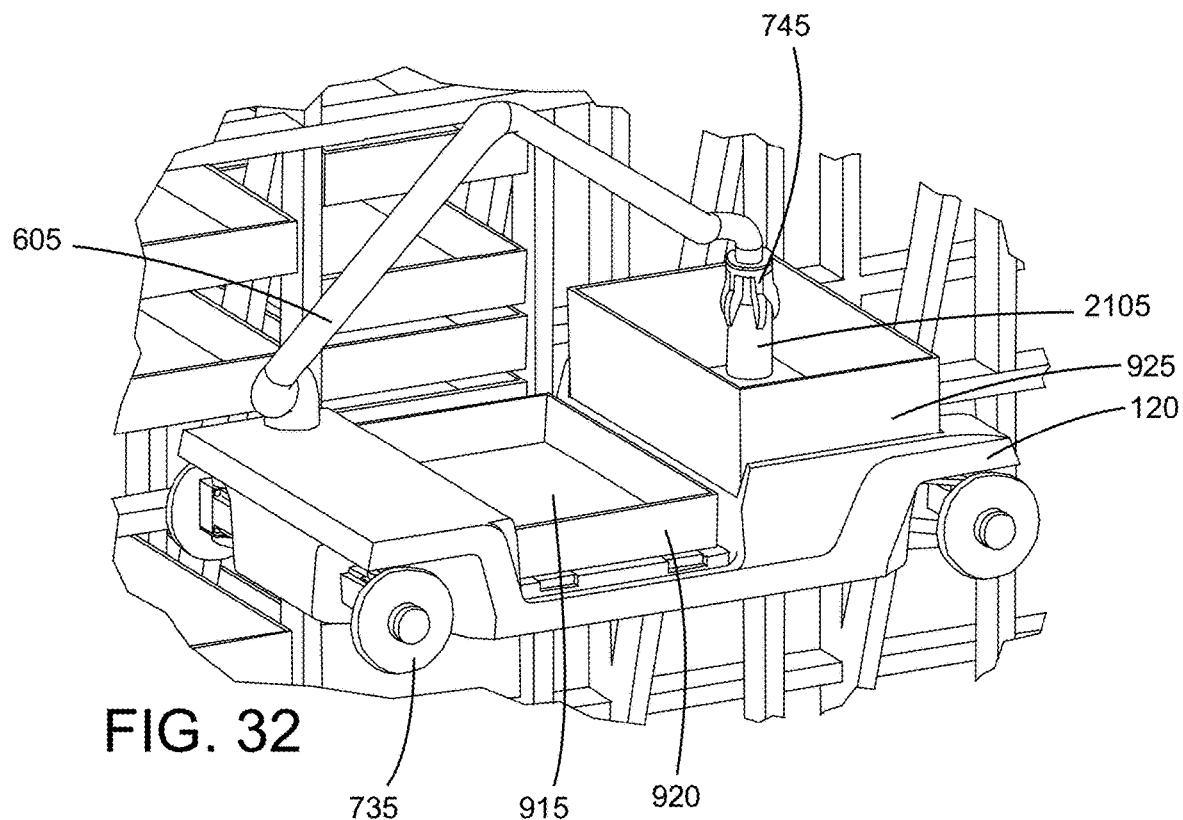
FIG. 32 is an enlarged perspective view of the robotic arm of the shuttle placing the item on a shuttle tote.

Referring to FIGS. 31 and 32, in the illustrated example one of the trays 920 is loaded from the rack 205. The container 915 in the container holder 720 of the shuttle 120 is a tote 925.

Once more, the tray 920 and tote 925 can be reversed, or the same type of container 915 can be used at both positions. The tray 920 from the rack 205 contains a single item 2105, but in other examples, the tray 920 can contain multiple items 2105. The robot arm 605 grabs the item 2105 with the EoAT 745. The robot arm 605 then moves the item 2105 from the tray 920 on the rack container platform 735 and into the tote 925 on the container holder 720 of the shuttle 120, as is shown in FIG. 32. Once the item 2105 is placed in the tote 925, the EoAT 745 releases the item 2105. The robot arm 605 can repeat the process of moving items 2105 from the tray 920 into the tote 925. This process can be reversed so as to restock items 2105 in the rack 205 by transferring items 2105 from the tote 925 on the shuttle 120 into the tray 920. Another variation is a combination approach in which some of the items 2105 are restocked while other items 2105 are added to the tray 920. Once the tray 920 (i.e., container 915) has been serviced by transferring items 2105 from the tray 920 to the tote 925, transferring items 2105 from the tote 925 to the tray 920, or both, the tray 920 is returned to the rack 205. In some examples, the tray 920 or other container 915 can remain on the rack container platform 735 so as to increase the load capacity of the shuttle and/or for replacement/servicing of the tray 920 for example.

Figure 33:
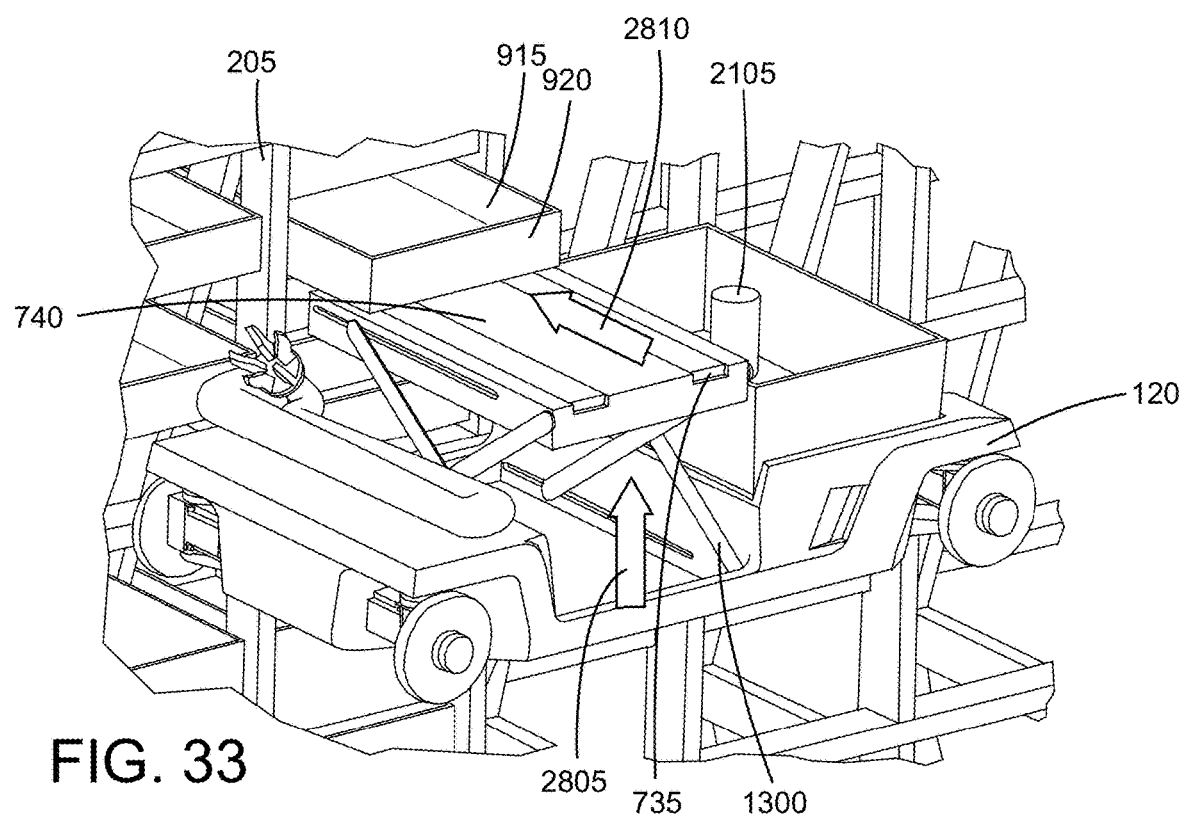
FIG. 33 is an enlarged perspective view of the shuttle reloading the tote into the rack.
Figure 34:
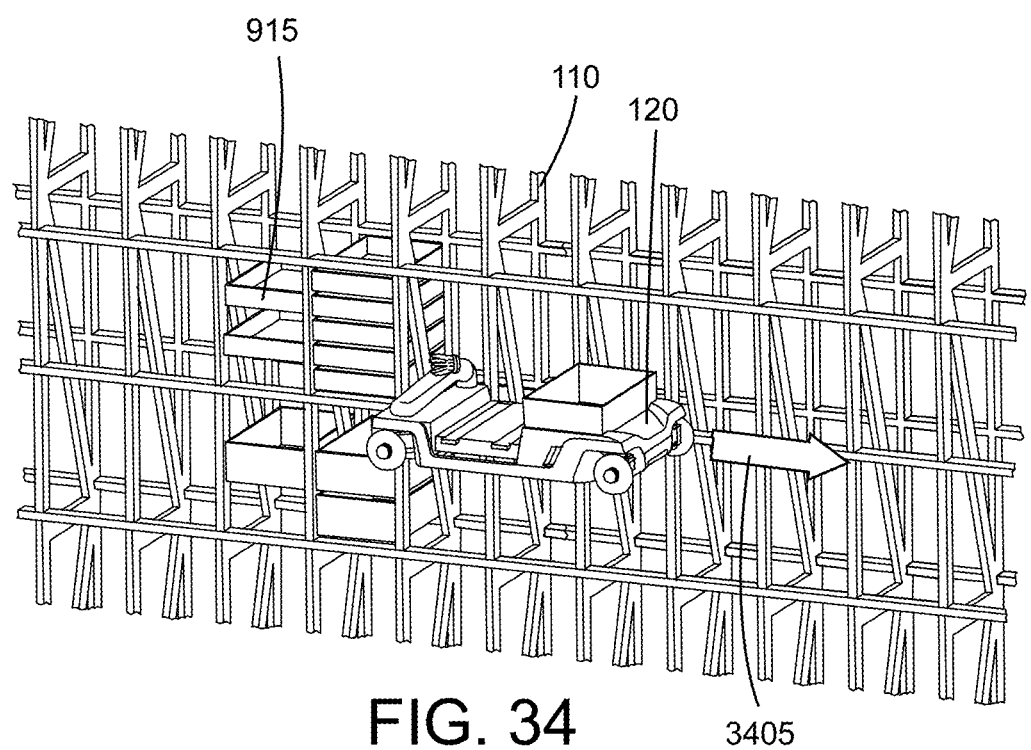
FIG. 34 is an enlarged perspective view of the shuttle travelling from the service location.
Figure 35:
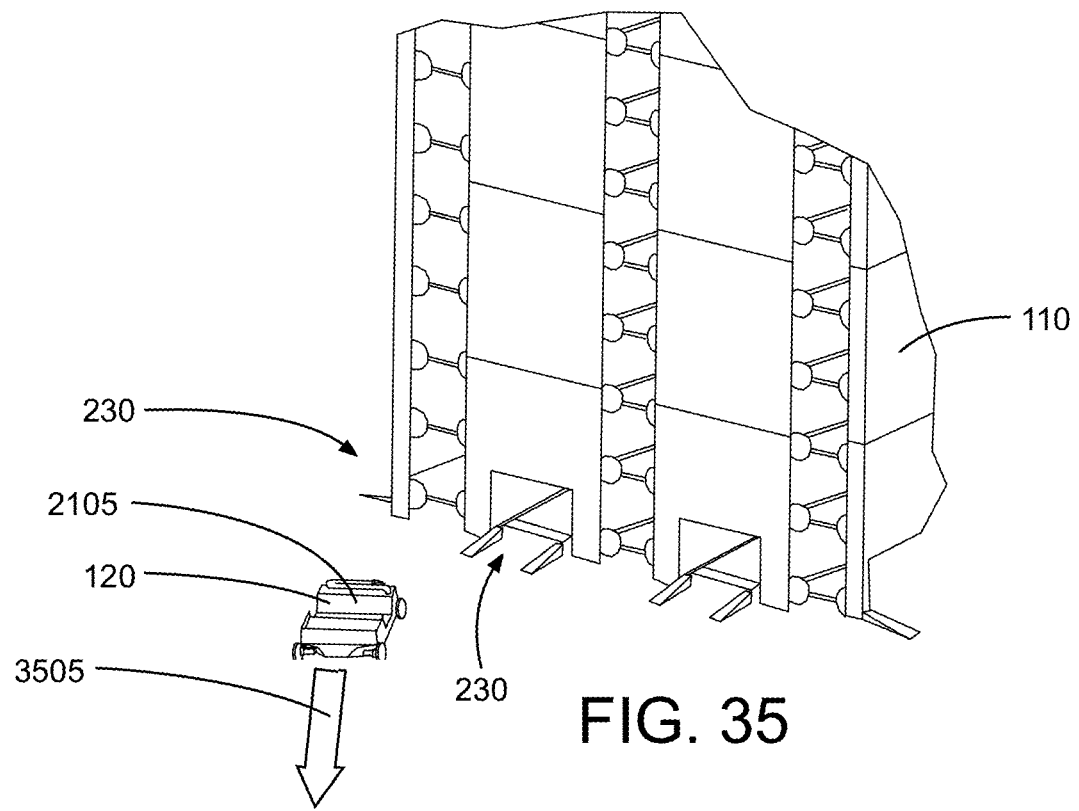
FIG. 35 is an enlarged perspective view of the shuttle travelling from the rack.

Turning to FIG. 33, the lift mechanism 1300 raises the platform in the upward direction 2805. The extendable conveyor 740 then moves the tray 920 in the extension direction 2810 so as to reshelve the tray 920 back into the rack 205. In other examples, the shuttle 120 can reshelve the container 915 at a different location in the rack 205 that is different from the original position. The shuttle 120 then can move along the rack system 110, as indicated by arrow 3405 in FIG. 34, so as to service additional containers 915 and/or travel outside of the rack system 110 such as is depicted in FIG. 35. The shuttle 120 can exit one of the rack access passages 230 and travel, as indicated by arrow 3505, to a servicing location outside of the rack system 110 towards a service station. At the service station, the items 2105 can be transferred or removed from the shuttle 120 or further processed. Other items 2105 can be placed on the shuttle 120 so as to be restocked in the rack system 110. As should be recognized, the robotic shuttle system 100 can be used in a wide variety of situations, such as order fulfillment and/or product buffering. The robotic shuttle system 100 provides an efficient and cost-effective manner for storing, reorganizing, and retrieving multiple kinds of SKUs.

Figure 36:
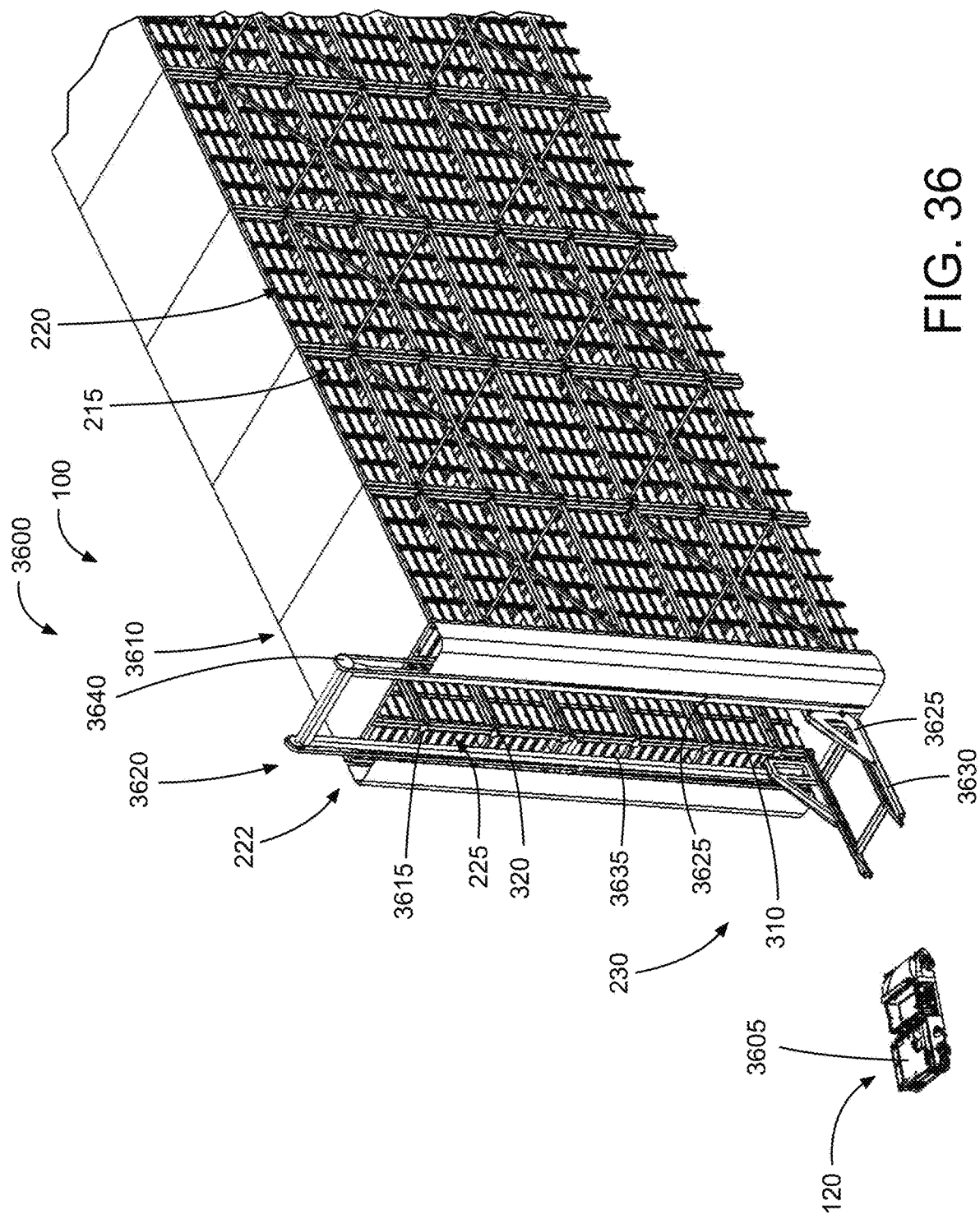
FIG. 36 is a perspective view of a storage rack system according to another example.
Figure 37:
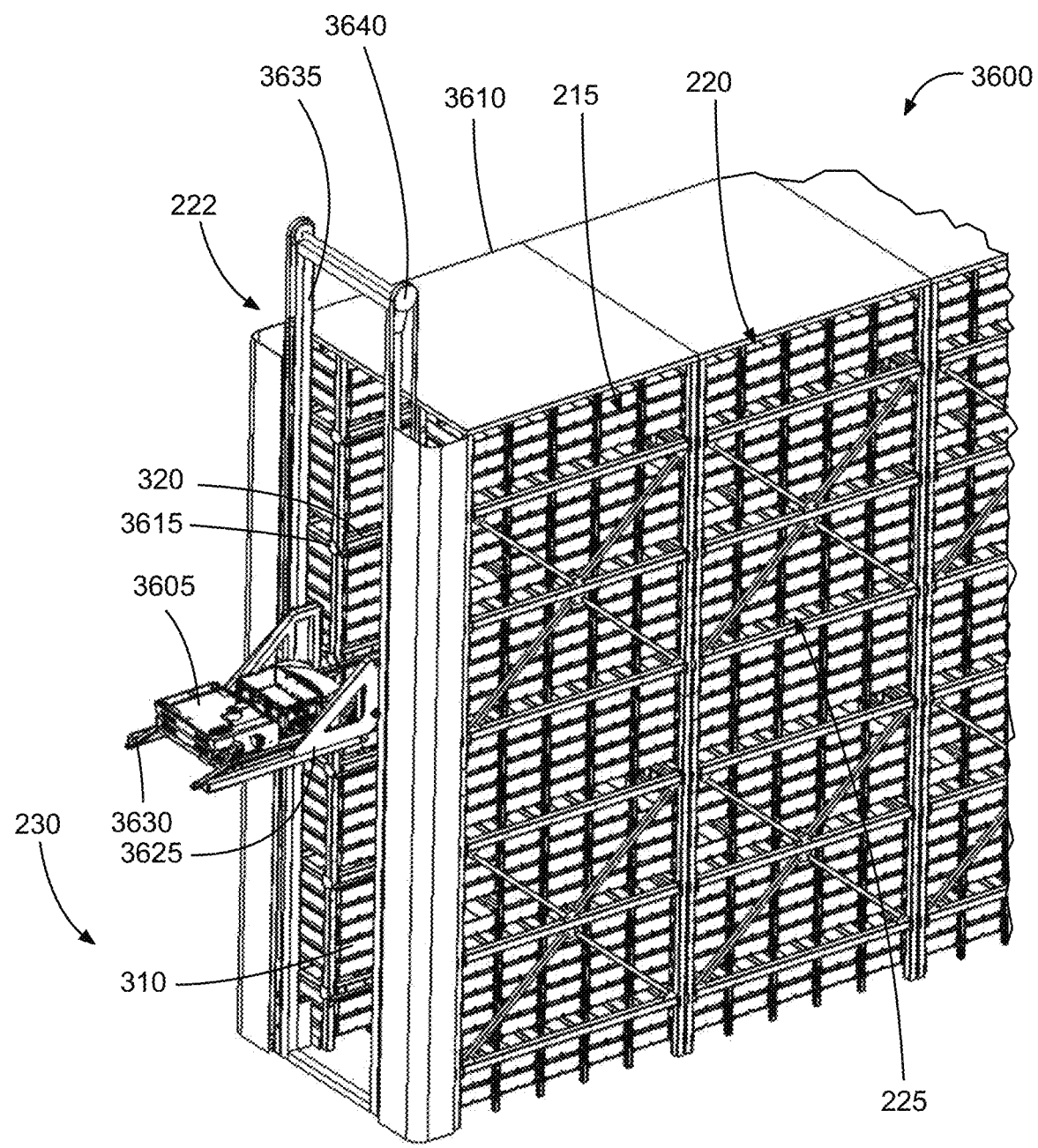
FIG. 37 is an enlarged perspective view of one end of the FIG. 36 storage rack system.
Figure 38:
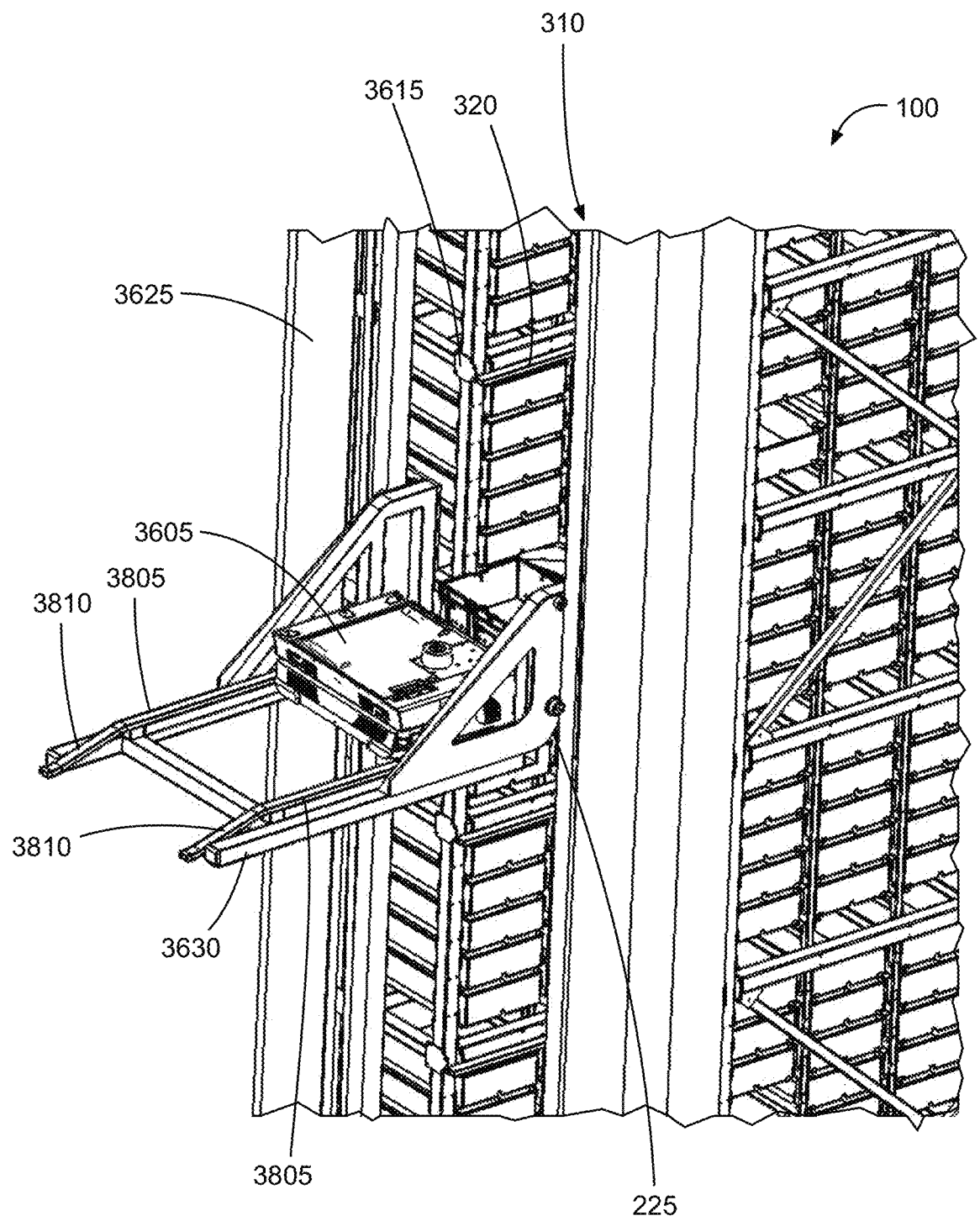
FIG. 38 is an enlarged perspective view of an elevator found in the FIG. 36 storage rack system.

FIGS. 36, 37, and 38 illustrate another example of a storage rack system 3600 that can be used in the robotic shuttle system 100 of FIG. 1. As will be recognized, the storage rack system 3600 shares a number of components in common with and operates in a similar fashion to the examples illustrated and described before. For the sake of brevity as well as clarity, these common features will not be again described below in detail, but please refer to the previous discussion. Only the notable distinctions between the storage rack system 3600 and the examples described before will be discussed, and unless indicated otherwise, the storage rack system 3600 in FIG. 36 shares the same components and operates in the same fashion as the examples described before.

For example, the storage rack system 3600 includes one or more shuttles 3605, racks 3610, and shuttle frames 3615. The shuttle 3605 is configured in the same fashion as the other shuttles 120 described before. In one form, the shuttle 3605 is configured in the same or similar fashion as the shuttle 900 depicted in FIG. 9. Typically, but not always, the shuttle 3605 includes the robot arm 905 with the EoAT 910. In other variations, the shuttle 3605 does not include the robot arm 905 with the EoAT 910. In the illustrated example, the robot arm 905 is not shown on the shuttle 3605 so as to enhance visibility of other components. Once more, the shuttles 3605 are configured to operate autonomously and/or semi-autonomously relative to one another so as to store and retrieve items stored in the storage rack system 3600. The shuttle 3605 is able to move independently inside or outside of the racks 3610.

Like before, the storage rack system 3600 includes the rack 3610 on which items are stored, and the shuttle frames 3615 on which the shuttles 3605 are able to travel along the racks 3610. As shown, each rack 3610 includes a series of storage rows 215 in which items are stored.

The storage rows 215 of the rack 3610 extend horizontally to form a series of rack columns 220 with rack ends 222. In the illustrated example, the racks 3610 extend vertically to form one or more rack levels 225. In other examples, the racks 205 can be configured differently such as having fewer or more storage rows 215, rack columns 220, and/or rack levels 225.

The shuttle frame 3615 allows the shuttles 3605 to travel along the racks 3610 and service the various storage rows 215, rack columns 220, and rack levels 225. As shown, the shuttle frame 3615 further includes one or more travel lanes 310 that allow the shuttles 3605 to travel along the rack columns 220. In the illustrated example, the shuttle frame 3615 has travel lanes 310 sandwiched between the rack columns 220. The shuttle frame 3615 includes one or more rack access passages 230 through which the shuttles 3605 are able to enter or exit the storage rack system 3600. Like in the earlier examples, the travel lanes 310 of the shuttle frame 3615 includes one or more rack rails 320 along which the shuttles 3605 travel between the racks 3610. The shuttles 3605 are able to independently move along the floor outside of the storage rack system 3600 so as to transfer items between various external service locations and the storage rack system 3600.

At the rack end 222, the storage rack system 3600 has an elevator section 3620. Unlike in the earlier examples, the elevator section 3620 in the storage rack system 3600 has at least one elevator 3625 that moves the shuttle 3605 vertically between the rack levels 225, as is depicted in FIGS. 36 and 37. The elevator 3625 includes an elevator platform 3630 on which the shuttle 3605 is supported during vertical movement, one or more guide rails 3635 that guide the elevator platform 3630, and an elevator drive 3640 that moves the elevator platform 3630 vertically along the guide rails 3635. In the illustrated example, the elevator platform 3630 is located between a pair of guide rails 3635, and the elevator platform 3630 is slidably coupled to the guide rails 3635. The elevator drive 3640 in the depicted example includes one or more pulleys that are driven by electric motors, but it is envisioned that other types of elevator drives can be used such as hydraulic, pneumatic, and/or electromagnetic type drives.

From the floor or ground, the shuttle 3605 is able to move onto and from the elevator platform 3630. As can be seen in FIG. 38 as well in the other drawings, the elevator platform 3630 has one or more platform rails 3805 on which the wheel assemblies 715 of the shuttle 3605 ride (FIG. 9). In the depicted example, the elevator platform 3630 includes a pair of platform rails 3805 that are located distally away from the racks 3610, but in other examples, the elevator platform 3630 can include more or less platform rails 3805 than is shown. Each of the platform rails 3805 include a ramp section 3810 where the platform rail 3805 generally tapers towards the floor or ground. This tapering of the platform rails 3805 at the ramp sections 3810 allows the shuttle 3605 to smoothly ride on and off the elevator platform 3630. The platform rails 3805 are positioned and spaced to generally match the spacing of the rack rails 320 in the travel lanes 310 between the racks 3610.

During operation, the elevator drive 3640 of the elevator 3625 lowers the elevator platform 3630 to the floor such that the shuttle 3605 is able to move onto the elevator platform 3630. The shuttle 3605 rides up the ramp sections 3810 onto the platform rails 3805. Once the shuttle 3605 is loaded onto the elevator platform 3630, the elevator drive 3640 can raise the elevator platform 3630 to the desired rack level 225. In some case, the elevator platform 3630 is not raised such that the shuttle 3605 is able to service the rack level 225 located along the floor. Once at the desired rack level 225, the platform rails 3805 of the elevator platform 3630 are aligned with the rack rails 320 at the rack level 225. The shuttle 3605 is then able to move off the elevator platform 3630 and onto the rack rails 320. The shuttle 3605 is then able to load, unload, and/or otherwise move items to and from the rack 3610 along the travel lane 310 in a similar fashion as described before. After performing the designated servicing tasks for a particular rack level 225, the shuttle 3605 travels back onto the platform rails 3805, and the elevator 3625 can raise or lower the shuttle 3605 to the next rack level 225 that needs servicing. After the shuttle 3605 performs all of the required tasks for the storage rack system 3600, the elevator 3625 lowers the elevator platform 3630 with the shuttle 3605 to the floor. The shuttle 3605 is then able to exit the elevator 3625 by riding off the ramp sections 3810 of the platform rails 3805 and onto the floor. The shuttle 3605 is then free to move along the floor to perform other tasks like delivering and/or retrieving items such as from other locations or other storage rack systems 3600.

FIGS. 39, 40, 41, 42, and 43 illustrate a further example of a storage rack system 3900 that can be used in the robotic shuttle system 100 of FIG. 1. As will be recognized, the storage rack system 3900 shares several components in common with and operates in a similar fashion to the examples illustrated and described before. For the sake of brevity as well as clarity, these common features will not be again described below in detail, but please refer to the previous discussion. Only the notable distinctions between the storage rack system 3900 and the examples described before will be discussed, and unless indicated otherwise, the storage rack system 3900 in FIG. 39 shares the same components and operates in the same fashion as the examples described before. For example, the storage rack system 3900 includes one or more shuttles 3605 (FIG. 36), racks 3910, and shuttle frames 3915. The storage rack system 3900 will described below as being serviced by the shuttle 3605 shown in FIG. 36, but it should be recognized that other types of shuttles 120 can be used.

The storage rack system 3900 includes the rack 3910 on which items are stored, and the shuttle frames 3915 on which the shuttles 3605 are able to travel along the racks 3910. As shown, each rack 3910 includes a series of storage rows 215 in which items are stored. The storage rows 215 of the rack 3910 extend horizontally to form a series of rack columns 220 with rack ends 222. In the illustrated example, the racks 3910 extend vertically to form one or more rack levels 225. In other examples, the racks 205 can be configured differently such as having fewer or more storage rows 215, rack columns 220, and/or rack levels 225.

Figure 39:
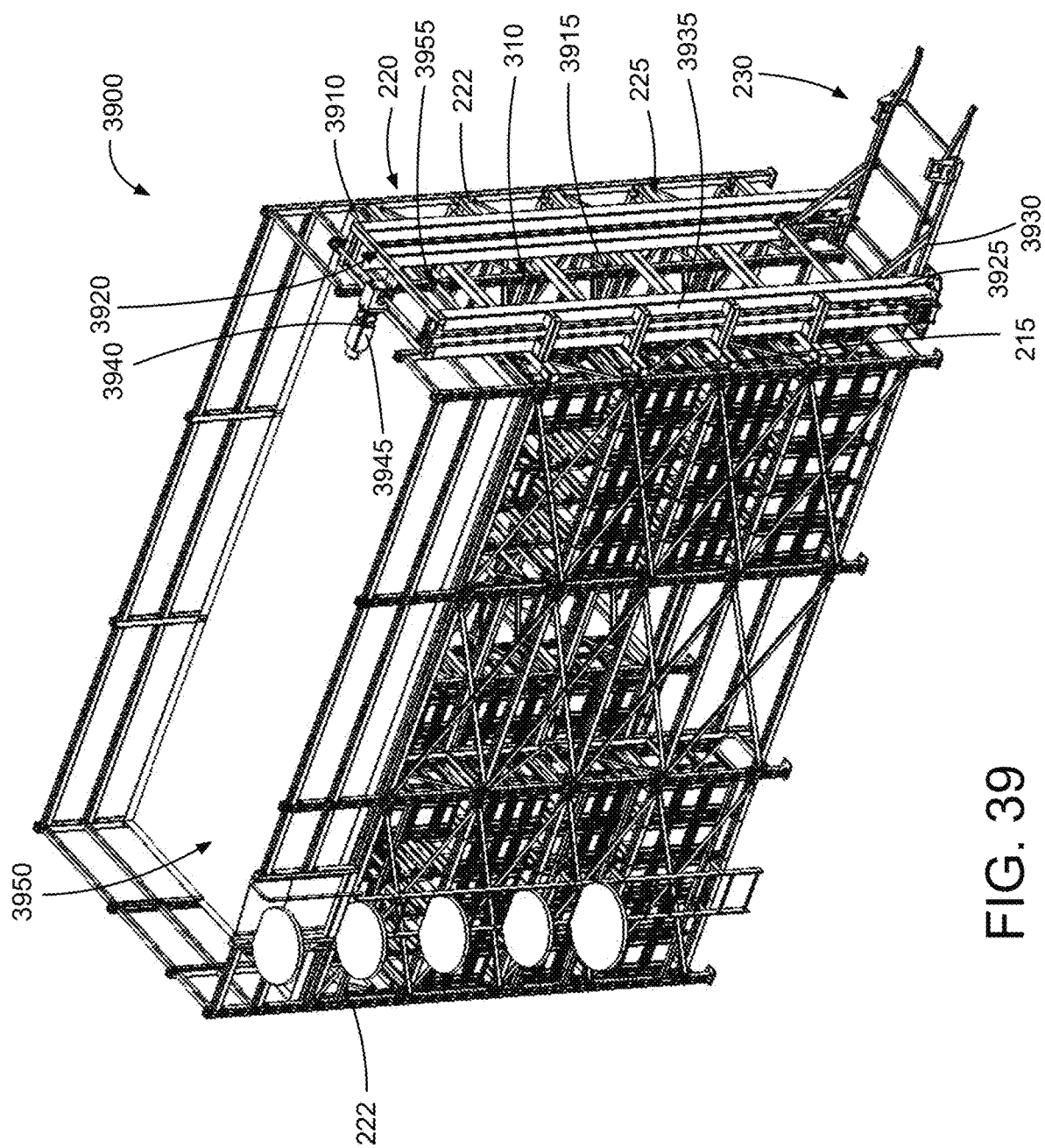
FIG. 39 is a front perspective view of a storage rack system according to a further example.
Figure 42:
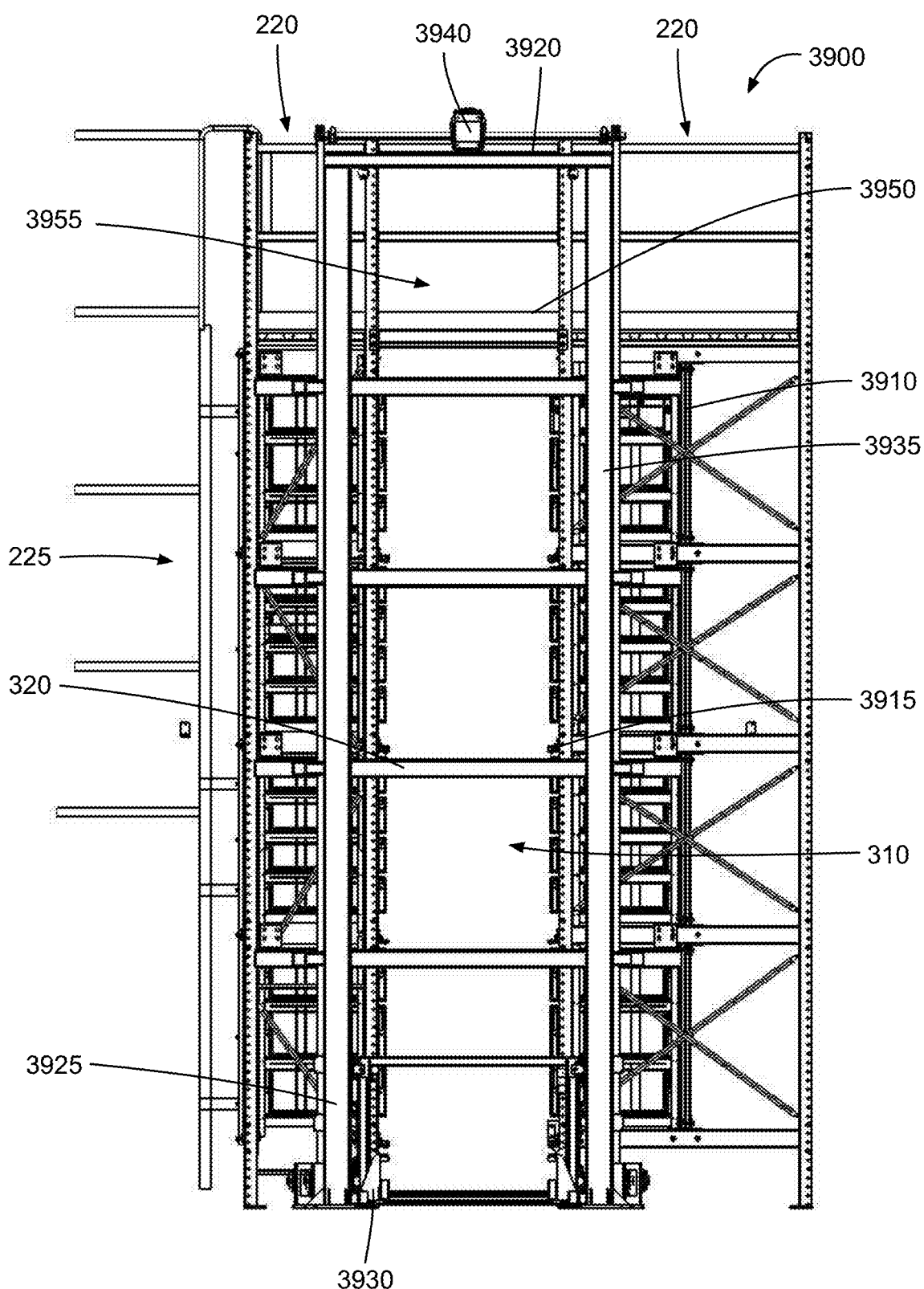
FIG. 42 is a front view of the FIG. 39 storage rack system.

The shuttle frame 3915 allows the shuttles 3605 to travel along the racks 3910 and service the various storage rows 215, rack columns 220, and rack levels 225. As shown in FIGS. 39 and 42, the shuttle frame 3915 further includes one or more travel lanes 310 that allow the shuttles 3605 to travel along the rack columns 220. In the illustrated example, the shuttle frame 3915 has travel lanes 310 sandwiched between the rack columns 220. The shuttle frame 3915 includes one or more rack access passages 230 through which the shuttles 3605 are able to enter or exit the storage rack system 3900. Like in the earlier examples, the travel lanes 310 of the shuttle frame 3915 include one or more rack rails 320 along which the shuttles 3605 travel between the racks 3910. The shuttles 3605 are able to independently move along the floor outside of the storage rack system 3900 so as to transfer items between various external service locations and the storage rack system 3900.

At the rack end 222, the storage rack system 3900 has an elevator section 3920. The elevator section 3920 in the storage rack system 3900 has at least one elevator 3925 that moves the shuttle 3605 vertically between the rack levels 225. The elevator 3925 includes an elevator platform 3930 on which the shuttle 3605 is supported during vertical movement, one or more guide rails 3935 that guide the elevator platform 3930, and an elevator drive 3940 that moves the elevator platform 3930 vertically along the guide rails 3935. In the illustrated example, the elevator platform 3930 is located between a pair of guide rails 3935, and the elevator platform 3930 is slidably coupled to the guide rails 3935. The elevator drive 3940 in the depicted example includes one or more pulleys that are driven by one or more electric motors 3945, but it is envisioned that other types of elevator drives can be used such as hydraulic, pneumatic, and/or electromagnetic type drives.

Figure 40:
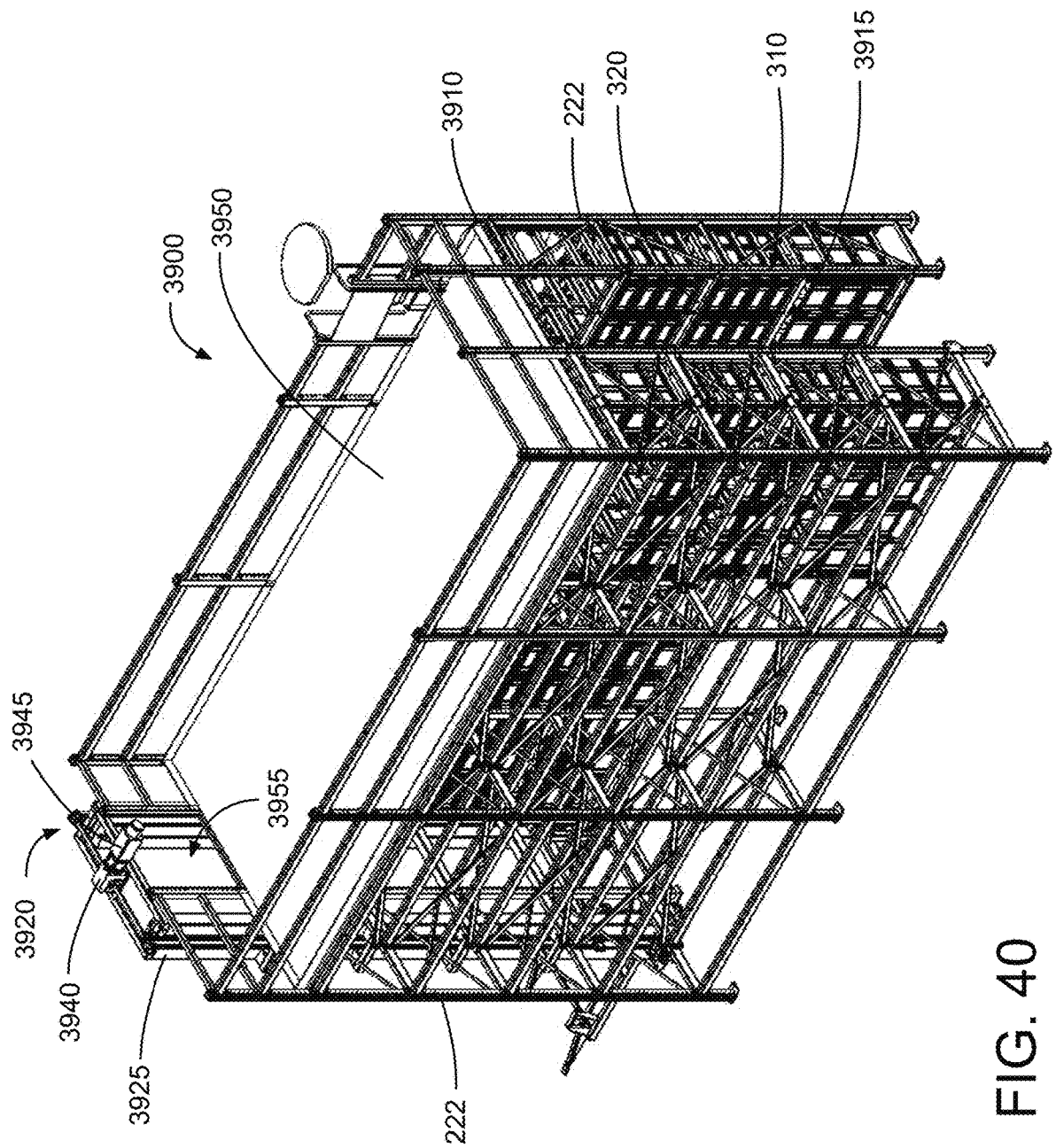
FIG. 40 is a rear perspective view of the FIG. 39 storage rack system.
Figure 41:
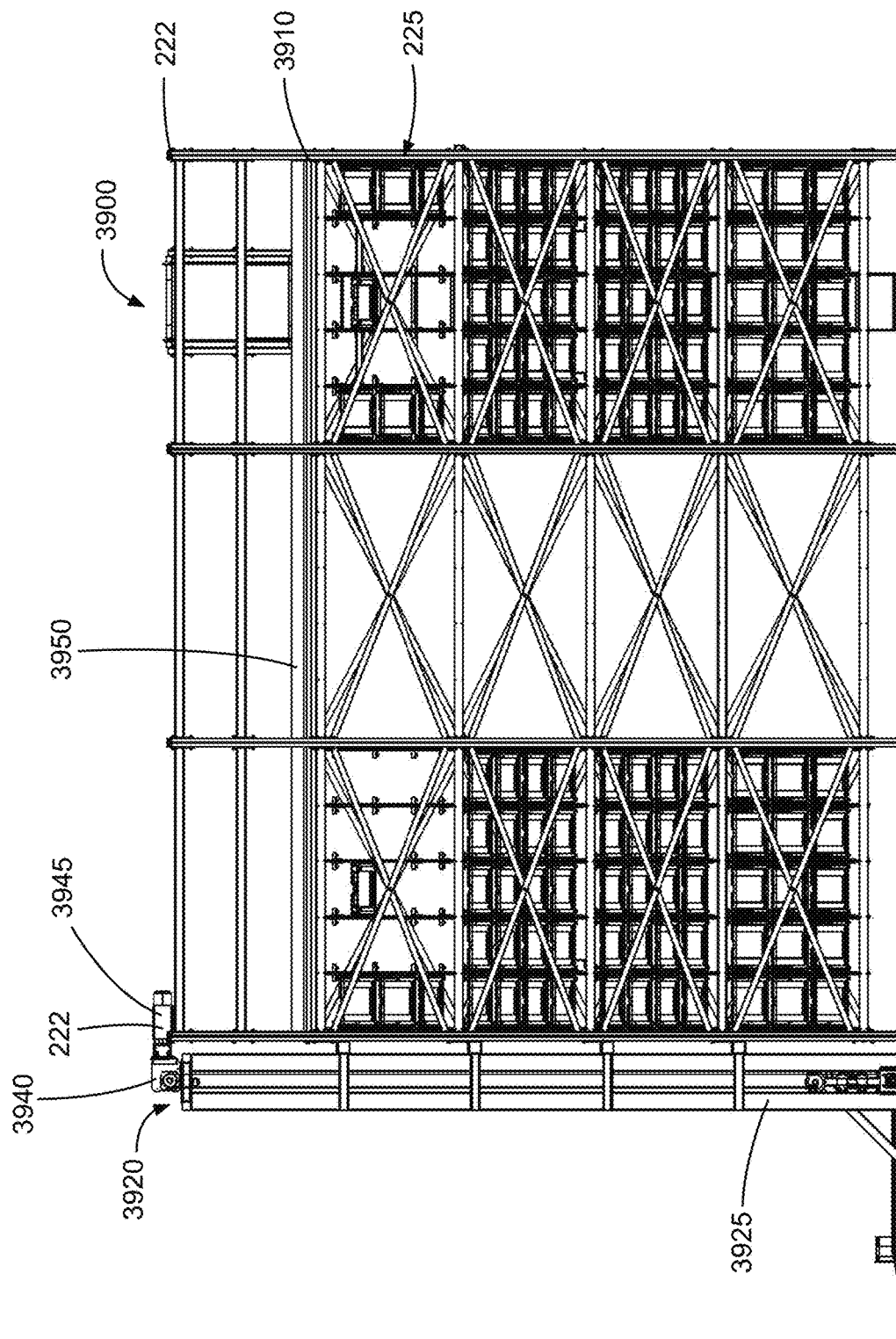
FIG. 41 is a side view of the FIG. 39 storage rack system.

At the top in this example, the storage rack system 3900 includes a mezzanine 3950 where one or more of the shuttles 3605 can for example be stored, buffered, moved, serviced, and/or sequenced. The elevator 3925 has a mezzanine entrance 3955 through where the shuttles 3605 enter and leave the mezzanine 3950. The elevator platform 3930 can raise a shuttle 3605 to the mezzanine 3950, and the shuttle 3605 can ride off the elevator platform 3930 onto the mezzanine 3950. In the illustrated example, the mezzanine 3950 is a generally flat surface on which the shuttles 3605 can move in a similar fashion as when on the floor. For instance, the shuttles 3605 can automatically steer and move so as to reshuffle their order before being loaded back onto the elevator platform 3930 of the elevator 3925. The mezzanine 3950 allows the shuttle 3605 to be temporarily stored within the storage rack system 3900 with minimal interference with other shuttles 3605. With the mezzanine 3950, service efficiency can be enhanced by reducing shuttle congestion in and around the storage rack system 3900. The shuttle 3605 does not necessarily have to leave storage rack system 3900 to make room for other shuttles 3605. Moreover, the elevator 3925 can be used more efficiently. The mezzanine 3950 in FIGS. 39, 40, and 41 is illustrated as a single mezzanine 3950 located at the top of the storage rack system 3900. In other examples, the storage rack system 3900 can include several mezzanines 3950 located within different rack levels 225 and/or at other locations in the racks 3910.

Figure 43:
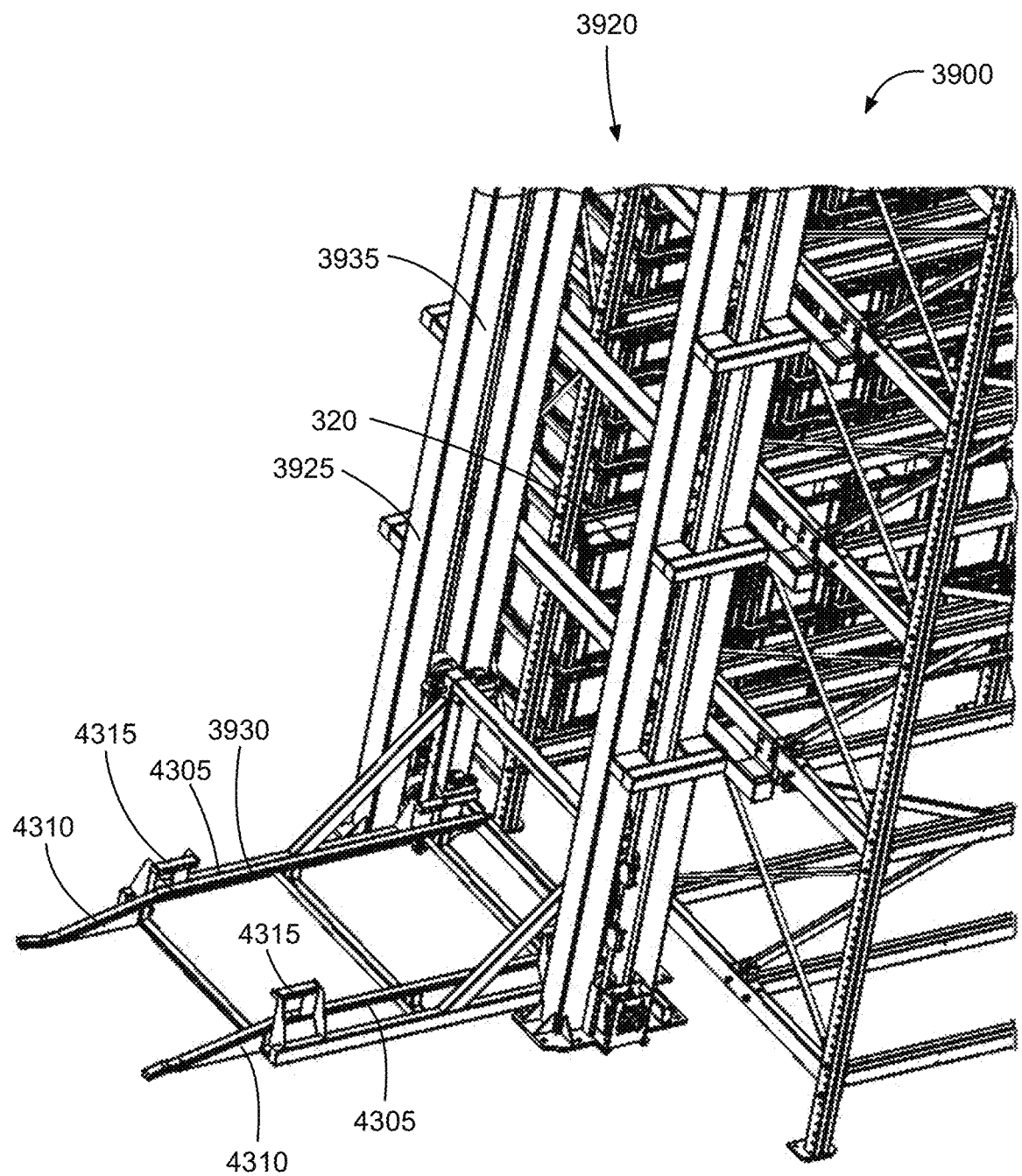
FIG. 43 is an enlarged perspective view of one end of the FIG. 39 storage rack system.

From the floor or ground, the shuttle 3605 is able to move onto and from the elevator platform 3930. As can be seen in FIG. 43 as well in the other drawings, the elevator platform 3930 has one or more platform rails 4305 on which the wheel assemblies 715 of the shuttle 3605 ride (FIG. 9). In the depicted example, the elevator platform 3930 includes a pair of platform rails 4305 that are located distally away from the racks 3910, but in other examples, the elevator platform 3930 can include more or less platform rails 4305 than is shown. Each of the platform rails 4305 include a ramp section 4310 where the platform rail 4305 generally tapers towards the floor or ground. This tapering of the platform rails 4305 at the ramp sections 4310 allows the shuttle 3605 to smoothly ride on and off the elevator platform 3930. The platform rails 4305 are positioned and spaced to generally match the spacing of the rack rails 320 in the travel lanes 310 between the racks 3910. The platform rails 4305 further include one or more retention brackets 4315 that help retain the shuttle 3605 as the elevator 3925 moves. The retention brackets 4315 generally hook the shuttle 3605 when on the elevator 3925.

During operation, the elevator drive 3940 of the elevator 3925 lowers the elevator platform 3930 to the floor such that the shuttle 3605 is able to move onto the elevator platform 3930. The shuttle 3605 rides up the ramp sections 4310 onto the platform rails 4305. Once the shuttle 3605 is loaded onto the elevator platform 3930, the elevator drive 3940 can raise the elevator platform 3930 to the desired rack level 225. In some case, the elevator platform 3930 is not raised such that the shuttle 3605 is able to service the rack level 225 located along the floor.

Once at the desired rack level 225, the platform rails 4305 of the elevator platform 3930 are aligned with the rack rails 320 at the rack level 225. The shuttle 3605 is then able to move off the elevator platform 3930 and onto the rack rails 320. The shuttle 3605 is then able to load, unload, and/or otherwise move items to and from the rack 3910 along the travel lane 310 in a similar fashion as described before. After performing the designated servicing tasks for a particular rack level 225, the shuttle 3605 travels back onto the platform rails 4305, and the elevator 3925 can raise or lower the shuttle 3605 to the next rack level 225 that needs servicing. As noted before, the elevator 3925 can also raise the shuttle 3605 to the mezzanine 3950 so that the shuttle 3605 can for example be buffered. Once the shuttle 3605 is again needed, the shuttle 3605 can move back onto the elevator platform 3930 so as to service other rack levels 225 within the storage rack system 3900. After the shuttle 3605 performs all of the required tasks for the storage rack system 3900, the elevator 3925 lowers the elevator platform 3930 with the shuttle 3605 to the floor. The shuttle 3605 is then able to exit the elevator 3925 by riding off the ramp sections 4310 of the platform rails 4305 and onto the floor. The shuttle 3605 is then free to move along the floor to perform other tasks like delivering and/or retrieving items such as from other locations or other storage rack systems 3900.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Ambient Energy Source" generally refers to an energy source that produces energy using energy from external, natural sources that are present in the environment. Some examples of ambient energy include, but are not limited to, solar energy, hydroelectric energy, wind energy, thermal energy and piezoelectric energy.

"Automated Guided Vehicle" (AGV) generally refers to a mobile robot that is able to automatically self-navigate between various locations. For example, AGVs are typically, but not always, able to automatically navigate by following markers, such as wires or magnets embedded in the floor, by using lasers, and/or by using one or more vision systems. AGVs are also typically, but not always, designed to automatically avoid collisions, such as with other AGVs, equipment, and personnel. AGVs are commonly, but not always, used in industrial applications to move materials around a manufacturing facility or warehouse.

"Buffering System" generally refers to a mechanism that is used to store items and/or storage containers on a temporary or near-temporary basis. In one form, the buffering system includes one or more storage racks that are arranged to store items and/or storage containers both in a vertical and horizontal arrangement. The rows of shelves in the racks can be arranged in a generally uniform manner so as to form a repeating pattern of shelves or in a non-uniform manner. The height or spacing of shelves can be the same on all rows or levels of shelves or different. The shelves in one example include conveyors for indexing the items and/or storage containers.

"Chassis" generally refers to an internal frame and/or supporting structure that supports an external object, body, and/or housing of the vehicle and/or electronic device. In one form, the chassis can further provide protection for internal parts of the vehicle and/or electronic device. By way of non-limiting examples, a chassis can include the underpart of a vehicle, including the frame on which the body is mounted. In an electronic device, the chassis for example includes a frame and/or other internal supporting structure on which one or more circuit boards and/or other electronics are mounted.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus, a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Container" generally refers to an object creating a partially or fully enclosed space that can be used to contain, store, and transport objects, items, and/or materials. In other words, a container can include an object that can be used to hold or transport something. By way of non-limiting examples, containers can include boxes, cartons, plastic packaging, totes, bags, jars, envelopes, barrels, cans, bottles, drums, and/or packages.

"Container Transfer Mechanism", "Tray Transfer Table", or "Transfer Table" generally refers to a system configured to transfer storage containers, such as trays, totes, and the like, between a shuttle and storage rack. In one example, the container transfer mechanism is incorporated into the shuttle, but in other examples, all or part of the container transfer mechanism is incorporated into the rack. In one form, the container transfer mechanism includes a lift mechanism with an extendable conveyor that is able to extend into the rack to retrieve or place the storage container in the rack.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of nonlimiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Elastic" generally refers to a solid material and/or object that is capable of recovering size and/or shape after deformation. Elastic material typically is capable of being easily stretched, expanded, and/or otherwise deformed, and once the deforming force is removed, the elastic material returns to its original shape. By way of non-limiting examples, elastic materials include elastomers and shape memory materials. For instance, elastic materials can include rubber, both natural and synthetic, and plastics.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Elevator" generally refers to a type of transportation device that moves people, goods, items, and/or other objects in a vertical direction between floors, levels, decks, and/or other structures. In one nonlimiting example, the elevator includes a platform and/or cage that is raised and lowered mechanically in a vertical shaft. Drives for moving the elevator can include hydraulic, pneumatic, and/or electromagnetic type drives.

"End of Arm Tool" (EoAT) or "End Effector" generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but not always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

"Energy Source" generally refers to a device, structure, mechanism, and/or system that provides power for performing work. The energy supplied by the energy source can take many forms including electrical, chemical, electrochemical, nuclear, hydraulic, pneumatic, gravitational, kinetic, and/or potential energy forms. The energy source for instance can include ambient energy sources, such as solar panels, external energy sources, such as from electrical power transmission networks, and/or portable energy sources, such as batteries. The energy source can include an energy carrier containing energy that can be later converted to other forms, such as into mechanical, heat, electrical, and/or chemical forms. Energy carriers can for instance include springs, electrical batteries, capacitors, pressurized air, dammed water, hydrogen, petroleum, coal, wood, and/or natural gas, to name just a few.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Extended Position" generally refers to a location or state of a mechanism where at least a portion is stretched out to be longer or bigger. When in the extended position, the mechanism does not need to be stretched to the fullest extent possible (i.e., fully extended), but instead, it can be partly lengthened or enlarged (i.e., partially extended).

"Fin Gripper", "Shark Fin Gripper", or "Shark Fin Finger" generally refer to an A-frame shaped robotic finger that is flexible to securely grip a wide variety of objects, including fragile and/or irregularly shaped objects. The fin gripper is configured to act in a fashion similar to how a fish fin bends. The gripper fin includes flange members joined together at an acute angle to form a V shape, and the flanges are connected together by a series of spaced apart cross beams or bands to from a triangle. Typically, the fin gripper is made all or in part of deformable and/or elastic material that allows the fin gripper to bend, but portions of the fin gripper can include hard material. Pushing on one side of the V shape causes the fin gripper to deform and a tip portion of the fin gripper is able to bend around the gripped object. In other words, the fin gripper is able to adapt to the shape of a work piece when pressure is applied laterally. When the fin gripper has a symmetrical shape about a central axis, the fin gripper is able to bend in either lateral direction. On the other hand, when the fin gripper has an asymmetrical shape, the fin gripper tends to bend in only one direction.

"Frame" generally refers to a structure that forms part of an object and gives strength and/or shape to the object.

"Gearbox" or "Transmission" generally refer to a power system that provides controlled application of mechanical power. The gearbox uses gears and/or gear trains to provide speed, direction, and/or torque conversions from a rotating power source to another device.

"Guidance, Navigation, and Control (GNC) System" generally refers to a physical device, a virtual device, and/or a group of devices configured to control the movement of vehicles, such as automobiles, automated guided vehicles, ships, aircraft, drones, spacecraft, and/or other moving objects. GNC systems are typically configured to determine a desired path of travel or trajectory of the vehicle from the vehicle's current location to a designated target, as well as desired changes in velocity, rotation, and/or acceleration for following the path. The GNC system can include and/or communicate with sensors like compasses, GPS receivers, Loran-C, star trackers, inertial measurement units, altimeters, environmental sensors, and the like. At a given time, such as when the vehicle is travelling, the GNC system is configured to determine the location (in one, two, or three dimensions) and velocity of the vehicle. For example, the GNC system is able to calculate changes in position, velocity, attitude, and/or rotation rates of a moving vehicle required to follow a certain trajectory and/or attitude profile based on information about the state of motion of the vehicle. The GNC system is able to maintain or change movement of the vehicle by manipulating forces by way of vehicle actuators, such as steering mechanisms, thrusters, flaps, etc., to guide the vehicle while maintaining vehicle stability. GNC systems can be found in autonomous or semi-autonomous vehicles.

"Lateral" generally refers to being situated on, directed toward, or coming from the side.

"Lift Mechanism" or "Lifting Mechanism" generally refers to any mechanical device designed to raise and/or lower objects in a generally vertical direction. By way of non-limiting examples, the lift mechanism can include rotating joints, elevators, screw drives, and/or linkage type devices. The lift mechanism can be designed to discretely lift objects, such as in a case of an elevator, or lift objects in a continuous manner, such as chain and bucket type elevators and/or screw type conveyors. The lift mechanism can be manually and/or automatically powered. For instance, the lift mechanism can be powered by electricity, pneumatics, and/or hydraulics.

"Longitudinal" generally relates to length or lengthwise dimension of an object, rather than across.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change memory (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other nonvolatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include the application layer, transport layer, internet layer (including, e.g., IPv6), or link layer.

"Pinion" generally refers to a relatively small gear in a gear drive train. Typically, but not always, the smaller pinion engages or is engaged inside a larger gear or to a rack. When engaging a rack, rotational motion applied to the pinion causes the rack to move relative to the pinion, thereby translating the rotational motion of the pinion into linear motion. By way of non-limiting examples, the pinion can be incorporated into differential, rack-and-pinion, and clutch bell drive trains, to name just a few. The pinion can be oriented in a number of manners relative to the larger gear or rack. For instance, the pinion can be angled perpendicular to a crown gear in a differential type drive.

"Powertrain" or "Powerplant" generally refers to devices and/or systems used to transform stored energy into kinetic energy for propulsion purposes. The powertrain can include multiple power sources and can be used in non-wheel-based vehicles. By way of nonlimiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and final drive components (e.g., drive wheels, continuous tracks, propeller, thrusters, etc.).

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Retracted Position" generally refers to a location or state of a mechanism where it is withdrawn back to have a shorter length or a smaller size. When in the retracted position, the mechanism is typically shorter or smaller than when in the extended position.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Shuttle" generally refers to a mechanism or device that is able to transport one or more items that are resting on and/or in the device. Each shuttle is capable to move independently of one another and is able to move in multiple directions (e.g., horizontally, vertically, diagonally, etc.) along a shuttle frame. In one example, the shuttle includes a power train that is configured to move the shuttle, a steering system to direct shuttle movement, a tote transfer mechanism with a lift mechanism, and a robotic arm configured to transfer items to and/or from the shuttle. The power train in one example includes wheels that are driven by an electric motor, but in other examples, the power train can be configured differently. For instance, the power train can include a hydraulic motor and/or a pneumatic motor.

"Shuttle Frame" generally refers to a structure along where the shuttle moves. In one non-limiting example, shuttle frame allows the shuttles to move independently of one another. The shuttle frame can extend vertically and/or horizontally to allow shuttle movement in multiple directions (e.g., horizontally, vertically, diagonally, etc.) along the shuttle frame. In one example, the shuttle frame includes multiple vertical levels and lanes. Typically, but not always, the shuttle frame is generally aligned with one or more racks to allow the shuttle to service the racks. A shuttle frame in certain examples includes one or more rails on which the shuttle travels. The shuttle frame can further include vertical elevator shafts for facilitating vertical movement of the shuttle and one or more switches for guiding the direction of the shuttle onto different rails. The shuttle frame in one form includes multiple horizontal travel lanes where the shuttle can travel horizontally along the ends of racks and/or between opposing racks. The travel lanes can further include intersections where the shuttle is able to turn and travel in different horizontal and/or vertical directions. The shuttle frame in further examples include rack access passages, entrance/exit travel lanes, doorways, or docks through which the shuttles are able to enter and/or exit the shuttle frame and travel along a floor or other surface.

"Shuttle System" generally refers to a mechanism used to transport items via one or more shuttles that move along a shuttle frame. The shuttles in the shuttle system are able to at least move in two spatial directions (i.e., in a vertical direction and a horizontal direction) along the shuttle frame. In another form, the shuttle is able to move in all three spatial dimensions within the shuttle frame. The shuttle system can include an infeed shuttle system that typically (but not always) supplies items to a buffering system. The shuttle system can further include a discharge shuttle system that typically (but not always) discharges items from the buffering system.

"Steering System" generally refers to one or more devices and/or linkages that allow a vehicle to follow a desired course. By way of non-limiting examples, the steering system can include active, passive, rear wheel, front wheel, four-wheel, power, steer-by-wire, articulated, speed sensitive, differential, crab, hydraulic, rack and pinion, worm and sector, recirculating ball, Ackerman, and/or Bell-crank type systems, to name just a few.

"Stock Keeping Unit" (SKU) or "Item" generally refers to an individual article or thing. The SKU can come in any form and can be packaged or unpackaged. For instance, SKUs can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

"Storage Container" generally refers to an object that can be used to hold or transport SKUs or other objects. By way of nonlimiting examples, the storage container can include cartons, totes, pallets, bags, and/or boxes.

"Storage Facility" generally refers to a location for keeping and/or storing items or goods. A storage facility may keep the items or goods indoors or outdoors. As an example, a storage facility may be a large building, such as a warehouse, or may be an outdoor area that is either open or enclosed by a fence or by another suitable method.

"Storage Rack" or "Rack" generally refer to a framework structure on which items and/or storage containers are arranged, housed, stored, deposited, and/or removed. The framework can include one or more tiered vertical levels formed by bars, shelves, conveyors, wires, and/or pegs on which the items and/or storage containers are supported. The framework can have different overall shapes. For instance, the framework can have a rectangular or box shape in one example, and in other examples, the framework can include an A-Frame type rack. The location of the levels and rows in the rack can be fixed and/or adjustable.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Vacuum Cup" generally refers to a device or object made of elastic, flexible material having a surface that uses negative air pressure (i.e., a partial vacuum or suction) to adhere to a non-porous object.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

"Web" generally refers to a material made of a network of thread, strings, cords, and/or wires that form openings in-between. In one form, the cords are interlaced or woven together. The interlaced pattern can be uniform or random.

"Wireless Power Transfer" (WPT) or "Wireless Energy Transmission" (WET) generally refers to the transmission of electrical energy without wires as a physical link. In a WPT system, a power transmitter, driven by electric power from a power source, generates a time-varying electromagnetic field, which transmits power across space to a power receiver, which extracts power from the field and supplies the power to an electrical load. WPT is typically useful to power electrical devices where interconnecting wires are inconvenient, hazardous, and/or are not possible. For example, WPT can be used to charge portable electrical loads, like smartphones and vehicles. WPT techniques mainly fall into two general categories, non-radiative and radiative techniques. In near field or non-radiative techniques, power is transferred over short distances by magnetic fields using inductive coupling between coils of wire, or by electric fields using capacitive coupling between metal electrodes. Inductive charging can be for example used to charge handheld devices like phones and electric toothbrushes, RFID tags, and wirelessly charging implantable medical devices like artificial cardiac pacemakers, or electric vehicles. In far-field or radiative techniques, also called power beaming, power is transferred by beams of electromagnetic radiation, like microwaves and/or laser beams. These far-field techniques can transport energy longer distances, but the beam generally should be aimed at or near the power receiver. By way of nonlimiting examples, solar power satellites and wireless powered drone aircraft can be powered via these far-field WPT techniques.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

The term "or" is inclusive, meaning "and/or".

| Reference Numbers | |
|---|---|
| 100 | robotic shuttle system |
| 110 | storage rack system |
| 120 | shuttle |
| 130 | control system |
| 140 | network |
| 205 | rack |
| 210 | shuttle frame |
| 215 | storage rows |
| 220 | rack columns |
| 222 | rack end |
| 225 | rack levels |
| 230 | rack access passage |
| 305 | elevator section |
| 310 | travel lane |
| 315 | intersections |
| 320 | rack rails |
| 325 | turn rails |
| 330 | access rails |
| 505 | elevator rails |
| 510 | rack sections |
| 515 | transition rails |
| 520 | shuttle switch |
| 525 | turntable |
| 530 | curved track section |
| 535 | straight track section |
| 540 | rail channels |
| 545 | turn shoulder |
| 605 | robot arm |
| 610 | container transfer mechanism |
| 615 | powertrain |
| 620 | GNC system |
| 622 | energy source |
| 625 | processor |
| 630 | memory |
| 635 | communication system |
| 640 | sensor |
| 705 | chassis |
| 710 | body |
| 715 | wheel assembly |
| 718 | wheel well |
| 720 | container holder |
| 725 | holder wall |
| 730 | container cavity |
| 735 | rack container platform |
| 740 | extendable conveyor |
| 745 | End of Arm Tool |
| 900 | shuttle |
| 905 | robot arm |
| 910 | End of Arm Tool |
| 915 | containers |
| 920 | tray |
| 925 | tote |
| 1005 | shark fin finger |
| 1010 | hub |
| 1015 | extendable palm vacuum cup |
| 1020 | grip pads |
| 1025 | vacuum ports |
| 1030 | tip vacuum cup |
| 1105 | shuttle controller |
| 1110 | lift cavity |
| 1300 | lift mechanism |
| 1305 | base |
| 1310 | platform support frame |
| 1315 | scissor linkage assembly |
| 1320 | actuator motor |
| 1325 | platform cavity |
| 1605 | drive wheel |
| 1610 | pinion |
| 1615 | pinion teeth |
| 1705 | mounting bracket |
| 1708 | steering system |
| 1710 | steering collar |
| 1715 | fixed section |
| 1720 | rotating section |
| 1725 | steering motor |
| 1730 | wheel bracket |
| 1735 | drive motor |
| 1737 | gearbox |
| 1740 | drive shaft |

-continued

| Reference Numbers | |
|---|---|
| 1745 | brake system |
| 1750 | brake disc |
| 1755 | brake caliper system |
| 1760 | pinion bearing |
| 1900 | WPT system |
| 1905 | charge storage device |
| 1910 | charge control device |
| 1915 | electrical connection flow path |
| 1920 | electrical connection |
| 2000 | containers |
| 2005 | separator system |
| 2010 | separator web |
| 2015 | opening |
| 2020 | web opening |
| 2025 | elastic bands |
| 2030 | web slot |
| 2035 | skid pad |
| 2105 | item |
| 2205 | arrow |
| 2305 | shuttle frame level |
| 2310 | arrow |
| 2315 | arrow |
| 2405 | arrow |
| 2410 | arrow |
| 2505 | arrow |
| 2605 | arrow |
| 2610 | target storage row |
| 2615 | L-bracket |
| 2705 | arrow |
| 2805 | upward direction |
| 2810 | extension direction |
| 2905 | retraction direction |
| 3005 | downward direction |
| 3405 | arrow |
| 3505 | arrow |
| 3600 | storage rack system |
| 3605 | shuttle |
| 3610 | rack |
| 3615 | shuttle frame |
| 3620 | elevator section |
| 3625 | elevator |
| 3630 | elevator platform |
| 3635 | guide rails |
| 3640 | elevator drive |
| 3805 | platform rails |
| 3810 | ramp section |
| 3900 | storage rack system |
| 3910 | rack |
| 3915 | shuttle frame |
| 3920 | elevator section |
| 3925 | elevator |
| 3930 | elevator platform |
| 3935 | guide rails |
| 3940 | elevator drive |
| 3945 | electric motor |
| 3950 | mezzanine |
| 3955 | mezzanine entrance |
| 4305 | platform rails |
| 4310 | ramp section |
| 4315 | retention brackets |

What is claimed is:

1. A robotic shuttle system, comprising:
a rack system including one or more racks configured to store one or more items;
a shuttle configured to move along the racks in the rack system;
wherein the shuttle includes a robot arm configured to move the items between the racks and the shuttle;
wherein the robot arm includes an End of Arm Tool (EoAT) with a shark fin finger to grip the items;
wherein the shark fin finger includes flange members joined together at an acute angle;
wherein the flange members are connected together by a series of spaced apart cross beams;

wherein the shark fin finger is at least in part made of a deformable material; and
wherein the shark fin finger is configured to bend around the items when gripped.

2. The robotic shuttle system of claim 1, wherein the shuttle includes an extendable belt conveyor configured to extend to an extended position.

3. The robotic shuttle system of claim 1, wherein the shark fin finger includes a tip vacuum cup.

4. The robotic shuttle system of claim 1, wherein the shark fin finger includes a grip pad with one or more vacuum ports.

5. The robotic shuttle system of claim 1, wherein the EoAT includes an extendable palm vacuum cup that is configured to extend from the EoAT.

6. The robotic shuttle system of claim 1, wherein the shuttle has a container holder and a rack container platform.

7. The robotic shuttle system of claim 6, wherein the rack container platform has a lift mechanism configured to move the rack container platform vertically.

8. The robotic shuttle system of claim 7, wherein the rack container platform has an extendable conveyor configured to extend to an extended position in the racks.

9. The robotic shuttle system of claim 1, wherein the shuttle includes a lift mechanism configured to vertically move a rack container platform.

10. The robotic shuttle system of claim 9, wherein the lift mechanism is configured to raise the rack container platform above the shuttle.

11. The robotic shuttle system of claim 9, wherein the lift mechanism is configured to lower the rack container platform below the shuttle.

12. The robotic shuttle system of claim 9, wherein the lift mechanism is configured to move the rack container platform above and below the shuttle.

13. The robotic shuttle system of claim 1, wherein the rack system includes an elevator with an elevator platform configured to vertically move the shuttle.

14. The robotic shuttle system of claim 13, wherein the elevator platform includes one or more retention brackets configured to retain the shuttle.

15. The robotic shuttle system of claim 13, wherein the rack system includes a mezzanine and the elevator has a mezzanine entrance to transfer the shuttle to and from the mezzanine.

16. The robotic shuttle system of claim 13, wherein the elevator platform includes one or more rails that support the shuttle.

17. The robotic shuttle system of claim 16, wherein the rails have a ramped section that is tapered for loading the shuttle onto the elevator platform.

18. The robotic shuttle system of claim 1, further comprising a tote with an internal separator supported on the shuttle.

19. The robotic shuttle system of claim 18, wherein the shuttle is configured to map position of the items in the tote for blind picking.

20. The robotic shuttle system of claim 18, wherein the tote is configured to store multiple different kinds of Stock Keeping Units (SKUs).

21. The robotic shuttle system of claim 18, wherein the internal separator is configured to hold a uniform array of the items with the same Stock Keeping Unit (SKU).

22. The robotic shuttle system of claim 18, wherein the shuttle includes a vision system for picking dense random storage of the items in the tote.

23. The robotic shuttle system of claim 18, wherein the internal separator includes a monolayer web configured to separate the items.

24. The robotic shuttle system of claim 23, wherein the monolayer web includes a grid of elastic bands.

25. The robotic shuttle system of claim 24, wherein the grid has a perpendicular array of the elastic bands to separate the items.

26. The robotic shuttle system of claim 1, wherein the rack system includes a shuttle frame where the shuttle travels along the racks.

27. The robotic shuttle system of claim 26, wherein the shuttle is configured to move independently outside of the rack system.

28. The robotic shuttle system of claim 27, wherein the shuttle includes one or more steerable wheels that are powered by the shuttle.

29. The robotic shuttle system of claim 28, wherein the shuttle includes an Energy Storage System (ESS).

30. The robotic shuttle system of claim 29, wherein the wheels are configured to form an electrical circuit with rails to charge the ESS.

31. The robotic shuttle system of claim 28, wherein the wheels each include a pinion and a drive wheel.

32. The robotic shuttle system of claim 31, wherein the shuttle frame includes a vertical elevator rail with teeth configured to engage the pinion.

33. The robotic shuttle system of claim 32, further comprising a shuttle switch configured to change movement of the shuttle between vertical and horizontal movement.

34. The robotic shuttle system of claim 33, wherein the shuttle switch includes a turntable with a straight track located between opposing curved tracks.

35. The robotic shuttle system of claim 31, wherein the shuttle frame includes an intersection where the shuttle turns horizontally with the wheels.

36. The robotic shuttle system of claim 35, wherein the intersection includes one or more rail channels with turn shoulders in which the drive wheel is received.

37. A method, comprising:
moving a shuttle on a floor, wherein the shuttle includes a robot arm, wherein the robot arm includes an End of Arm Tool (EoAT) with a shark fin finger to grip one or more items, wherein the shark fin finger includes flange members joined together at an acute angle;
entering a rack system that includes one or more racks configured to store the items at a storage location with the shuttle, wherein the rack system includes a shuttle frame;
moving the shuttle along the shuttle frame within the rack system to the storage location;
gripping the items stored at the storage location by bending the shark fin finger around the items; and
conveying the items between the storage location and the shuttle with the robot arm.

38. The method of claim 37, wherein said moving the shuttle along the shuttle frame includes turning the shuttle in a horizontal direction by turning one or more wheels of the shuttle in one or more turn shoulders of the shuttle frame.

39. The method of claim 37, further comprising buffering the shuttle on a mezzanine in the rack system.

40. The method of claim 37, wherein the flange members are connected together by a series of spaced apart cross beams.

41. The method of claim 37, wherein said moving the shuttle along the shuttle frame includes moving the shuttle in a vertical direction.

42. The method of claim 41, wherein said moving the shuttle in the vertical direction includes moving the shuttle along an elevator rail that extends in the vertical direction.

43. The method of claim 41, wherein said moving the shuttle in the vertical direction includes moving the shuttle with an elevator platform of an elevator.

\* \* \* \* \*